(12) United States Patent
Wittenbreder

(10) Patent No.: US 6,272,023 B1
(45) Date of Patent: *Aug. 7, 2001

(54) HIGH EFFICIENCY COUPLED INDUCTOR SOFT SWITCHING POWER CONVERTERS

(75) Inventor: Ernest H. Wittenbreder, Flagstaff, AZ (US)

(73) Assignee: Technical Witts, Inc, Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,961

(22) Filed: May 23, 2000

Related U.S. Application Data

(63) Continuation-in-part of application No. 09/312,091, filed on May 15, 1999, now Pat. No. 6,147,886.

(51) Int. Cl.[7] .......................... H02M 3/335; H02M 7/44
(52) U.S. Cl. ................... 363/16; 363/17; 363/98
(58) Field of Search ................ 363/16, 98, 132, 363/17

(56) References Cited

U.S. PATENT DOCUMENTS

| | | | |
|---|---|---|---|
| 4,914,561 | 4/1990 | Rice | 363/126 |
| 5,132,888 | * 7/1992 | Lo et al. | 363/17 |
| 5,291,382 | 3/1994 | Cohen | 363/16 |
| 5,325,283 | * 6/1994 | Farrington et al. | 363/21 |
| 5,754,413 | 5/1998 | Fraidlin | 363/16 |
| 5,805,432 | * 9/1998 | Zaitsu et al. | 363/16 |

* cited by examiner

Primary Examiner—Peter S. Wong
Assistant Examiner—Rajnikant B. Patel

(57) ABSTRACT

The power converter of this invention accomplishes zero voltage switching at both turn on and turn off transitions of all primary switches. A pair of coupled inductors serve as both energy storage devices and isolation mechanisms. The placement of a small inductor in series with the coupled inductors enables the invariance of primary current direction throughout the switching transition which provides for zero voltage switching for all switches for all transitions. The power converter behaves as a pair of interleaved coupled inductor buck converters with oppositely directed magnetizing currents. During a first half cycle, while one inductor is coupled to the output, the other uncoupled inductor behaves as a current source, setting the primary winding currents for both inductors equal to the magnetizing current of the uncoupled inductor. The inductor which is coupled to the output appears as an output filter capacitor or voltage source to the uncoupled inductor during the first half cycle. During the alternate half cycle the roles of the two inductors are reversed.

10 Claims, 50 Drawing Sheets

HIGH EFFICIENCY COUPLED INDUCTOR SOFT SWITCHING POWER CONVERTERS

This application is a continuation-in-part which discloses and claims subject matter disclosed in my earlier pending application Ser. No. 09/312,091 filed May 15, 1999, now U.S. Pat. No. 6,147,886. This invention was revealed in Disclosure Document Nr. 460,696 filed Aug. 16, 1999.

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter, when the switch is in the on state, the voltage across the switch is zero, so the power loss is zero. When the switch is in the off state, the power loss is zero, because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode when the capacitor's voltage is zero. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element, such as an inductor, and turning on the switch after the parallel diode has begun to conduct. During the turn on transition the voltage across the switch is held at zero clamped by the parallel diode. The various zero voltage switching (ZVS) techniques differ in the control and modulation schemes used to accomplish regulation and in the energy storage mechanisms used to accomplish the zero voltage turn on transition.

One of the ZVS techniques uses a resonant circuit which is frequency modulated over a broad frequency range. An example is shown in FIG. 1. These techniques have been refined by a multi-resonant technique in which more resonant circuit elements and a complex control circuit are required, but the converter can operate at a fixed frequency.

Several techniques have been introduced which accomplish zero voltage switching, inherently, at constant switching frequency. One of these techniques requires a full bridge switching arrangement with four primary switches in which the regulation is accomplished by phase modulation or by alternating pulse width modulation in the two switching legs. This technique is illustrated in FIG. 2. This technique has become a standard technique for high power conversion at high frequency. One of the potential problems with this technique is staircase saturation of the transformer core resulting from relatively small DC imbalances in the transformer's primary winding, which can lead to catastrophic failure. One common solution to the staircase saturation problem is to place a capacitor in series with the primary winding of the transformer to block any DC current. The series capacitor incurs losses during high power operation and requires the user to use voltage mode control rather than the preferred current mode control, which unbalances the capacitor voltage resulting in high switch stress that can lead to catastrophic failure. Another problem is high conduction losses that results from the peak recirculation current during the reset time of the output choke.

The FIG. 3 circuit is an example of prior art that overcomes the staircase saturation problem associated with the FIG. 2 circuit. The two transformers are coupled inductors and energy storage devices that accommodate large DC currents, so that staircase saturation is not a problem. The FIG. 3 circuit can accomplish zero voltage switching under the right circumstances. The transitions are driven by the stored energy in the parallel inductor. The amount of energy stored in the parallel inductor must be large enough to charge/discharge the parasitic capacitors associated with the switches that are in transition. The current in the parallel inductor would have to be increased sufficiently to both provide current to drive the transition and current to drive the primary windings of the transformers. This is a particular problem at high line voltage where the energies required to drive the switching transition are greatest. For illustration, referring to FIG. 3, consider the condition in which switches S1 and S4 are on and switches S2 and S3 are off. Increasing current will flow from left to right through both the parallel inductor, L1, and the primary windings of the transformers. During this time current flows in the secondary winding of T1 through D1 and to the output capacitor and load resistor. Stored energy builds up in the core of transformer T2, but no current flows in the secondary winding of T2, since its secondary winding voltage reverse biases D2. After a time, switch S1 is turned off and the stored energies in L1 and T2 drive the transition which can easily be made to be zero voltage. During the state which follows the connection point between T1 and T2 drops below ground potential and the T1 primary voltage becomes equal to the sum of the voltages across T2 and the switches, S2 and S4. During the time that S2 and S4 are on, the current in L1 remains relatively unchanged, dropping slightly, but the current in the primary windings drops towards zero as the current in the secondary windings shifts from T1 to T2. The critical switching transition occurs when switch S4 turns off. During the switching transition that follows L1 must provide all of the energy to drive the transition, charging the output capacitance of S4, discharging the output capacitance of S3 and providing charge to the other parasitic capacitances in the windings of each of the magnetic circuit elements and the D1 diode, which becomes reverse biased during the transition. As secondary current shifts from D1 to D2 the current in the primary circuit reverses sign and flows from right to left. When the transition is complete the current in the primary winding will equal the magnetizing current in the primary winding of the T1 transformer. In this discussion, and all the discussions that follow, the magnetizing current will mean the current in a coupled inductor winding that is substantially proportional to the field of magnetic induction that exists in the core of the coupled inductor. The magnetizing current in a coupled inductor may be referred to any winding of that coupled inductor in such a manner that the total stored magnetic energy in the core of the coupled inductor is equal to one half times the inductance of the winding, to which the magnetizing current is referred, times the square of the magnetizing current. With this definition of magnetizing current the magnetizing current will have both AC and DC components, in general. As the switching transition progresses the current required by the primary circuit from L1 increases as the current provided by L1 decreases. The rate of increase of current in the primary windings from right to left during the S4 turn off transition depends on the line voltage and the resistance in the active section of the circuit. As the current in the primary windings increases from right to left much of the current and energy provided by the L1 inductor is diverted to driving the load. In order for the current in the inductor L1 to drive the load during the transition and also drive the transition the current provided by the inductor L1 must be larger than the peak primary current and the energy stored must be sufficient that the current provided by L1 is relatively invariant for the duration of the transition. As a result of the large current in L1 the conduction losses in the four switches are substantially increased by the presence of L1 and because of the substantial stored energy requirement the inductor L1 adds additional cost, weight and volume to the converter.

OBJECTS AND ADVANTAGES

An object of the invention is to accomplish zero voltage switching, with the addition of a single small magnetic circuit element specifically for driving switching transitions, and thereby to reduce semiconductor switching power losses.

Another object is to provide an isolated converter which is relatively simple and is capable of delivering high output power.

Another object is to eliminate the possibility of transformer staircase saturation.

Another object is to provide a converter design with minimal snubber requirements and superior EMI performance.

Another object is to provide a simple resonant transition converter design that can be readily used with the single frequency, pulse width modulated or phase shift modulated, controller integrated circuits.

Another object is to provide a high power conversion scheme with reduced conduction losses.

Another object is to provide a resonant switching transition mechanism which can be designed to provide zero voltage switching over the full range of line voltage and load conditions.

Another object of this invention is to provide a high efficiency zero voltage switching power converter design that can be extended to multiple isolated outputs.

Another objective is to provide a high power bridge converter that neither needs nor benefits from the addition of a capacitor placed in series with a primary winding of a coupled inductive magnetic element.

Another objective is to provide a converter with superior output ripple performance.

Another object is to provide a resonant switching transition mechanism with two magnetic circuit elements, which store the energy transferred to the load during a switching cycle and with a small series inductance which enables the primary circuit current direction to be maintained through the switching transitions thereby enabling the resonant transitions.

Further objects and advantages of my invention will become apparent from a consideration of the drawings and ensuing description.

These and other objects of the invention are provided by a novel circuit technique that uses two coupled inductors as both energy storage devices and isolation mechanisms, a small inductance placed in series with the coupled inductors, and a secondary side switch for each coupled inductor and each output. The zero voltage switching transitions are accomplished by using the small series inductance to maintain the primary current direction through the switching transitions.

BRIEF DESCRIPTION OF THE DRAWINGS

The present invention is illustrated by reference to the drawings in which like reference numerals refer to like elements of the invention.

Figure 1:
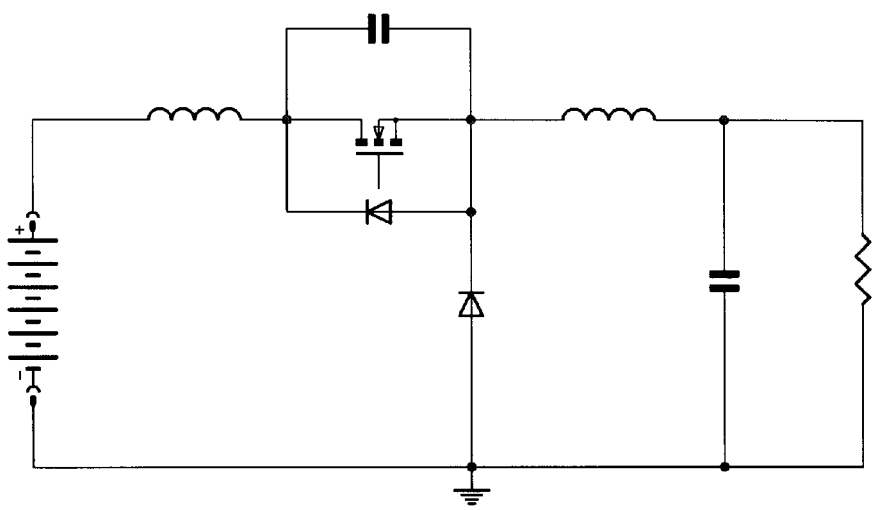
FIG. 1 illustrates a circuit schematic drawing of a frequency modulated, zero voltage switching power converter.
Figure 2:
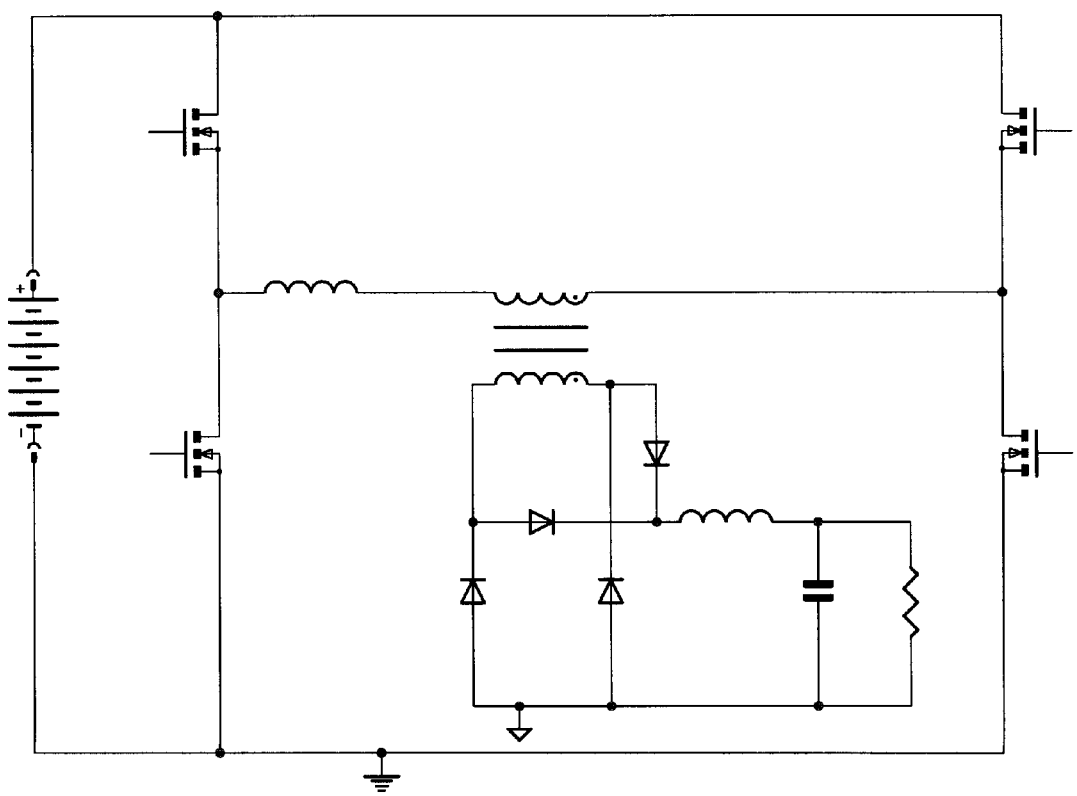
FIG. 2 illustrates a circuit schematic drawing of a phase shift modulated, full bridge, zero voltage switching, forward converter.
Figure 3:
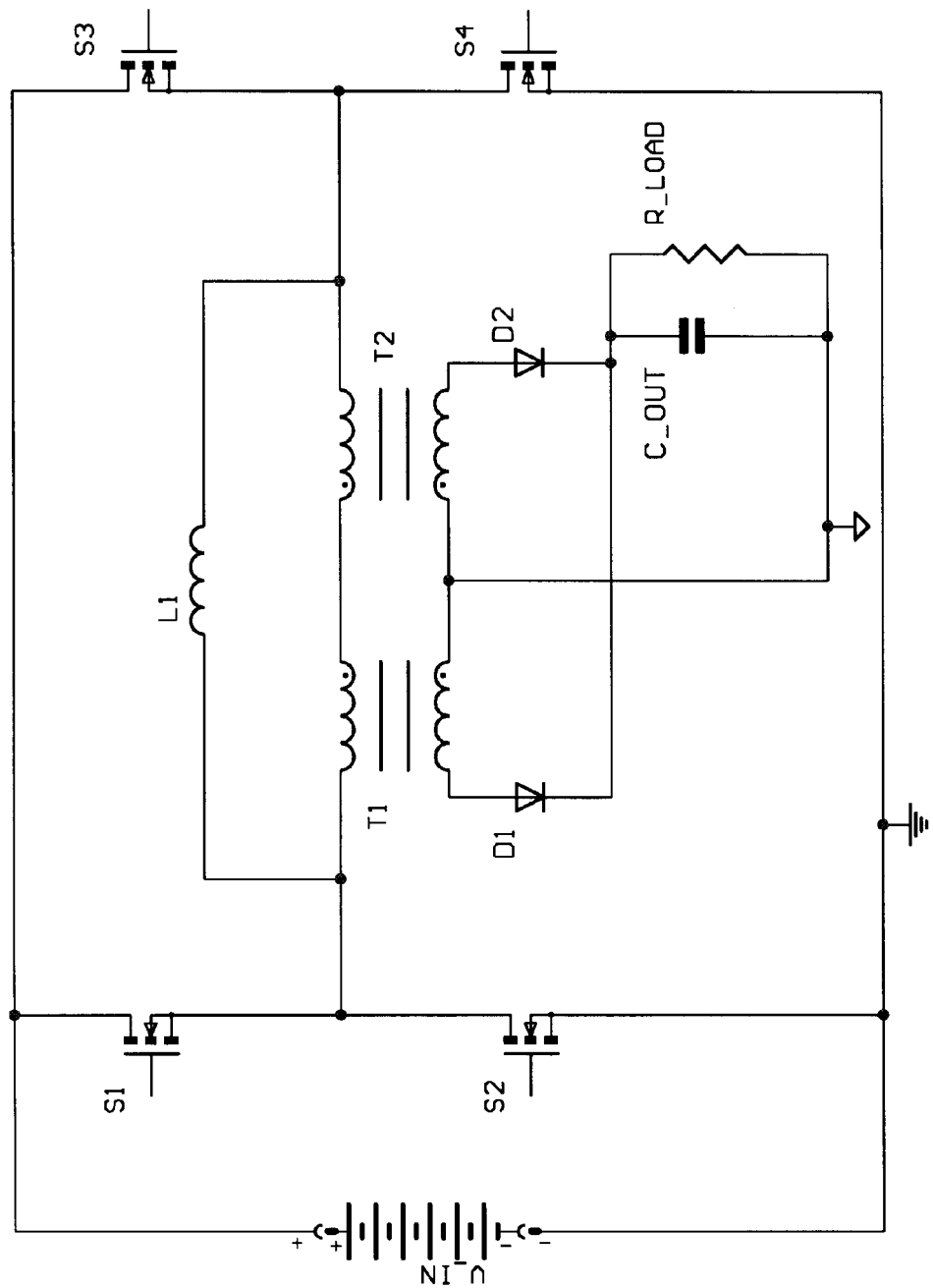
FIG. 3 illustrates a circuit schematic drawing of a phase shift modulated, full bridge, zero voltage switching, dual opposed interleaved coupled inductor buck converter.

| Reference Numerals | | | |
|---|---|---|---|
| 100 | DC input power source | 101 | positive terminal |
| 102 | negative terminal | 103 | lead |
| 104 | lead | 105 | node |
| 106 | node | 107 | input capacitor |
| 109 | lead | 110 | lead |
| 111 | node | 112 | node |
| 113 | capacitor | 114 | switch |
| 115 | diode | 116 | capacitor |
| 117 | switch | 118 | diode |
| 119 | node | 120 | node |
| 121 | lead | 122 | lead |
| 123 | node | 128 | inductor |
| 130 | coupled inductor | 131 | coupled inductor |
| 134 | node | 135 | lead |
| 136 | lead | 137 | node |
| 138 | node | 139 | capacitor |
| 140 | switch | 141 | diode |
| 142 | capacitor | 143 | switch |
| 144 | diode | 145 | node |
| 146 | node | 147 | lead |
| 148 | lead | 155 | switch |
| 156 | switch | 161 | node |
| 162 | node | 163 | capacitor |
| 164 | load | 200 | DC input power source |
| 201 | positive terminal | 202 | negative terminal |
| 203 | lead | 204 | lead |

-continued

Reference Numerals

| 205 | node | 206 | node |
|---|---|---|---|
| 207 | capacitor | 208 | lead |
| 209 | capacitor | 211 | node |
| 212 | node | 213 | capacitor |
| 214 | switch | 215 | diode |
| 216 | capacitor | 217 | switch |
| 218 | diode | 219 | node |
| 220 | node | 221 | lead |
| 222 | lead | 223 | node |
| 228 | inductor | 230 | coupled inductor |
| 231 | coupled inductor | 253 | switch |
| 254 | switch | 261 | node |
| 262 | node | 263 | capacitor |
| 264 | load | | |

SUMMARY

The subject invention uses a primary switching network that provides alternating bidirectional voltage to a pair of coupled inductors, which are also magnetic energy storage elements. A small series inductance is placed in series with the two coupled inductors. There is at least one secondary side switch for each coupled inductor secondary winding, a primary side energy storage and filter capacitor, and a secondary side energy storage and filter capacitor placed in parallel with the load. The zero voltage switching is accomplished in this converter by the current in the primary winding which is maintained in direction through the transition by the small inductance in series with the coupled inductors.

DESCRIPTION OF THE PREFERRED EMBODIMENTS

Figure 4:
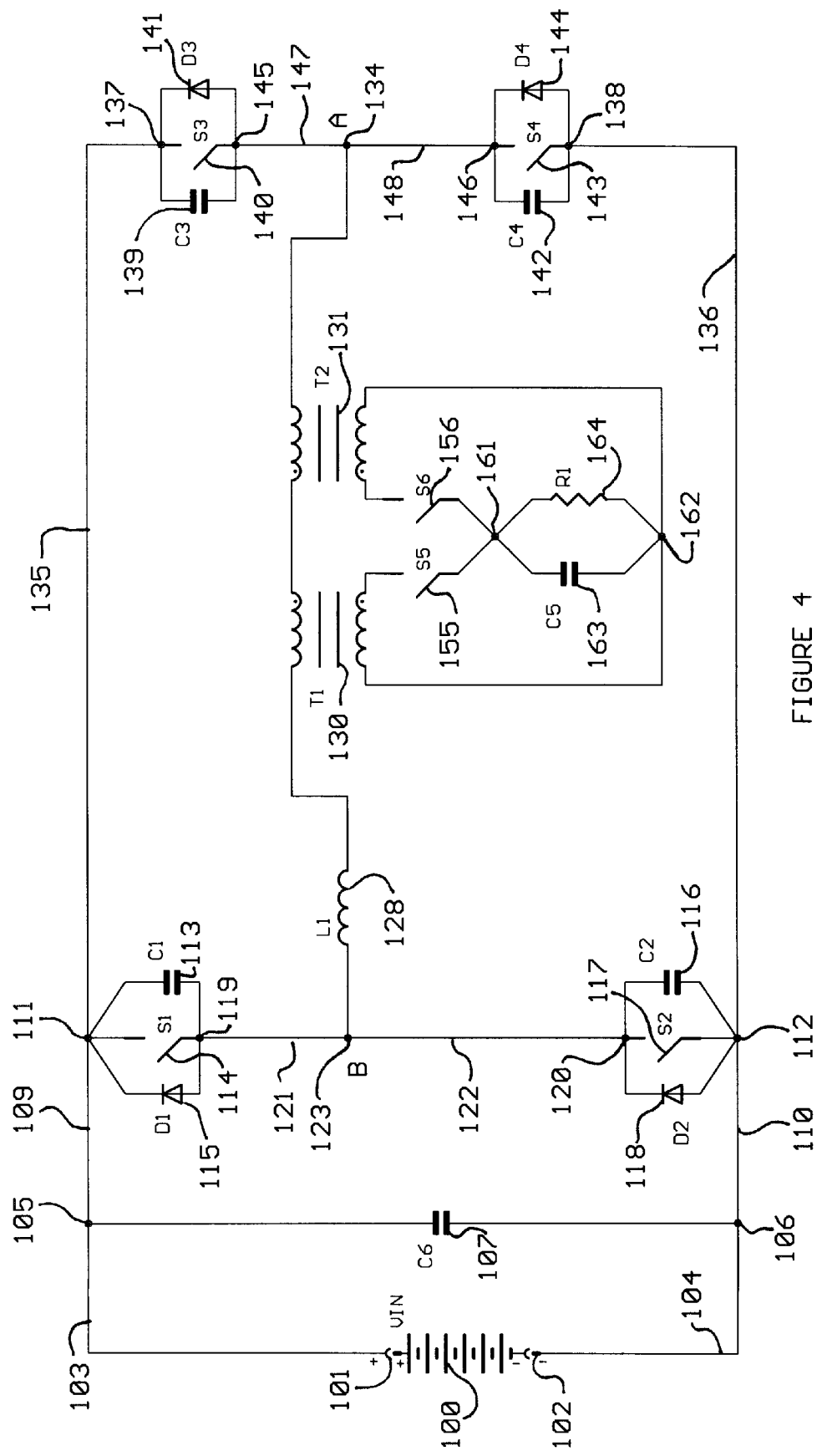
FIG. 4 illustrates a circuit schematic drawing of a soft switching, phase shift modulated, full bridge, dual opposed interleaved coupled inductor buck converter according to the subject invention.

Referring to FIG. 4, there is shown a series type power processing topology. The circuit employs a source of substantially DC voltage, a primary switching network consisting of four switches in a full bridge arrangement that generates alternating bidirectional voltage pulses, a pair of coupled inductors arranged so that the primary windings of the two coupled inductors are in series and their secondary windings are connected at a point that is also common to a load and output filter capacitor, a small inductor placed in series with the primary windings of the coupled inductors, a pair of power switches, one in series with each coupled inductor secondary winding and connected to each other at a point which is also common to the output filter capacitor and the load. For purposes of the operational state analysis, it is assumed that the filter capacitor is sufficiently large that the voltage developed across the capacitor is approximately constant over a switching interval. Also for purposes of the operational state analysis, it is assumed that the input DC voltage source has sufficiently low source impedance that the voltage developed across the input DC voltage source is approximately constant over a switching interval. It will be assumed that the parasitic capacitors that parallel the switches are small and their effects can be ignored, except during the switching transitions. It will be assumed that the coupled inductor windings are coupled with a coupling coefficient of unity. It will be assumed that diodes are ideal and have no leakage and no forward voltage drop. It will finally be assumed that the power switches are ideal; that is, lossless and able to carry current in either direction. Moreover it will be recognized by one skilled in the art that, while only a single output version is considered in this analysis, multiples of voltages may be obtained through the addition of windings, switches, diodes, and capacitors operated as herein to be described.

STRUCTURE

The circuit structure is illustrated in FIG. 4. A positive terminal 101 of a source of DC potential, $V_{IN}$, 100 is connected to a lead 103. The lead 103 is connected to a node 105. A negative terminal 102 of source 100 is connected to a lead 104 which is connected to a node 106. A first terminal of an input capacitor 107 is connected to the node 105. A second terminal of the input capacitor 107 is connected to the node 106. The node 105 is connected to a lead 109. The lead 109 is connected to a node 111. The node 106 is connected to a lead 110 which is connected to a node 112. Node 111 is connected to a lead 135. Lead 135 is connected to a node 137. Node 112 is connected to a lead 136. Lead 136 is connected to a node 138. A first terminal of a capacitor 113 is connected to node 111. A second terminal of the capacitor 113 is connected to a node 119. A first terminal of a switch 114 is connected to node 111. A second terminal of the switch 114 is connected to the node 119. A cathode terminal of a diode 115 is connected to the node 111. An anode terminal of the diode 115 is connected to the node 119. A first terminal of a capacitor 116 is connected to the node 112. A second terminal of the capacitor 116 is connected to a node 120. A first terminal of a switch 117 is connected to the node 112. A second terminal of the switch 117 is connected to the node 120. An anode terminal of a diode 118 is connected to the node 112. A cathode terminal of the diode 118 is connected to the node 120. The node 119 is connected to a lead 121. The node 120 is connected to a lead 122. Lead 121 and lead 122 are connected at a node 123, labeled B in FIG. 4. A first terminal of a capacitor 139 is connected to the node 137. A second terminal of the capacitor 139 is connected to a node 145. A first terminal of a switch 140 is connected to the node 137. A second terminal of the switch 140 is connected to the node 145. A cathode terminal of the diode 141 is connected to the node 137. An anode terminal of the diode 141 is connected to the node 145. A first terminal of a capacitor 142 is connected to the node 138. A second terminal of the capacitor 142 is connected to a node 146. A first terminal of a switch 143 is connected to the node 138. A second terminal of the switch 143 is connected to the node 146. An anode terminal of a diode 144 is connected to the node 138. A cathode terminal of the diode 144 is connected to the node 146. The node 145 is connected to a lead 147. The node 146 is connected to a lead 148. The lead 147 and the lead 148 are connected at a node 134, labeled A in FIG. 4. A first terminal of an inductor 128 is connected to the node 123. A second terminal of the inductor 128 is connected to an undotted terminal of the primary winding of a coupled inductor 130. A dotted terminal of the primary winding of the coupled inductor 130 is connected to a dotted terminal of a primary winding of a coupled inductor 131. An undotted terminal of the primary winding of the coupled inductor 131 is connected to the node 134.

In the secondary circuit a dotted terminal of a secondary winding of the coupled inductor 130 is connected to a first terminal of a switch 155. An undotted terminal of the secondary winding of the coupled inductor 130 is connected to a node 162. A second terminal of the switch 155 is connected to a node 161. A dotted terminal of a secondary winding of the coupled inductor 131 is connected to a first terminal of a switch 156. An undotted terminal of the secondary winding of the coupled inductor 131 is connected to the node 162. A second terminal of the switch 156 is connected to the node 161. The node 161 is connected to a first terminal of a capacitor 163. A second terminal of the capacitor 163 is connected to the node 162. A first terminal of a load 164 is connected to the node 161. A second terminal of the load 164 is connected to the node 162.

OPERATION

It is assumed in this analysis that the system has reached a settled operating condition. Except for the short, but finite, switching intervals there are four states of the circuit of FIG. 4, two on states and two off states. It is also assumed, for purpose of analysis, that the switching intervals between the states are approximately zero seconds and that capacitors 113, 116, 139, and 142 are small and do not contribute significantly to the operation of the converter, except during the brief switching transitions.

Figure 5:
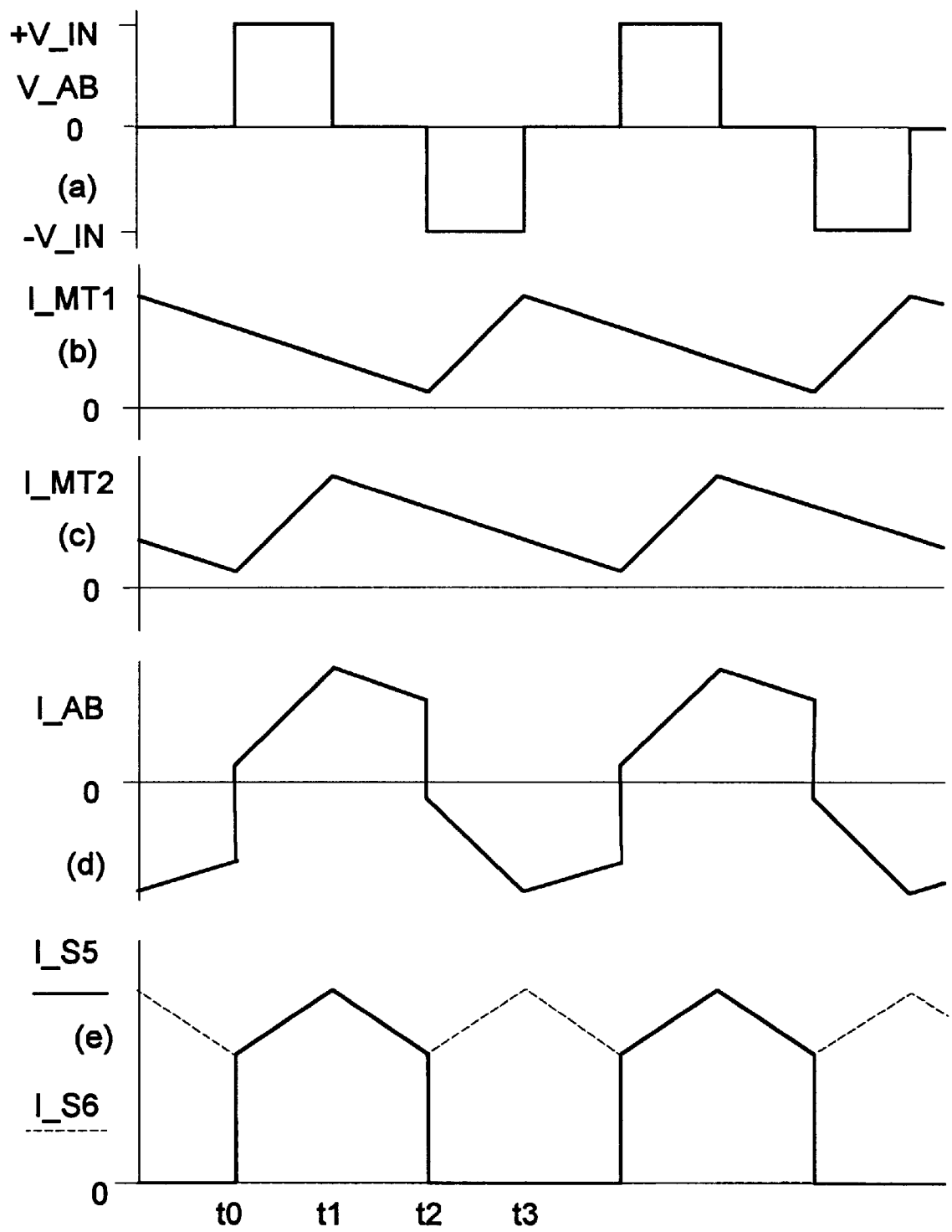
FIG. 5a illustrates the wave form of the voltage applied to the primary circuit.
FIG. 5b illustrates the wave form of the magnetizing current in the first coupled inductor.
FIG. 5c illustrates the wave form of the magnetizing current in the second coupled inductor.
FIG. 5d illustrates the wave form of the current in the primary circuit.
FIG. 5e illustrates the wave forms of the currents in the secondary windings of the coupled inductors.
Figure 6:
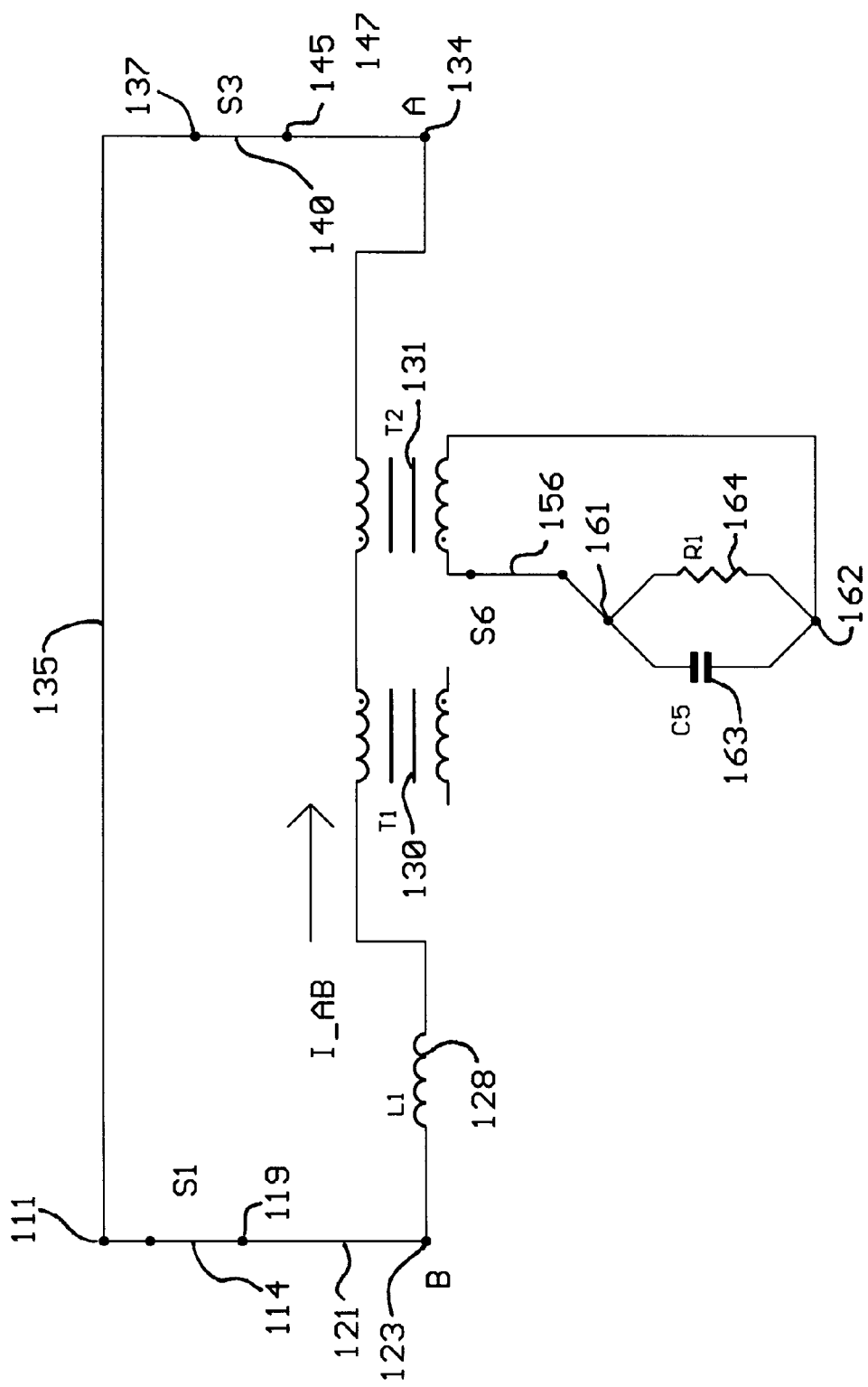
FIG. 6 illustrates an initial condition and second off state of the FIG. 4 converter.
Figure 7:
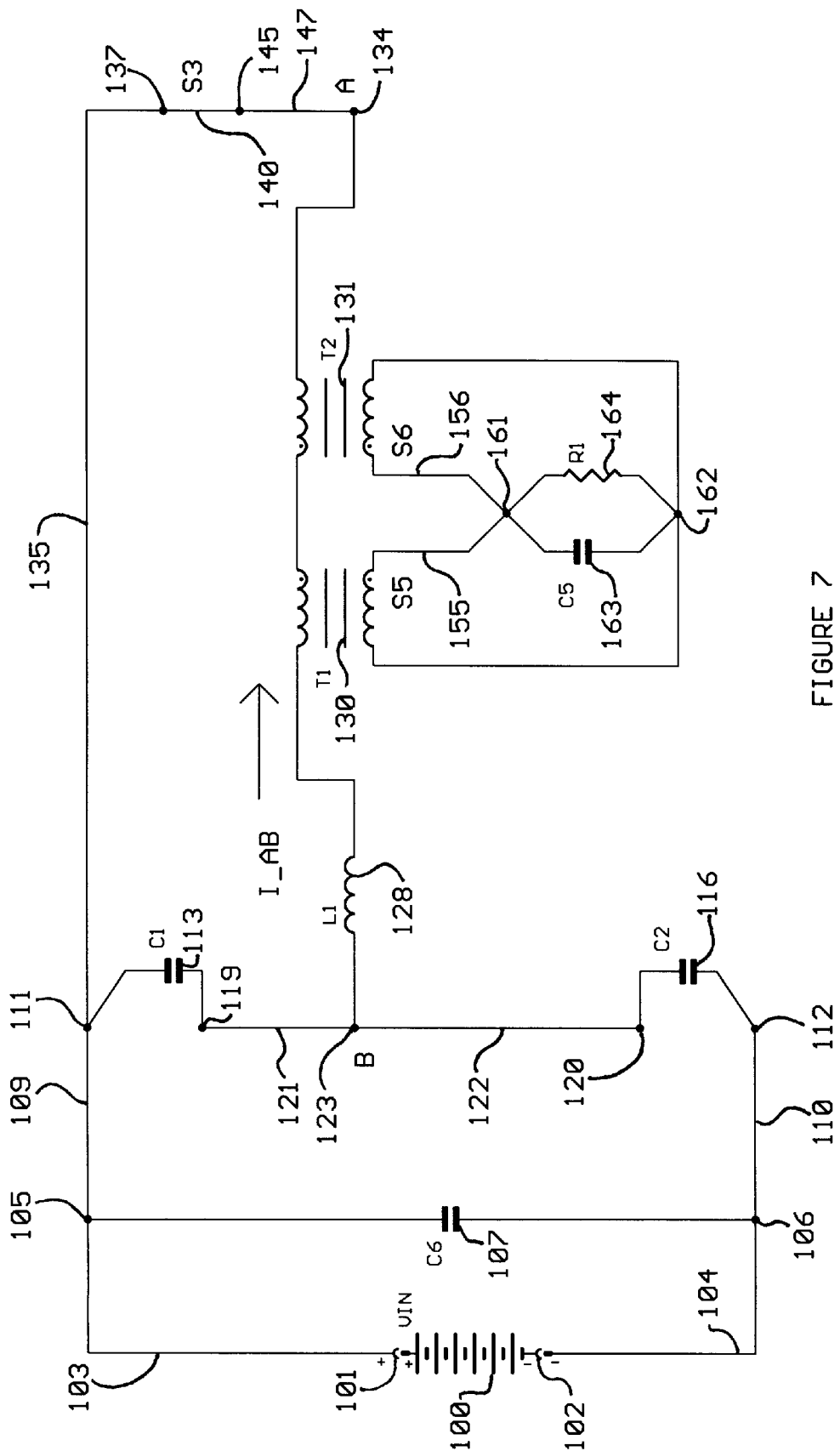
FIG. 7 illustrates a first phase of a first turn on switching transition of the FIG. 4 converter.
Figure 8:
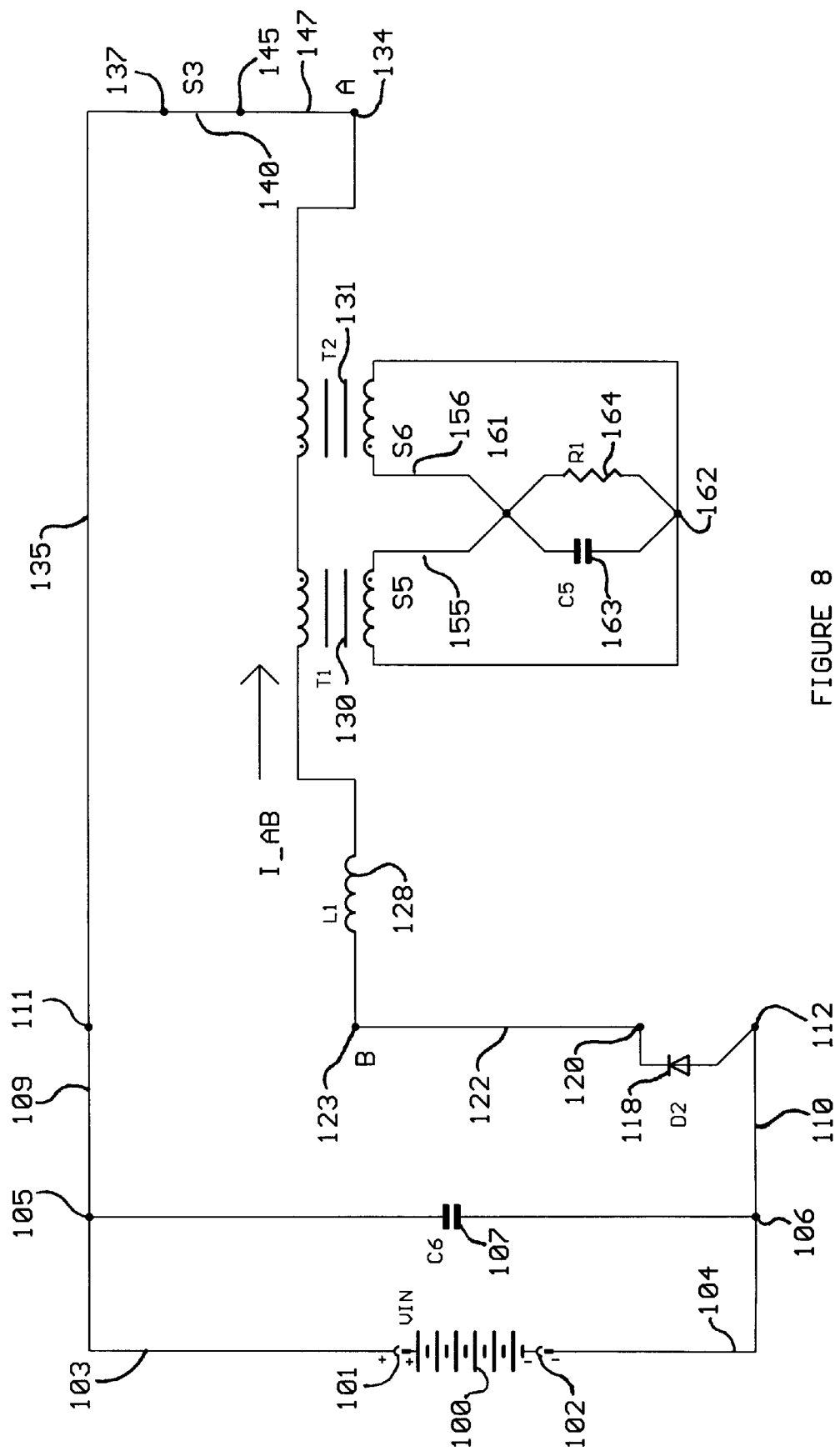
FIG. 8 illustrates a second phase of a first turn on switching transition of the FIG. 4 converter.
Figure 9:
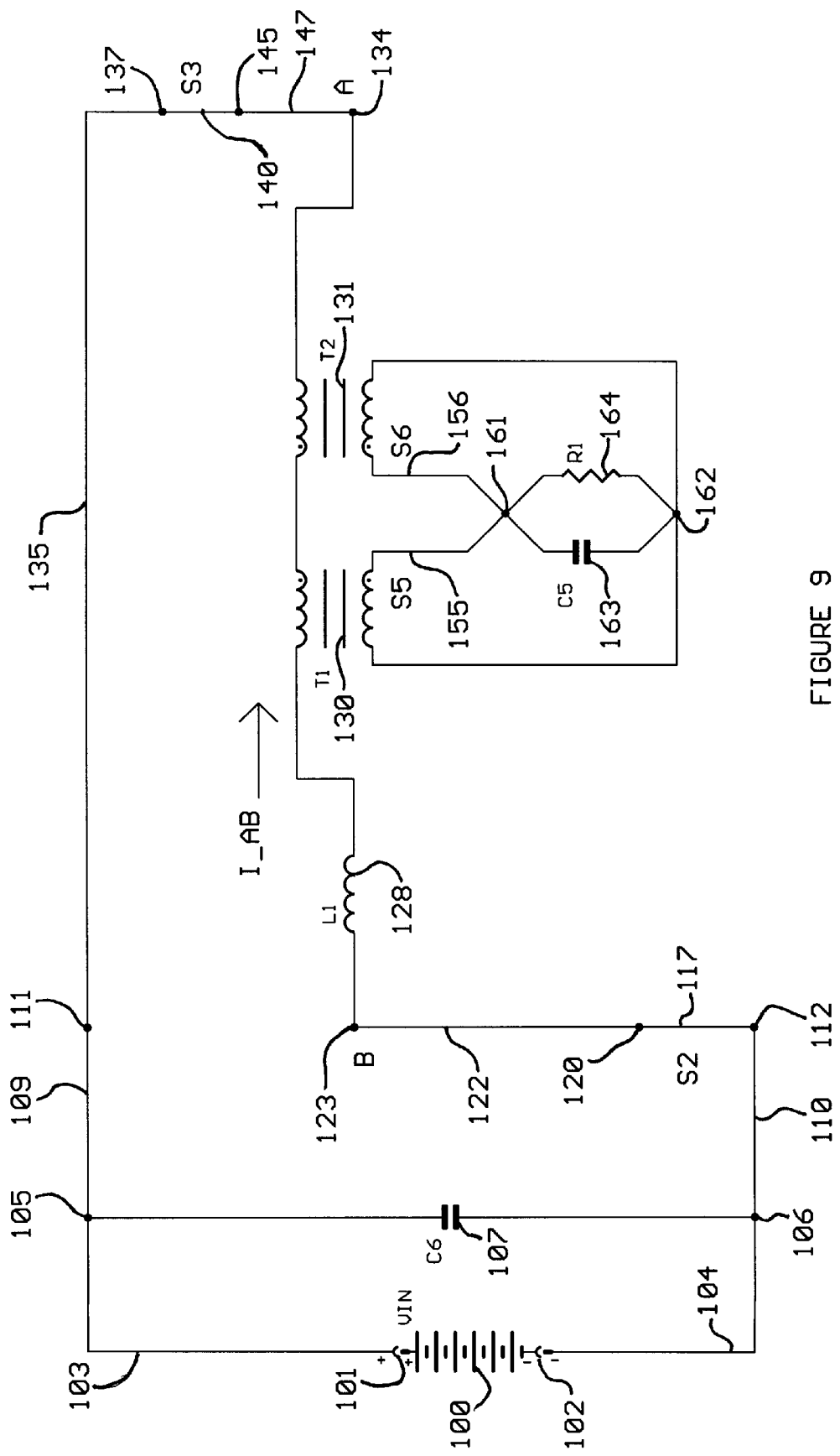
FIG. 9 illustrates a third phase of a first turn on switching transition of the FIG. 4 converter.
Figure 10:
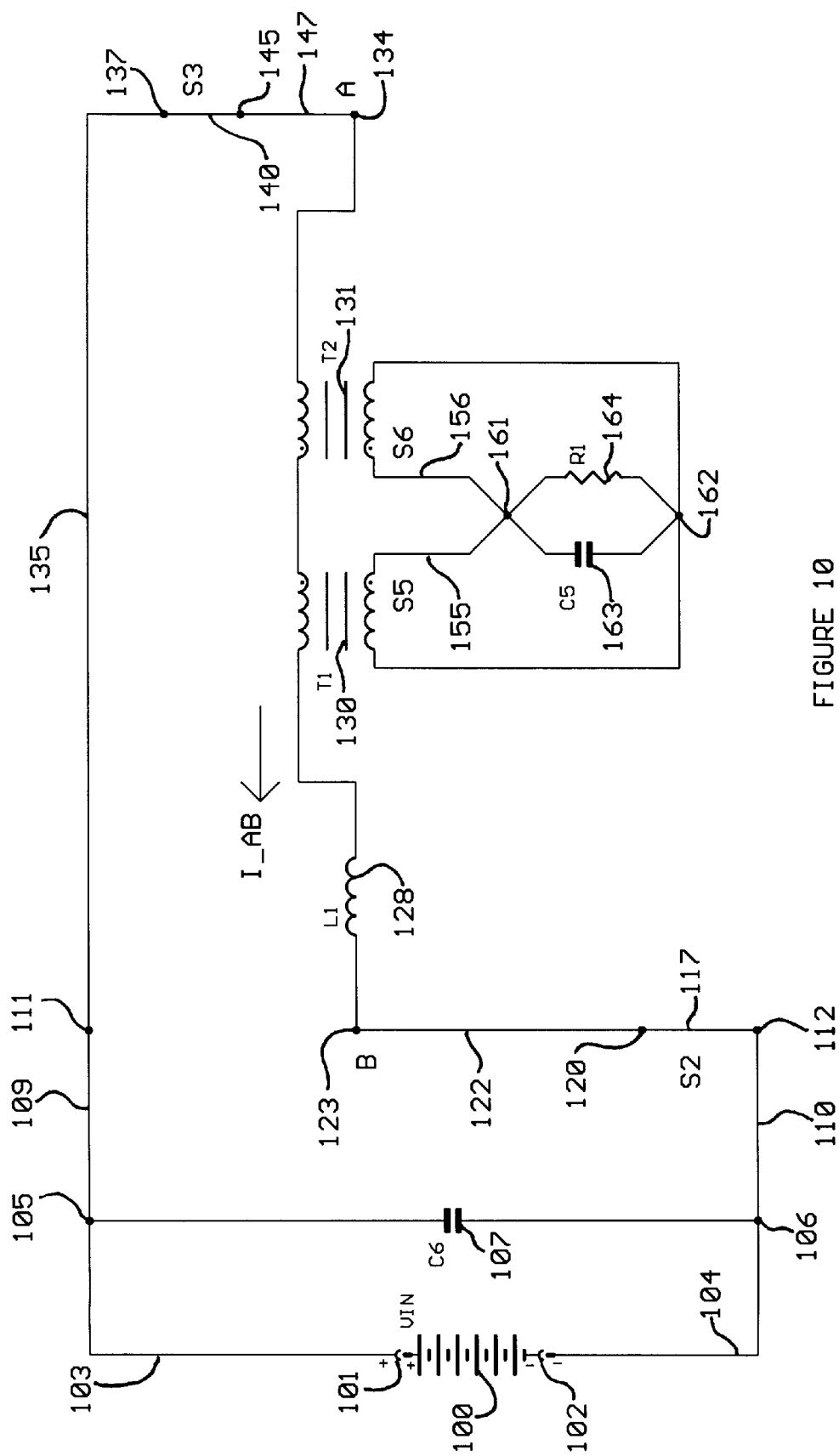
FIG. 10 illustrates a fourth phase of a first turn on switching transition of the FIG. 4 converter.
Figure 11:
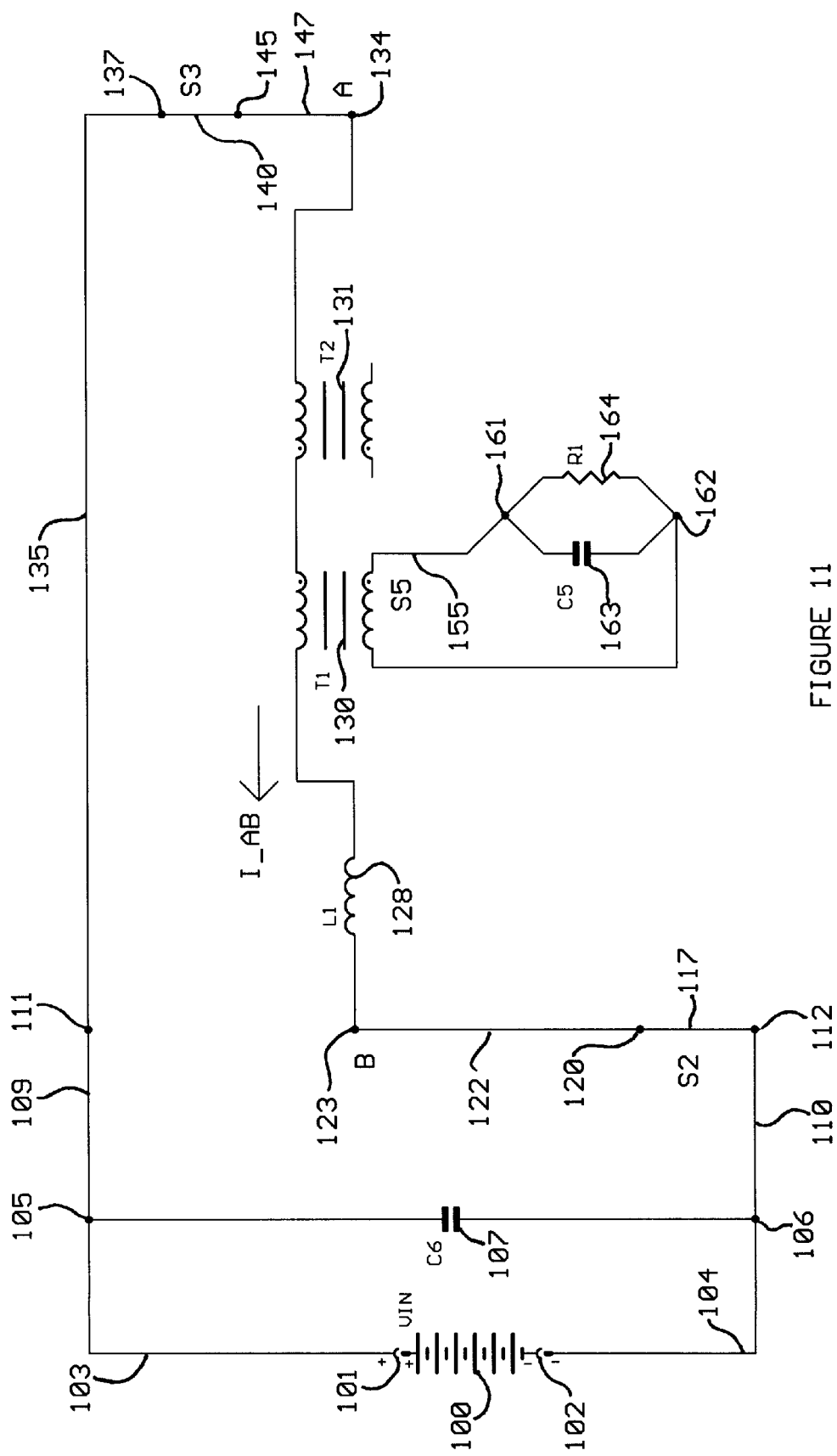
FIG. 11 illustrates a first on state of the FIG. 4 converter.
Figure 12:
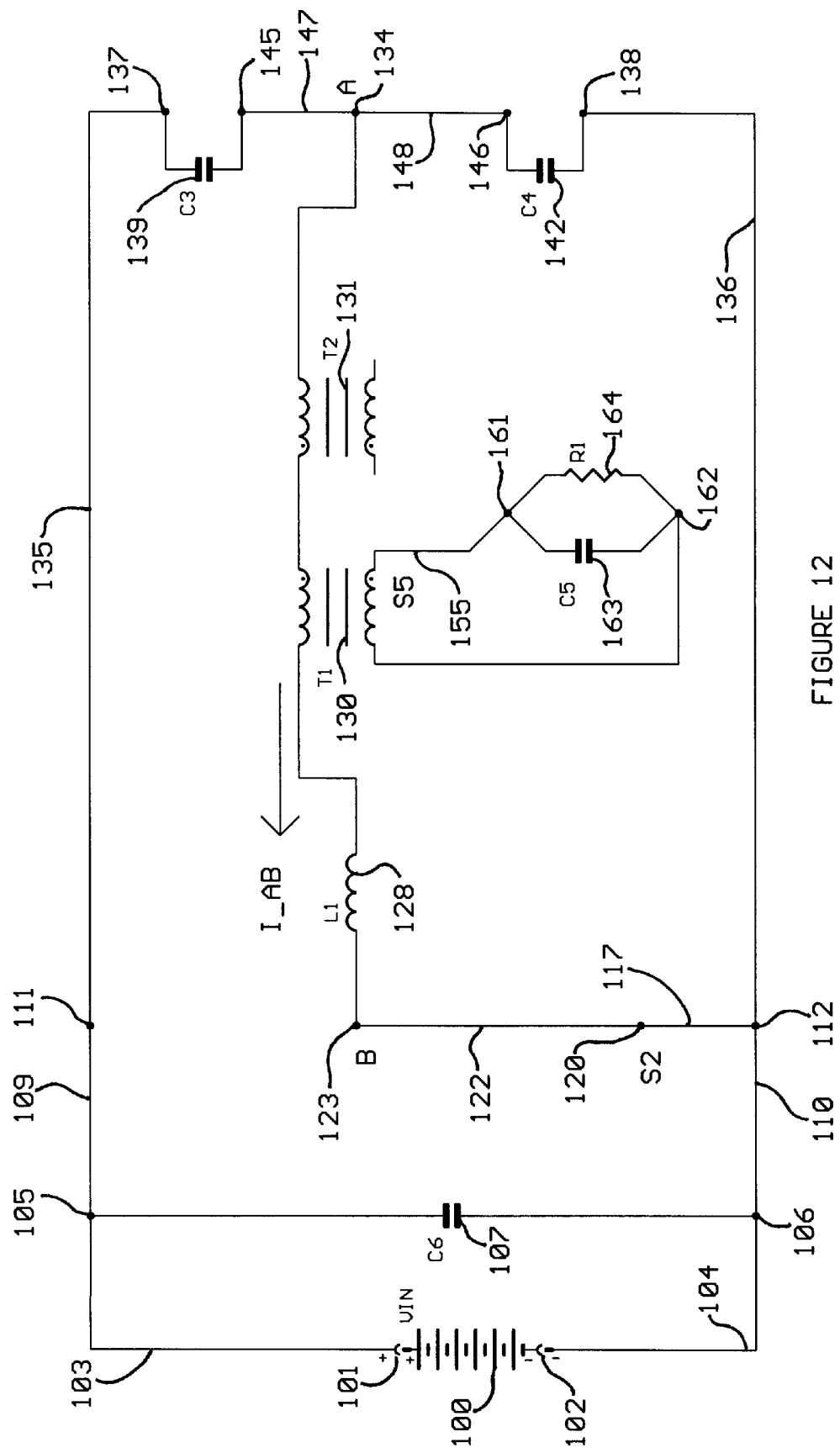
FIG. 12 illustrates a first phase of a first turn off transition of the FIG. 4 converter.
Figure 13:
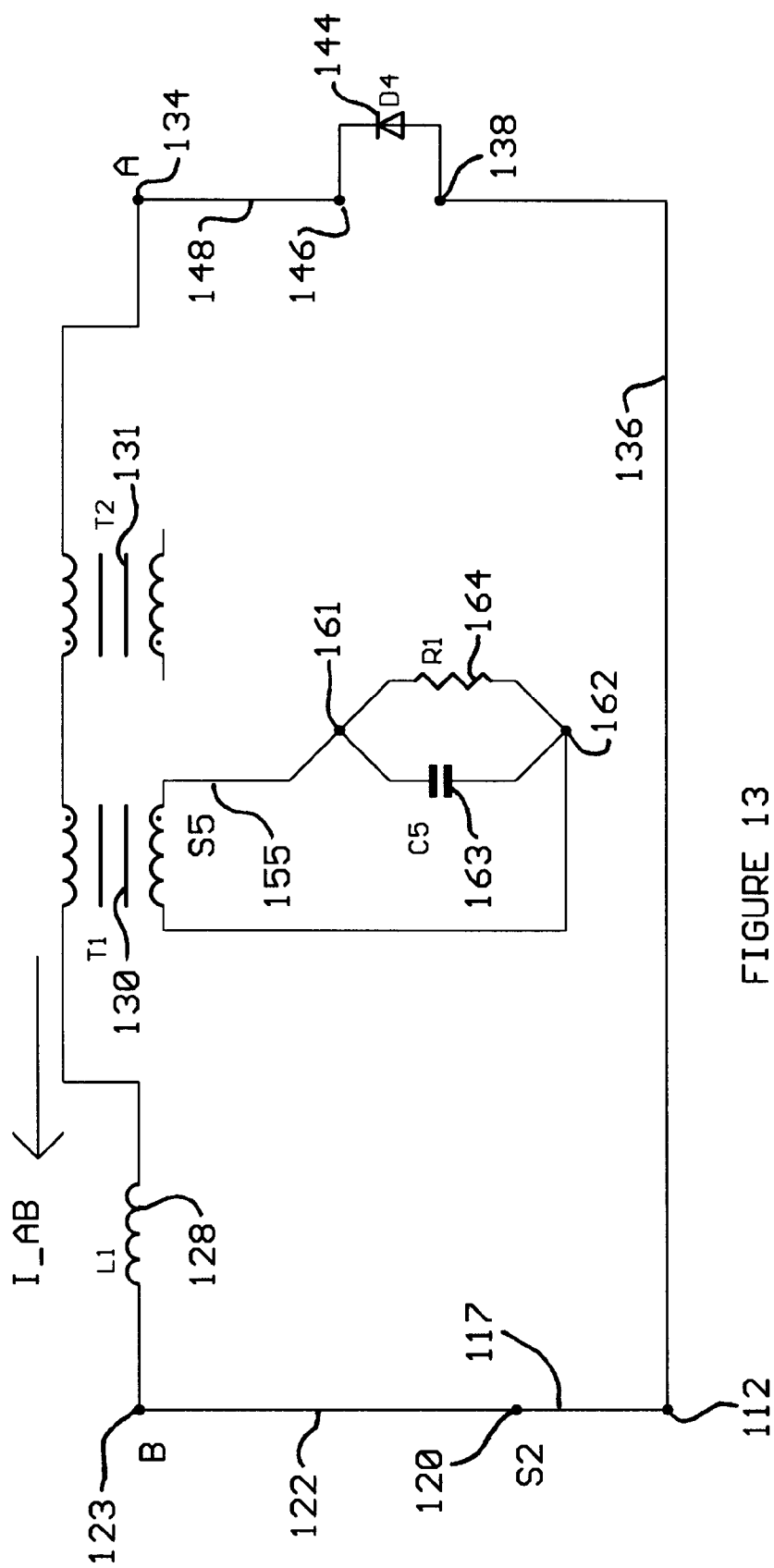
FIG. 13 illustrates a second phase of a first turn off transition of the FIG. 4 converter.
Figure 14:
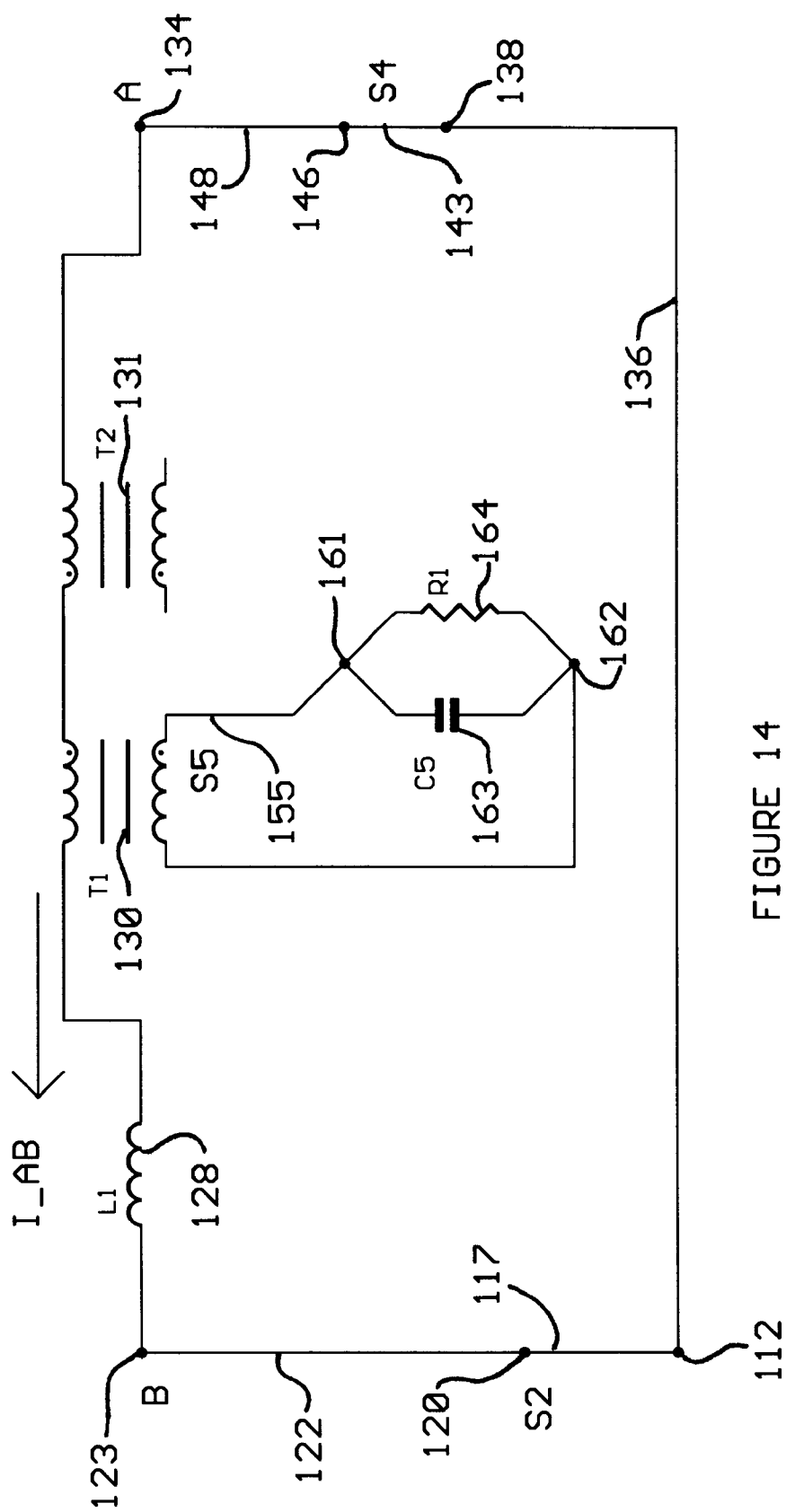
FIG. 14 illustrates a first off state of the FIG. 4 converter.
Figure 15:
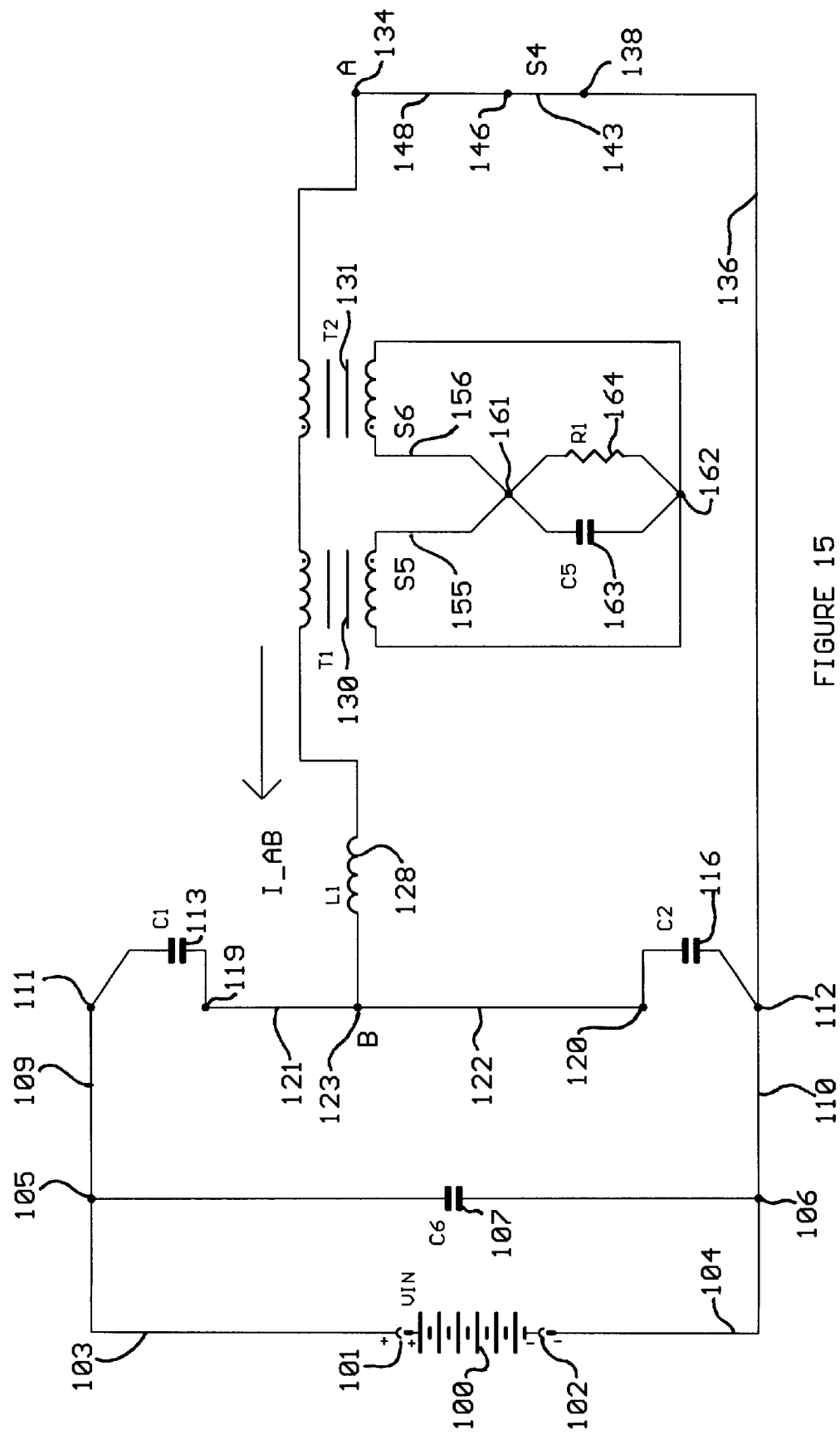
FIG. 15 illustrates a first phase of a second turn on transition of the FIG. 4 converter.
Figure 16:
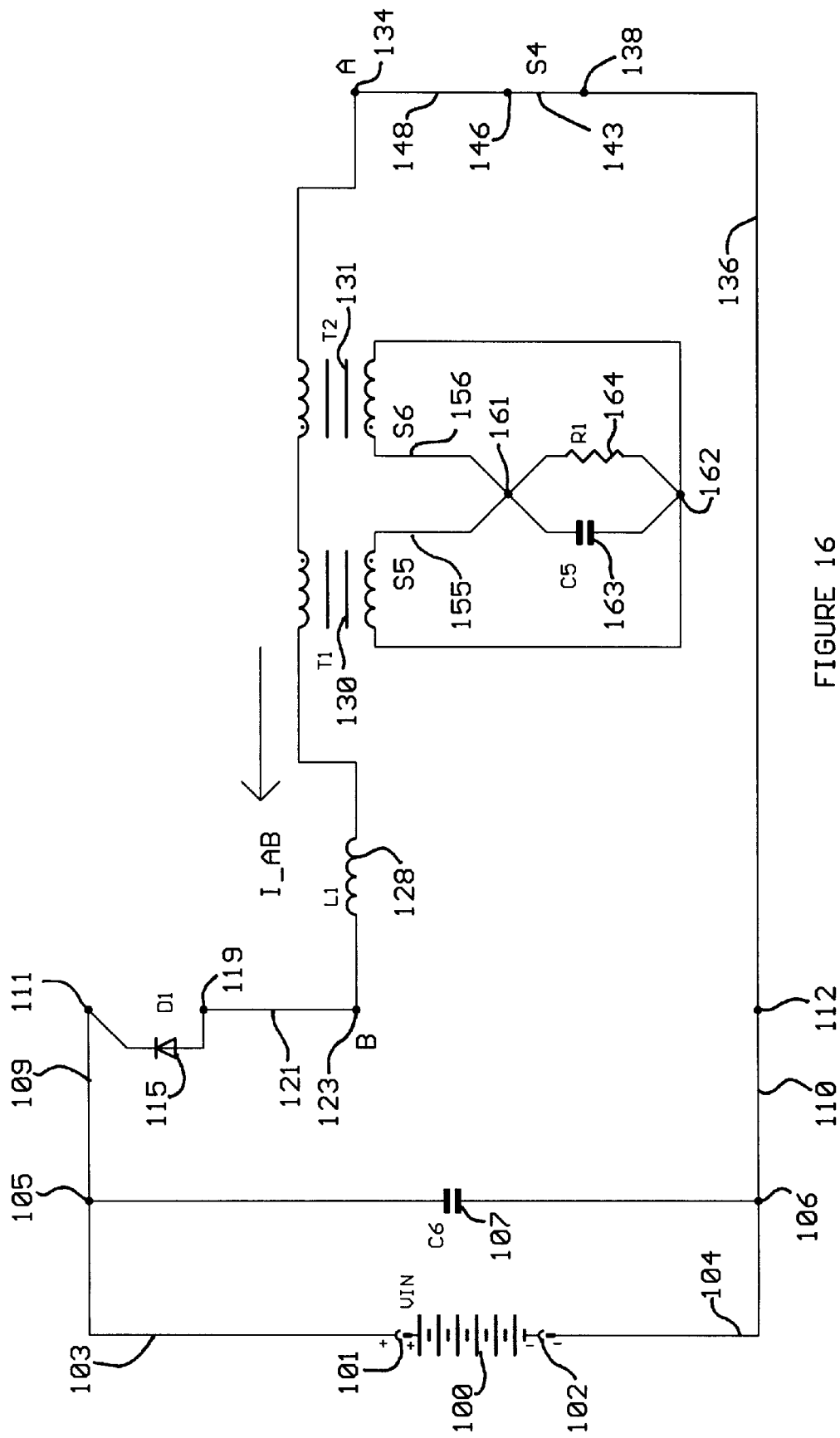
FIG. 16 illustrates a second phase of a second turn on transition of the FIG. 4 converter.
Figure 17:
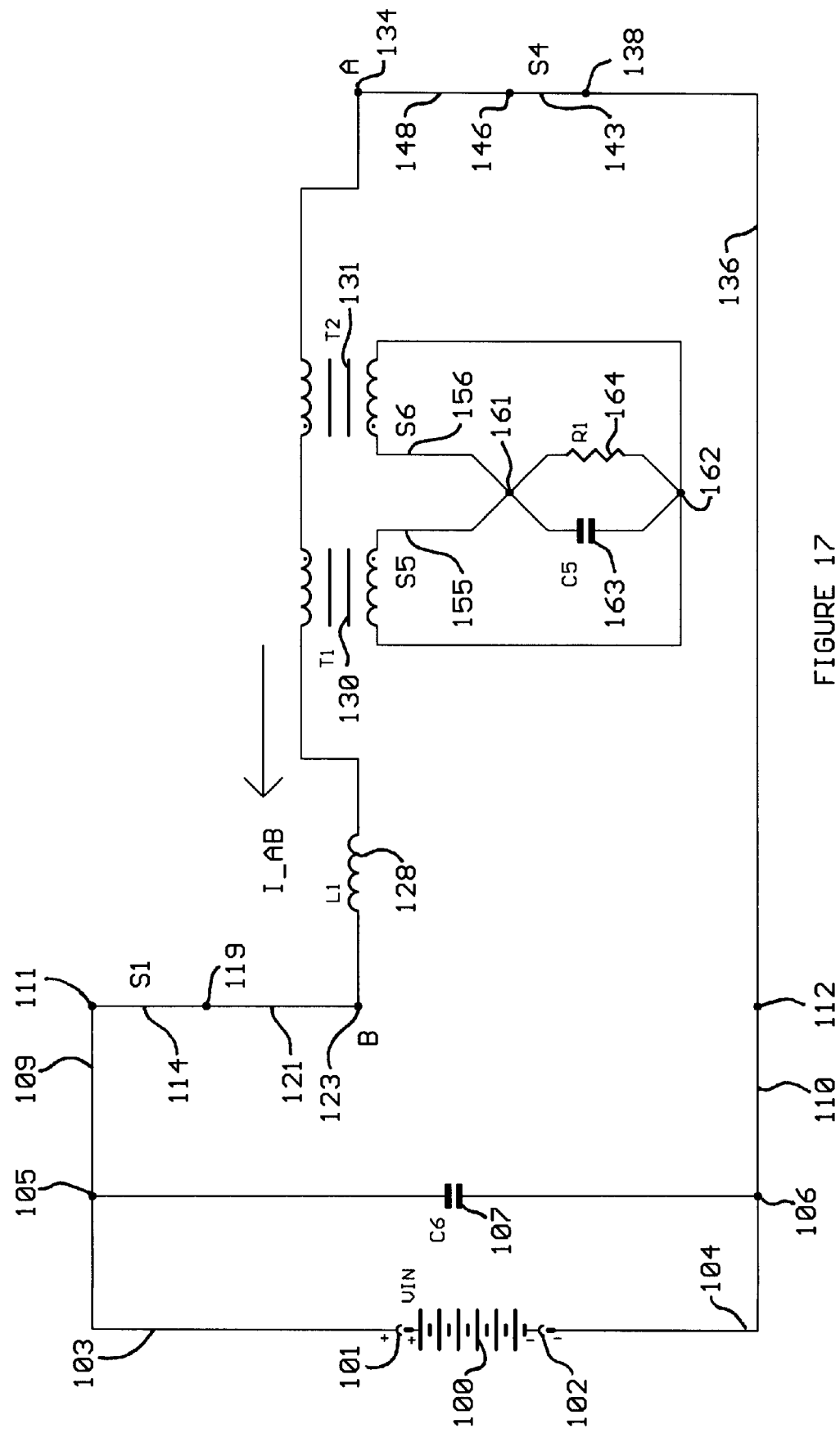
FIG. 17 illustrates a third phase of a second turn on transition of the FIG. 4 converter.
Figure 18:
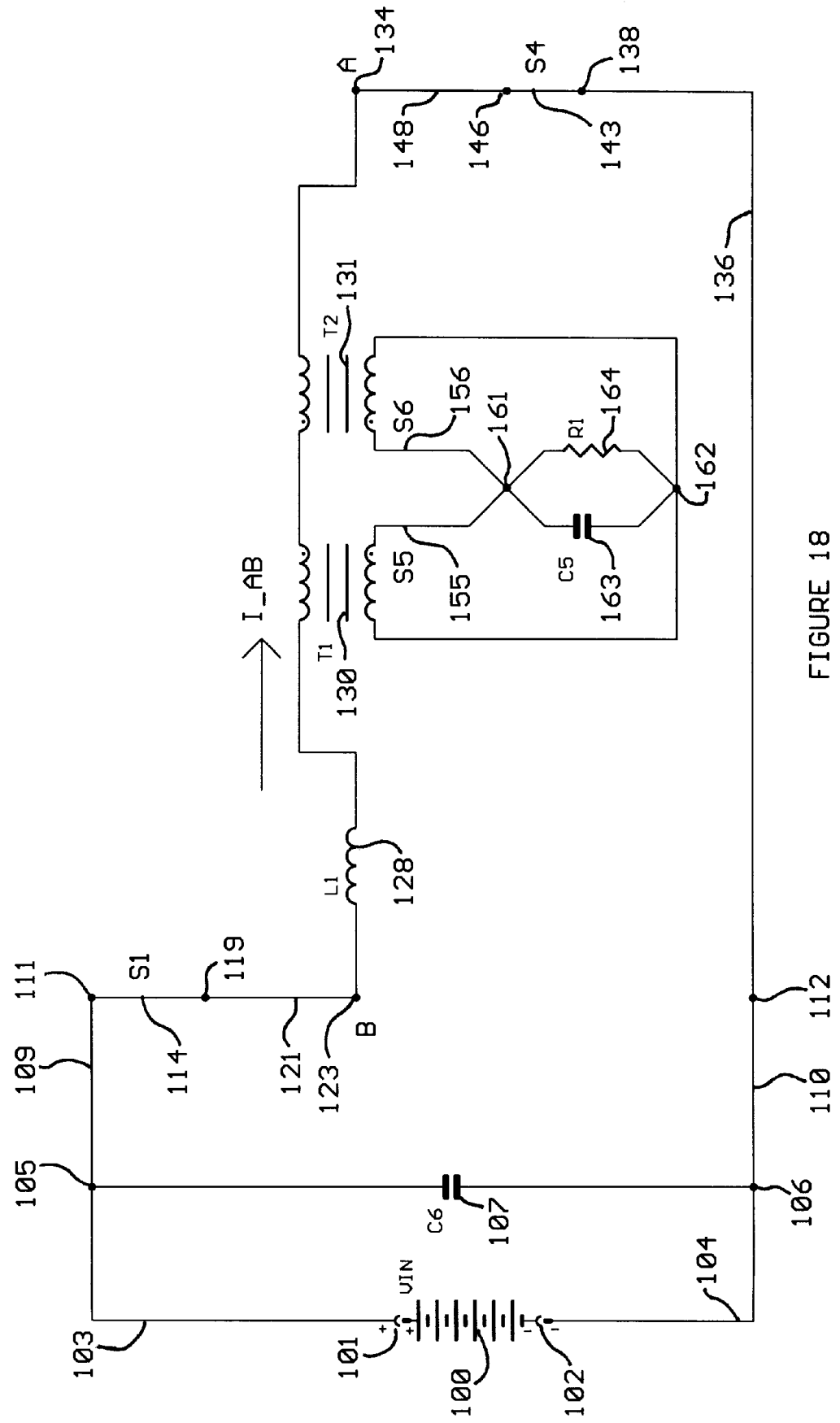
FIG. 18 illustrates a fourth phase of a second turn on transition of the FIG. 4 converter.
Figure 19:
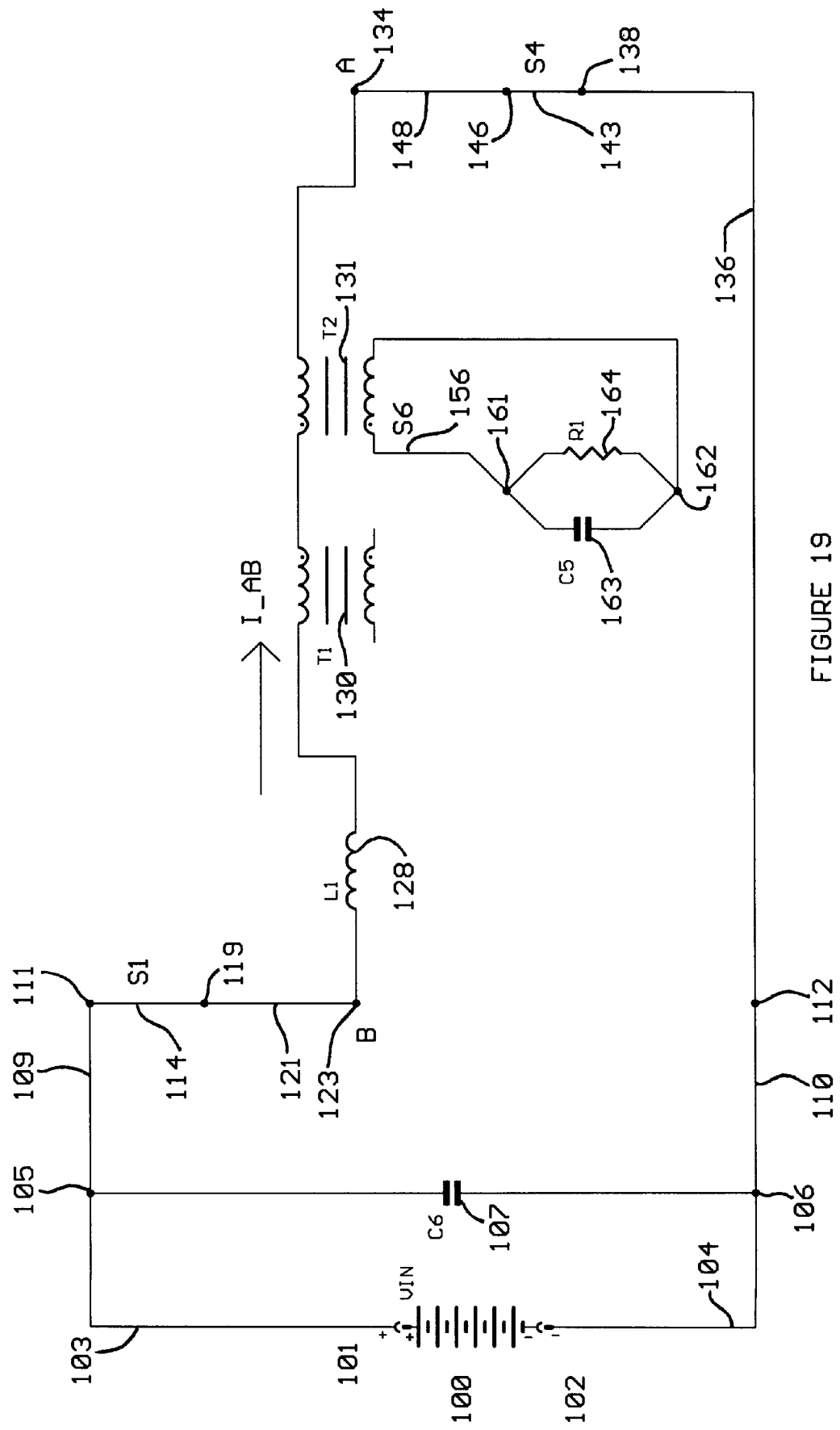
FIG. 19 illustrates a second on state of the FIG. 4 converter.
Figure 20:
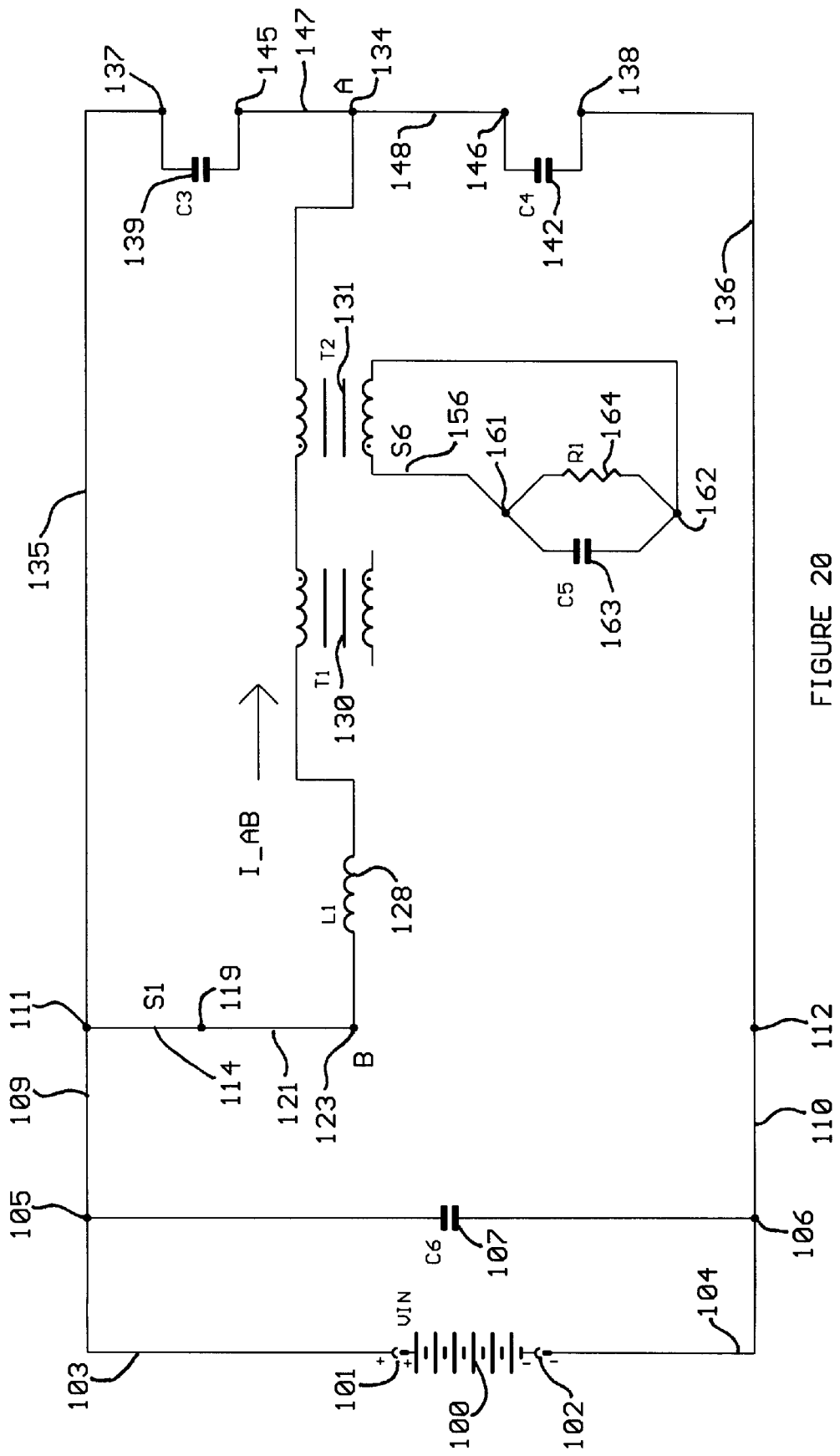
FIG. 20 illustrates a first phase of a second turn off transition of the FIG. 4 circuit.
Figure 21:
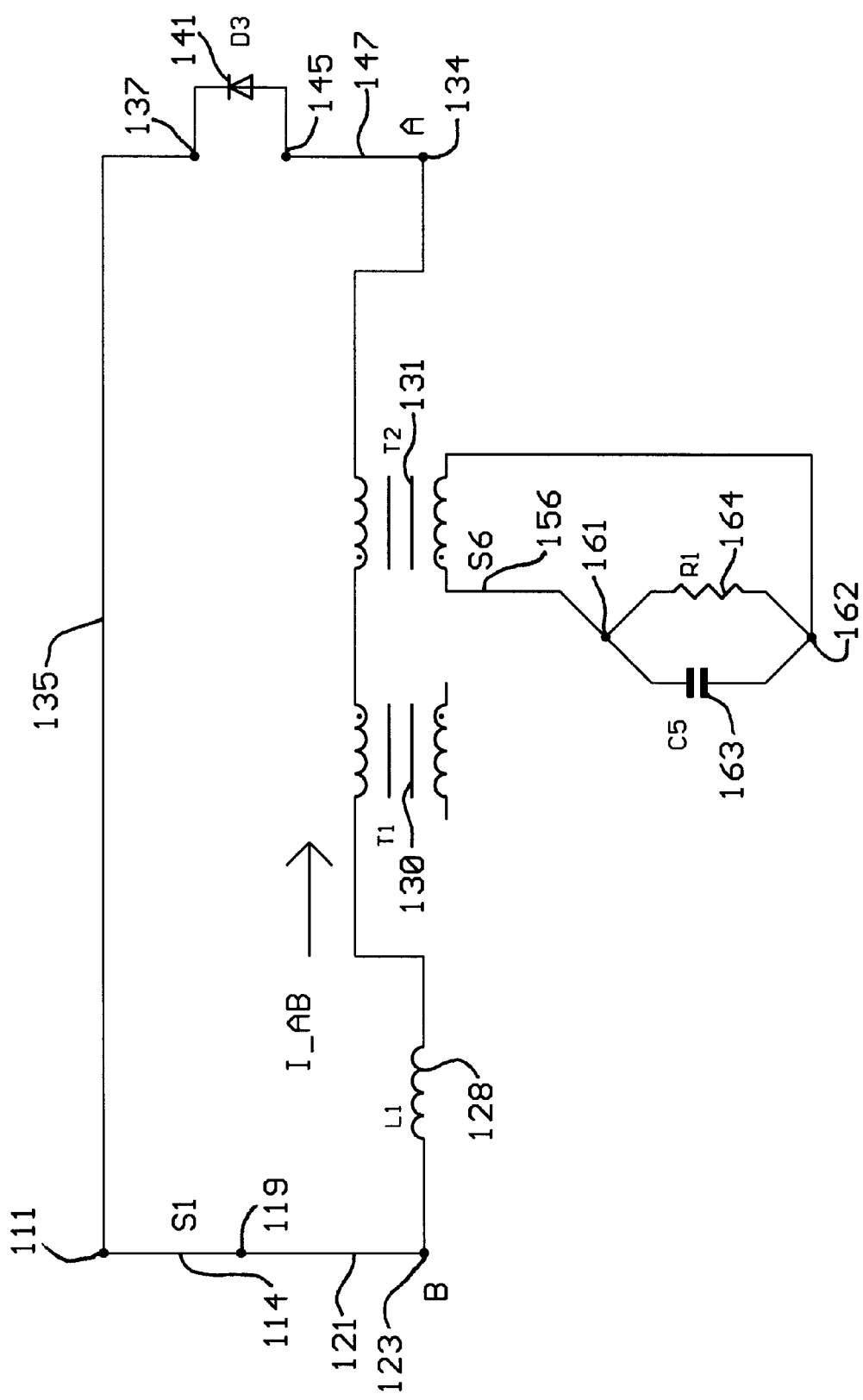
FIG. 21 illustrates a second phase of a second turn off transition of the FIG. 4 circuit.

In operation consider an initial condition, illustrated in FIG. 6, in which the voltage difference between points A and B, labeled V_AB in FIG. 5a, is substantially zero and current is flowing through the primary windings from B towards A. The current flowing in the primary windings of coupled inductors 130 and 131, labeled I_AB in FIG. 5d, is negative. During this initial condition, the switches 114 and 140 are closed (on) and switches 117 and 143 are open (off) and switch 156 is closed (on) and switch 155 is open (off). During this initial condition, coupled inductors 130 and 131 each have a substantial amount of stored energy, but the magnetizing currents of coupled inductors 130 and 131 referred to their primary windings are oppositely directed. Let us define that the magnetizing current is flowing in a positive direction when the current flows from the undotted terminal, through the winding, to the dotted terminal. For coupled inductor 130 the secondary current is zero and the primary current is equal to its magnetizing current, and the magnetizing current of coupled inductor 130, referred to the primary winding, labeled I_MT1 in FIG. 5b, is positive, since the current is flowing through the coupled inductor 130 primary winding from the undotted terminal to the dotted terminal. During the initial condition, the current I_AB is equal in magnitude and direction to the magnetizing current, referred to the primary winding, of coupled inductor 130. During the initial condition, the magnetizing current, referred to the primary winding, of coupled inductor 131, is in the positive direction and directed in opposition to the current I_AB. The total current in the primary winding of coupled inductor 131 is equal to the current I_AB and is composed of two components. One component of the total primary winding current of coupled inductor 131 is its magnetizing current and the other component is the induced current from the secondary winding of coupled inductor 131. The induced current component of the primary winding current of coupled inductor 131 is equal to the current flowing in the secondary winding of coupled inductor 131 multiplied by the ratio of the secondary winding turns of coupled inductor 131 to the primary winding turns of coupled inductor 131. Alternately, the current flowing in the secondary winding of coupled inductor 131 is equal to the vector sum of (1) the total current flowing in the primary winding of coupled inductor 131 multiplied by its turns ratio and (2) the magnetizing current of coupled inductor 131, referred to the secondary winding. In this case the vector sum is equal to the sum of the magnitudes of the total primary winding current and the magnetizing current of coupled inductor 131 so that, if we assume a turns ratio of unity, the secondary winding current of coupled inductor 131 will be larger in magnitude than the primary winding current of inductor 131. Another way to understand this situation is to consider that coupled inductor 131 magnetizing current is flowing in its secondary winding and that the magnetizing current component of the secondary winding current is supplemented by a contribution of current, induced from the primary winding, equal to the total primary winding current multiplied by the ratio of primary winding turns to secondary winding turns. During the initial condition, the dotted terminal of each coupled inductor winding is positive with respect to the negative terminal of each winding. The voltage V_AB is zero during the initial condition. Therefore, the primary winding voltage of coupled inductor 130 must be equal in magnitude to the primary winding voltage of coupled inductor 131 minus the winding voltage of the inductor L1. The magnitude of the voltage on the secondary winding of coupled inductor 131 is equal to the output voltage of the circuit. The magnitude of the voltage of the primary winding of coupled inductor 131 is equal to the secondary winding voltage of coupled inductor 131 multiplied by the ratio of the primary winding turns of coupled inductor 131 to the secondary winding turns of coupled inductor 131. The magnitude of the voltage of the primary winding of coupled inductor 130 is equal to the magnitude of the primary winding voltage of coupled inductor 131 minus the voltage of the inductor 128. The magnitude of the secondary winding voltage of coupled inductor 130 is equal to the magnitude of the primary winding voltage of coupled inductor 130 multiplied by the ratio of the primary winding turns of coupled inductor 130 to the secondary winding turns of coupled inductor 130. During the initial condition, the winding voltages of inductors 128, 130, and 131 are directed so that their stored energies and their magnetizing currents are decreasing. The circuit currents are illustrated in FIGS. 5b through 5e. At a time determined by the control circuit, the primary switching network changes state, so that switch 114 is opened (turned off). This condition is illustrated in FIG. 7. The current in the primary windings, flowing from B to A, is maintained by the stored energy in the inductor 128 and this current charges capacitor 113 and discharges capacitor 116. Shortly after switch 114 is opened switch 155 is closed. While the charging and discharging of capacitors 113 and 116, respectively, is taking place, the voltage at B, which is node 123, is falling and, eventually, diode 118 becomes forward biased and begins to conduct, as illustrated in FIG. 8. As diode 118 is conducting, the voltage at B is clamped to a voltage substantially equal to the voltage at the negative terminal of V_IN. Shortly after diode 118 begins to conduct, switch 117 is closed (turned on) at substantially zero voltage, as illustrated in FIG. 9. After switch 117 is closed, the current in the primary windings changes rapidly due to the large voltage applied to inductor 128 and reverses direction, as illustrated in FIG. 10. At the same time the current in the secondary winding of coupled inductor 131 falls rapidly as the current in the secondary winding of coupled inductor 130 increases rapidly. When the current in the secondary winding of coupled inductor 131 drops to zero switch 156 is turned off (opened), as illustrated in FIG. 11. When switch 156 is turned off the primary winding voltage of coupled inductor 131 and the inductor 128 voltage change rapidly. FIG. 11 illustrates a first on state in which the magnetizing current and stored energy in the coupled inductor 131 increase provided by energy from source V_IN 100. During the first on state, current flows from right to left in FIG. 4 and from A to B in inductor 128 and the primary windings of coupled inductors 130 and 131. During the first on state, the voltage V_AB is positive and the current I_AB is positive, as illustrated in FIG. 5a and FIG. 5d, respectively. The current in the secondary winding of coupled inductor 130 has two components. One component of the current in the secondary winding of coupled inductor 130 is due to the decreasing magnetizing current in coupled inductor 130 and the second component is due to the increasing reflected (induced) primary winding current. The magnetizing current in the secondary winding of coupled inductor 130 is decreasing because the dotted terminals of the windings of coupled inductor 130 are positive with respect to the undotted terminals of the windings of coupled inductor 130. The reflected (induced) primary current is increasing because the primary current of coupled inductor 130 is equal to the primary magnetizing current of coupled inductor 131, which is increasing. The magnetizing current of coupled inductor 131 is increasing because the undotted terminals of the windings of coupled inductor 131 are positive with respect to the dotted terminals of the windings of coupled inductor 131. The result of both increasing and decreasing components of secondary winding current of coupled inductor 131 is a secondary winding current of coupled inductor 131 that increases. During the first on state, the secondary winding voltage of coupled inductor 130 is equal to the output voltage. The voltage of the primary winding of coupled inductor 130 is equal to the output voltage multiplied by the ratio of the primary turns to the secondary turns of coupled inductor 130. The voltage applied to the primary winding of coupled inductor 131 is equal to the source voltage, V_IN, minus the voltage of the primary winding of coupled inductor 130 minus the voltage applied to inductor 128. During the first on state both the stored energy and the magnetizing current in coupled inductor 131 increase. Since the inductor 128 and coupled inductor 131 are in series the current in inductor 128 is equal to the current in coupled inductor 131 and the energy stored in inductor 128 is increasing during the first on state. The first on state comes to an end at a time determined by the control circuit when switch 140 is opened (turned off), as illustrated in FIG. 12. The stored energies in inductor 128 and coupled inductor 131 maintains the current in the primary winding of coupled inductors 130 and 131 as capacitor 139 is charged and capacitor 142 is discharged. As capacitor 142 discharges, the voltage at A node 134 drops toward the voltage of the negative terminal of V_IN 102. When the voltage at A 134 reaches the voltage of the negative terminal 102 of V_IN, diode 144 begins to conduct, as illustrated in FIG. 13, and clamps the voltage at A node 134, preventing the voltage at A from dropping further. After diode 144 begins to conduct, switch 143 is closed (turned on), as illustrated in FIG. 14. The system, as illustrated in FIG. 14, is now in a first off state, in which the primary winding current is flowing from right to left or from A to B. During the first off state the magnetizing currents and stored energies in inductors 128, 130, and 131 decrease. During the first off state the secondary winding current of coupled inductor 130 decreases. The voltage across the secondary winding of coupled inductor 130 is equal to the output voltage. The voltage across the primary winding of coupled inductor 130 is equal to the secondary winding voltage of coupled inductor 130 multiplied by the ratio of the primary turns to the secondary turns of coupled inductor 130. At a time determined by the control circuit, switch 117 is turned off, as illustrated in FIG. 15. Immediately thereafter switch 156 is turned on (closed). The stored energy in inductor 128 maintains the primary winding currents of coupled inductors 130 and 131 as capacitor 116 is charged and capacitor 113 is discharged. The voltage at B, node 123, rises as capacitors 116 and 113 charge and discharge, respectively, until the voltage at B reaches the voltage at the positive terminal 101 of V_IN, at which time diode 115 begins to conduct, as illustrated in FIG. 16, and clamps the voltage at B, preventing the voltage at B from continuing to rise above the voltage at the positive terminal of V_IN. Soon after diode 115 begins to conduct, switch 114 is closed (turned on), as illustrated in FIG. 17. After switch 114 is closed, the current in switch 156 increases rapidly, as the current in switch 155 decreases rapidly. During this time the primary current magnitude will drop rapidly and change sign, as illustrated in FIG. 19. When the switch 155 drops to zero the switch 155 is opened (turned off), as illustrated in FIG. 19. The opening of switch 155 marks the beginning of a second on state. During the second on state, illustrated in FIG. 19, the secondary winding voltage of coupled inductor 131 is equal to the output voltage. The primary winding voltage of coupled inductor 131 is equal to the output voltage multiplied by the ratio of the primary turns to the secondary turns of coupled inductor 131. The primary winding voltage of coupled inductor 130 is equal to the input DC voltage, V_IN, minus the primary winding voltage of coupled inductor 131 minus the inductor 128 voltage. During the second on state, the magnetizing current and stored energy of coupled inductor 130 increase. The secondary winding current of coupled inductor 131 has two components. One component of the secondary winding current of coupled inductor 131 is equal to the decreasing magnetizing current, referred to the secondary winding, of coupled inductor 131. The second component of the secondary winding current of coupled inductor 131 is equal to the increasing reflected (induced) primary current in coupled inductor 130. The primary current of coupled inductor 131 is equal to the increasing magnetizing current of coupled inductor 130. The net current in the secondary winding of coupled inductor 131 will be increasing, during the second on state. During the second on state, the voltage V_AB is negative and the current I_AB is also negative since the voltage at B is positive with respect to the voltage at A and the current in the primary windings of coupled inductors 130 and 131 is flowing from B towards A. During the second on state, stored energy in coupled inductor 130 increases as the magnetizing current in coupled inductor 130 increases. At a time determined by the control circuit, switch 143 is opened (turned off), as illustrated in FIG. 20. The stored energy in coupled inductor 130 maintains the current in the primary windings of coupled inductors 130 and 131 and this current charges capacitor 142 and discharges capacitor 139. As capacitors 142 and 139 charge and discharge, respectively, the voltage at A rises, until diode 141 becomes forward biased, as illustrated in FIG. 21, and clamps the voltage at A to the voltage at the positive terminal of V_IN. Soon after diode 141 begins to conduct, switch 140 is closed (turned on), as illustrated in FIG. 6. The system is now in a second off state and the conditions are the same as the initial conditions, as illustrated in FIG. 6, and the process described above repeats continuously. The drive signal to switch 117 is inverted, with respect to the drive signal of switch 114, and the drive signal to switch 143 is inverted, with respect to the drive signal to switch 140, except that there are short time intervals, during which the resonant transitions take place, in which the switches are off simultaneously. Break-before-make switching, with a short, but finite, switching interval, which may be of the order of approximately 20 to 2000 nanoseconds, is adopted in the implementation of zero voltage switching. Each of the switching transitions of switches 114, 117, 140, and 143 are zero voltage so that to a first order approximation the switching losses of the four primary switches are eliminated.

RELATED EMBODIMENTS

Figure 22:
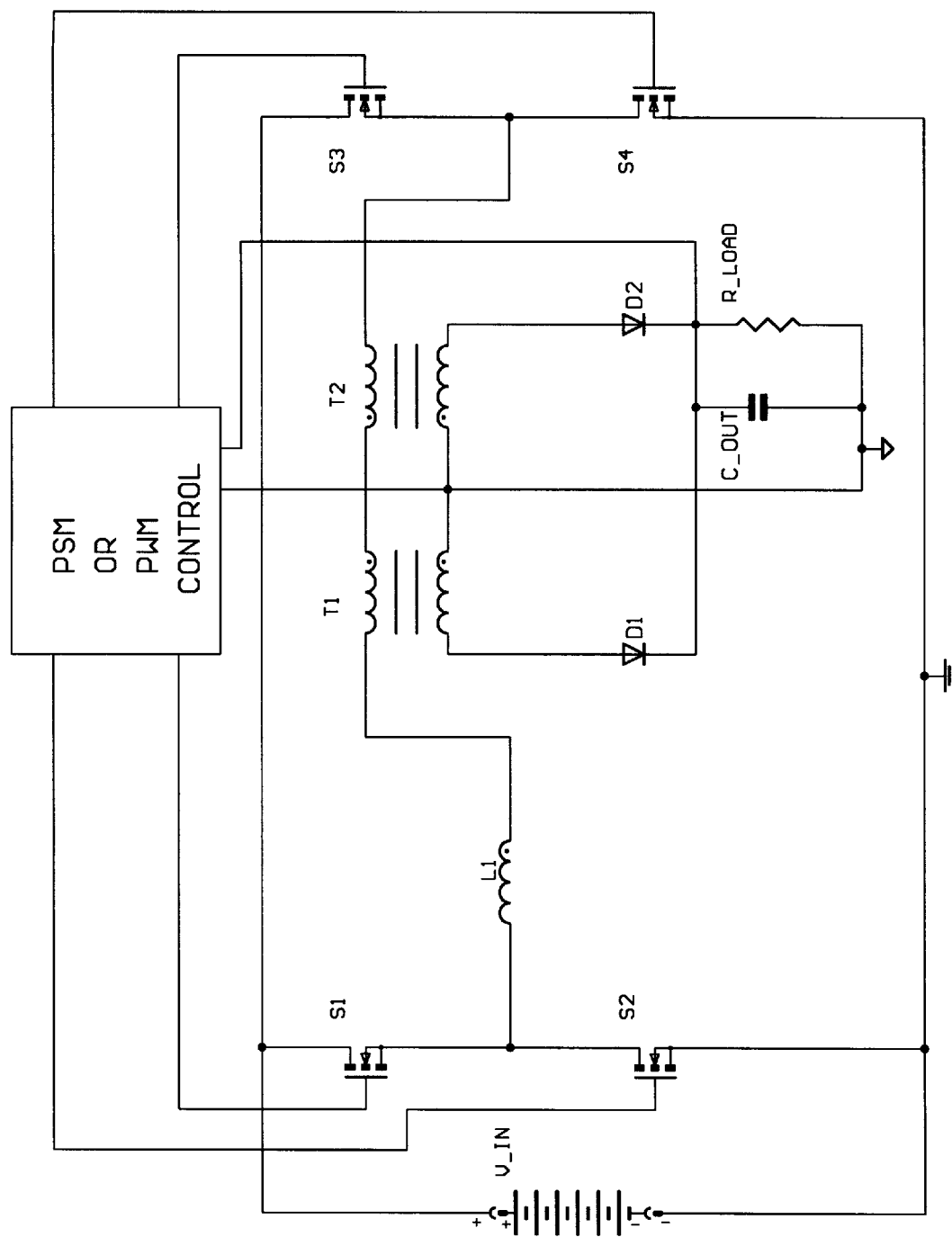
FIG. 22 illustrates the power converter of FIG. 4 with diodes used as secondary switches and power mosfets used as primary switches.

FIG. 22 illustrates an embodiment of the subject invention, in which the secondary switches are implemented using diodes and the primary switches are implemented using power mosfets. The power mosfets contain the switch, as a semiconductor field effect transistor switch, the diode as the intrinsic body drain diode of the power mosfet, and the capacitor as the mosfet output capacitance. The diode provides a natural turn off at the time that the current drops to zero, as needed.

Figure 40:
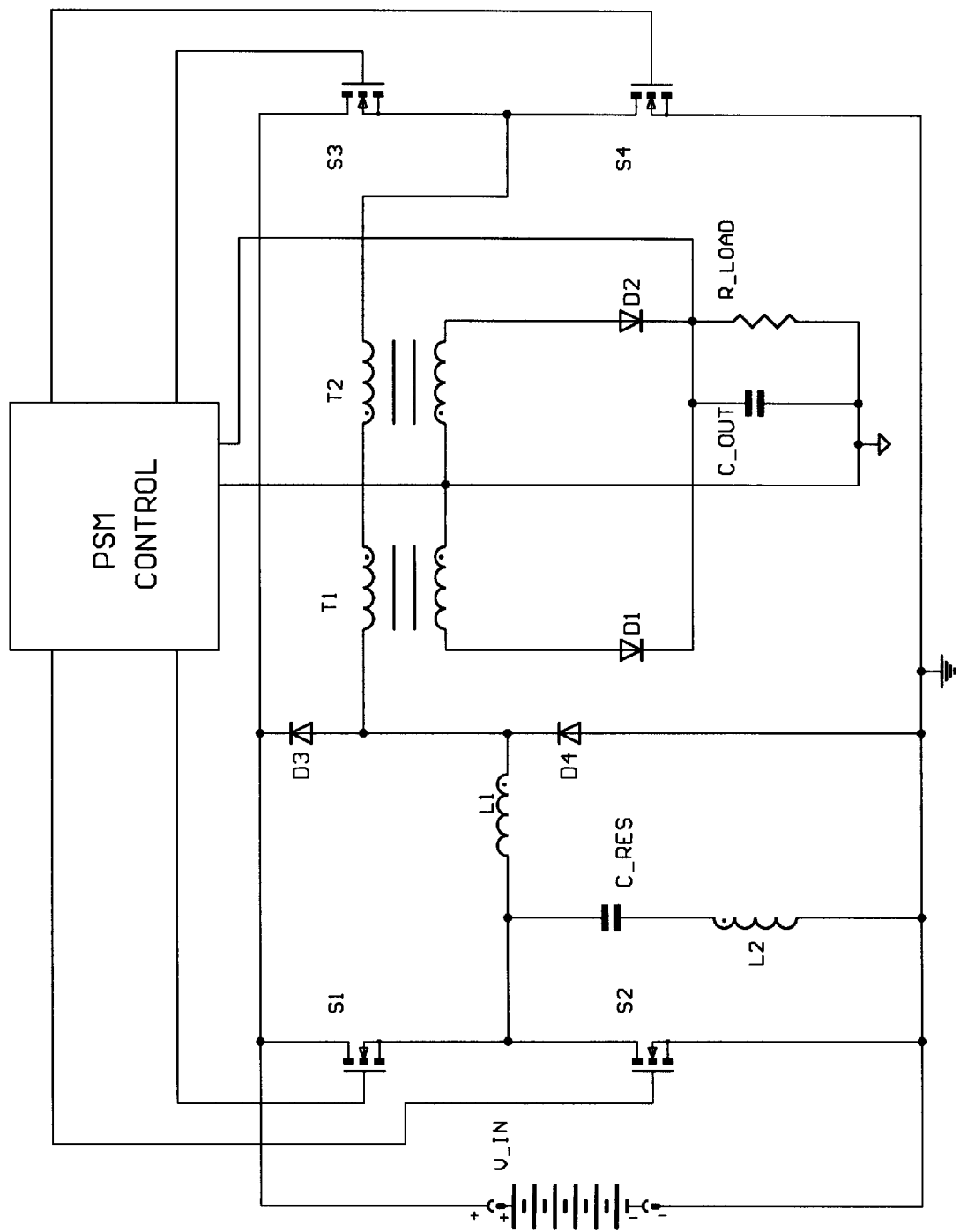
FIG. 40 illustrates an embodiment of the FIG. 4 converter in which rectifier diodes are added to clamp ringing associated with the resonance of the L1 inductor and the secondary diode parasitic capacitance.

FIG. 40 shows an embodiment related to the FIG. 22 embodiment in which a pair of diodes D3 and D4 are added to clamp potential ringing due to the interaction of L1 with the parasitic junction capacitances of D1 and D2.

The control block suggests that either phase shift modulation or pulse width modulation may be used. There is nothing that would prevent either control method from being employed in this invention. The phase shift modulation approach has been described here as an example of one control approach but pulse width modulation of the primary switches, using the described circuit structure and operating mechanism, must be considered as included within the claims of this invention. The invention does nothing to preclude the use of pulse width modulation, as an alternative method of control. It is well known to anyone skilled in the art of power conversion that any full bridge switching structure can be modulated by either phase shift modulation or pulse width modulation to obtain the desired control. With pulse width modulation both off states would use the same pair of switches and there would be three distinct switch states rather than four, as described with the phase shift modulation approach.

Figure 41:
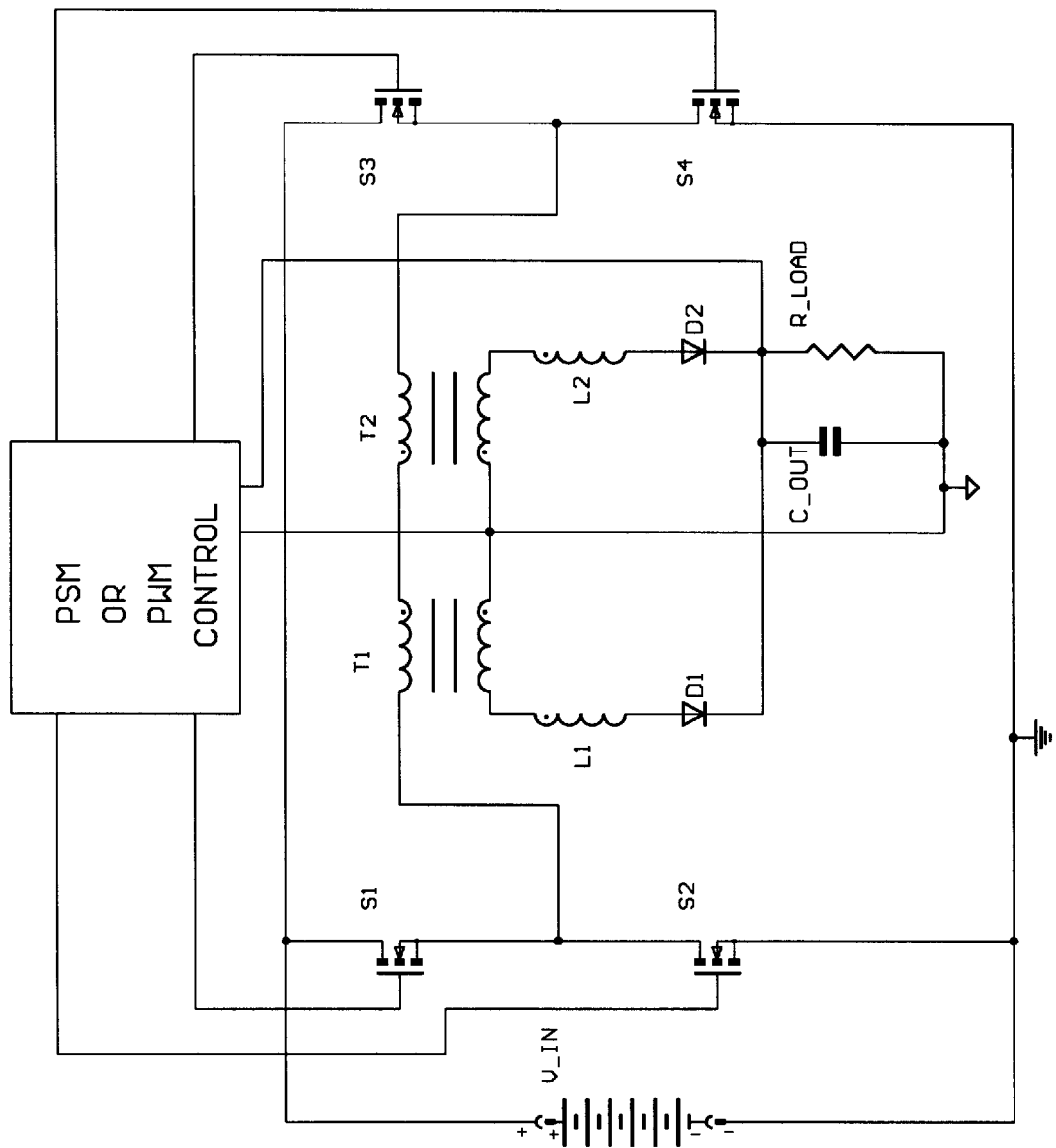
FIG. 41 illustrates an embodiment of the FIG. 4 circuit in which the small inductance is placed in series with the secondary windings of the coupled inductors.

Another embodiment of the FIG. 4 structure is illustrated in FIG. 41. In the FIG. 41 embodiment the series inductance is placed in the secondary circuit rather than the primary circuit. In the FIG. 41 embodiment two small inductors are required, one for each secondary winding. In the FIG. 41 embodiment the energy to drive the transitions is provided by the magnetizing energy of the coupled inductors and the effect of the series inductance is to maintain the primary current largely unchanged throughout the duration of the switching transition. The FIG. 41 embodiment is provided for completeness, but offers no advantage over the other embodiments already discussed. In fact, there are disadvantages to this approach: two inductors in the secondary circuit are required rather than one placed in the primary circuit, and there is no simple mechanism for clamping the ringing associated with the small series inductances and the parasitic capacitance of the output rectifiers as there is in the FIG. 40 embodiment.

Figure 43:
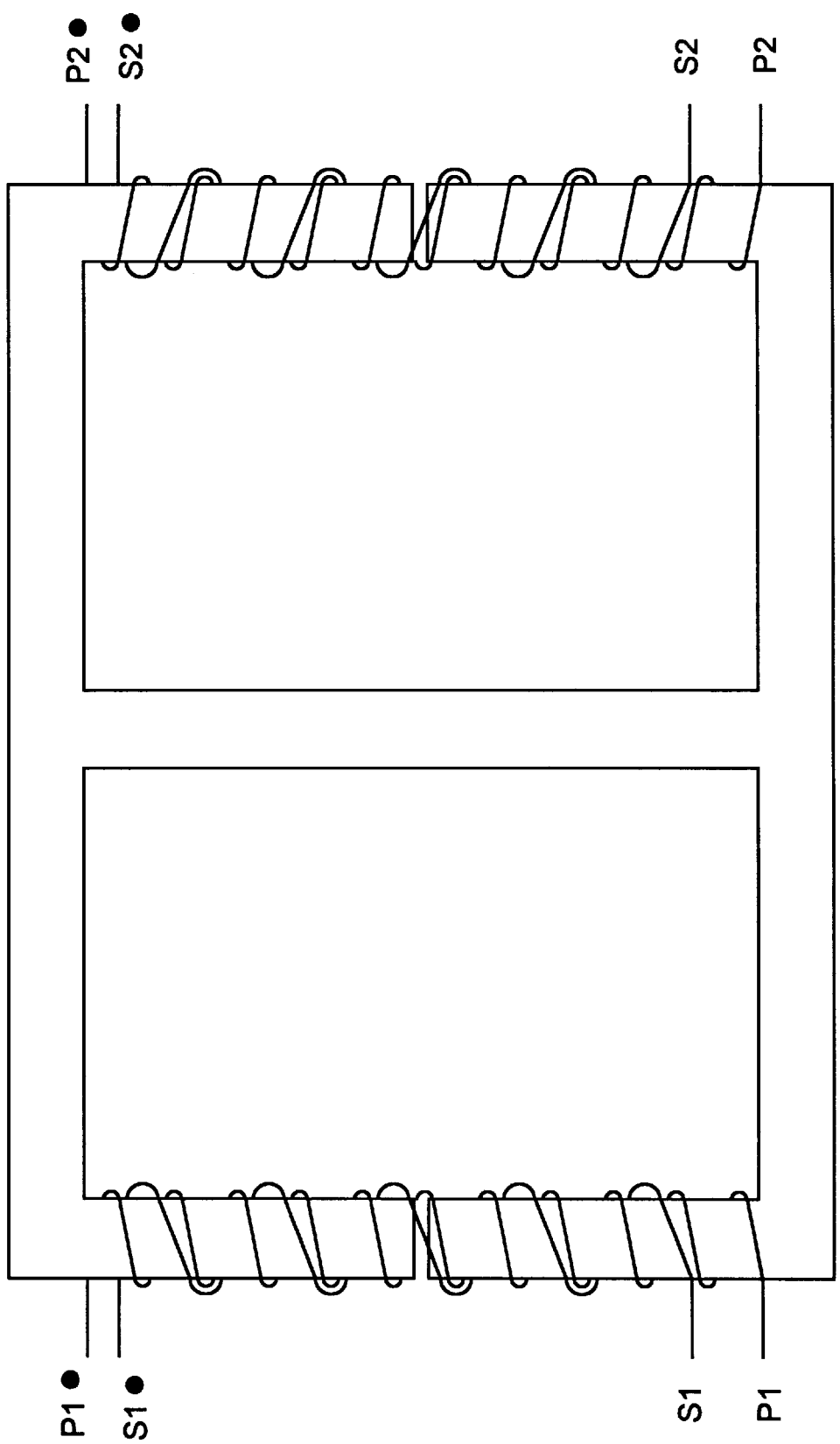
FIG. 43 illustrates a magnetic circuit element construction in which both coupled inductors are combined on a single magnetic core.
Figure 44:
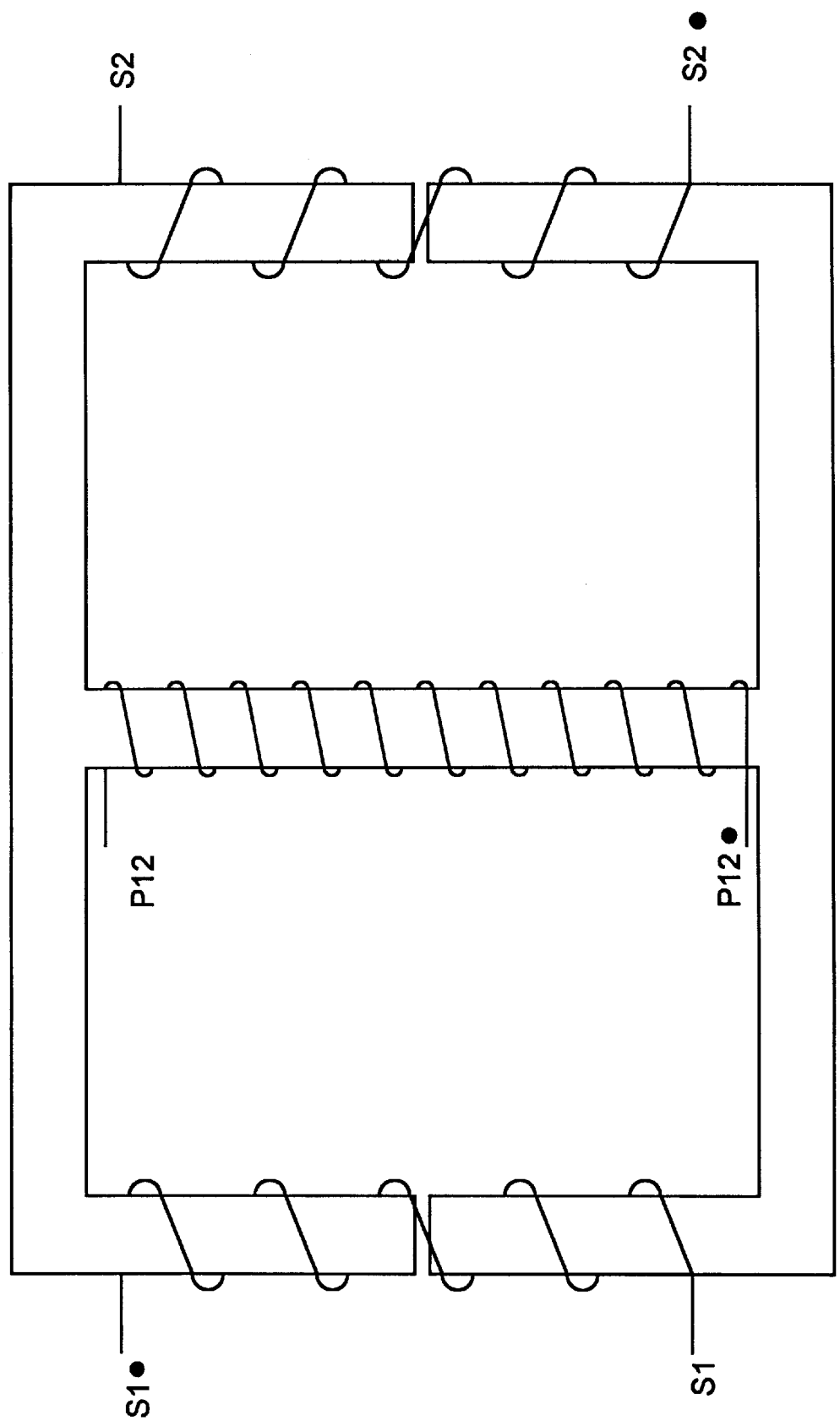
FIG. 44 illustrates a magnetic circuit element construction in which both coupled inductors are combined on a single magnetic core and the primary winding of the two coupled inductors are combined in a single primary winding.

FIG. 43 illustrates a magnetic circuit element structure in which two coupled inductors are wound on a single E core. Each outer leg is gapped. The center post of the E core provides a common flux return path (magnetic short circuit) for each coupled inductor, but there is no operational difference between the FIG. 43 structure and two separate and independent coupled inductor structures. FIG. 44 illustrates a magnetic circuit element structure in which both primary windings are combined into a single primary winding placed on the center post of an E core and the secondary windings are placed on the outer legs of the structure. The operation of the FIG. 44 structure is similar to the FIG. 43 structure. Depending on the direction and magnitude of voltage applied to the primary winding one or the other or both of the secondary windings are coupled to the primary winding. Here again the center post serves as the common flux return path for both outer legs which are gapped. The difference between the operation of the FIG. 44 structure and the FIG. 43 structure is that the FIG. 44 structure will, in general, have greater leakage inductance and lower coupling to the secondary windings, which will, in general, be less efficient and noisier than the FIG. 43 structure.

Figure 45:
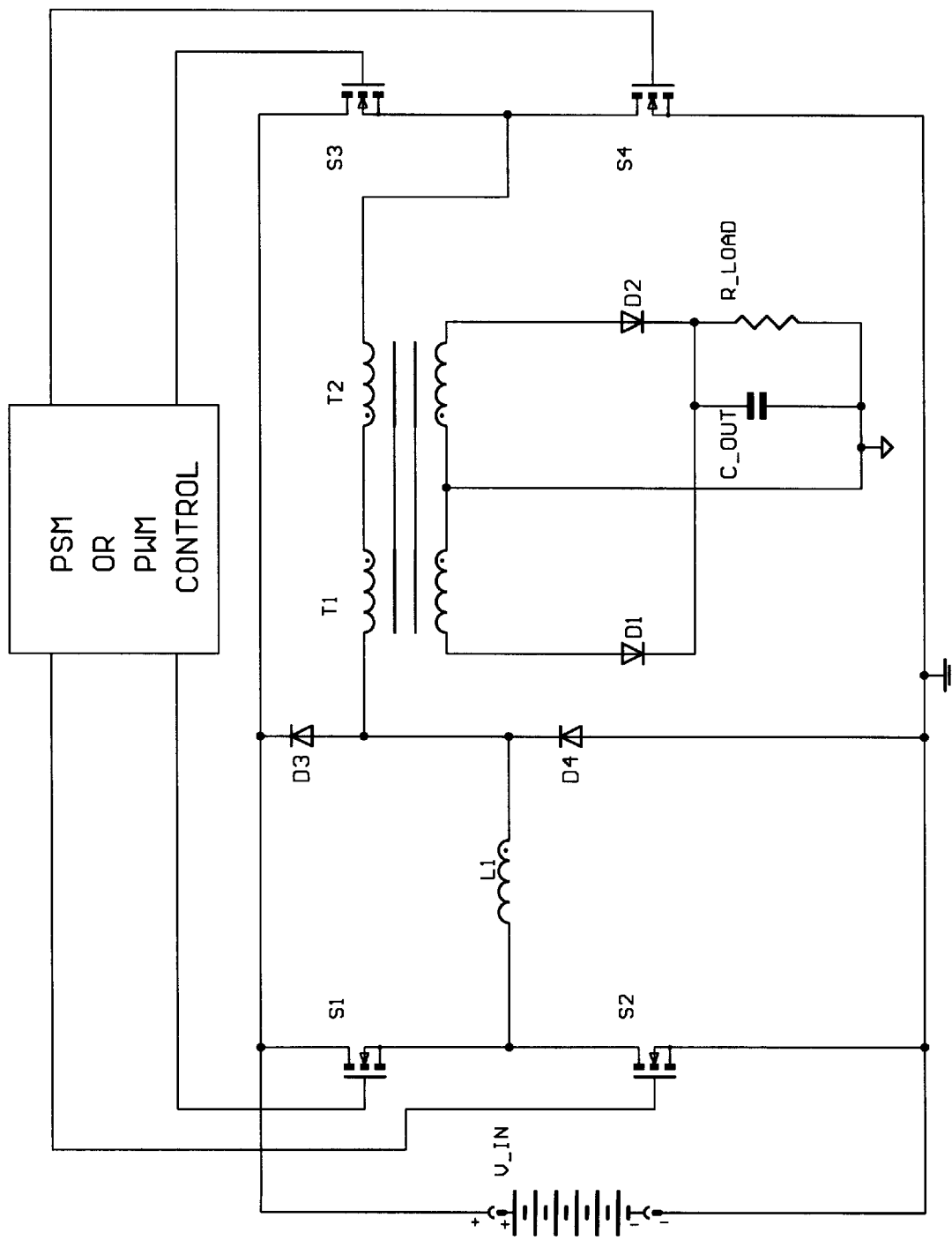
FIG. 45 illustrates an embodiment of the FIG. 4 circuit which uses the magnetic circuit element structure of FIG. 43.

Another embodiment of the FIG. 4 circuit is shown in FIG. 45. This embodiment employs the magnetic structure of FIG. 43.

Figure 46:
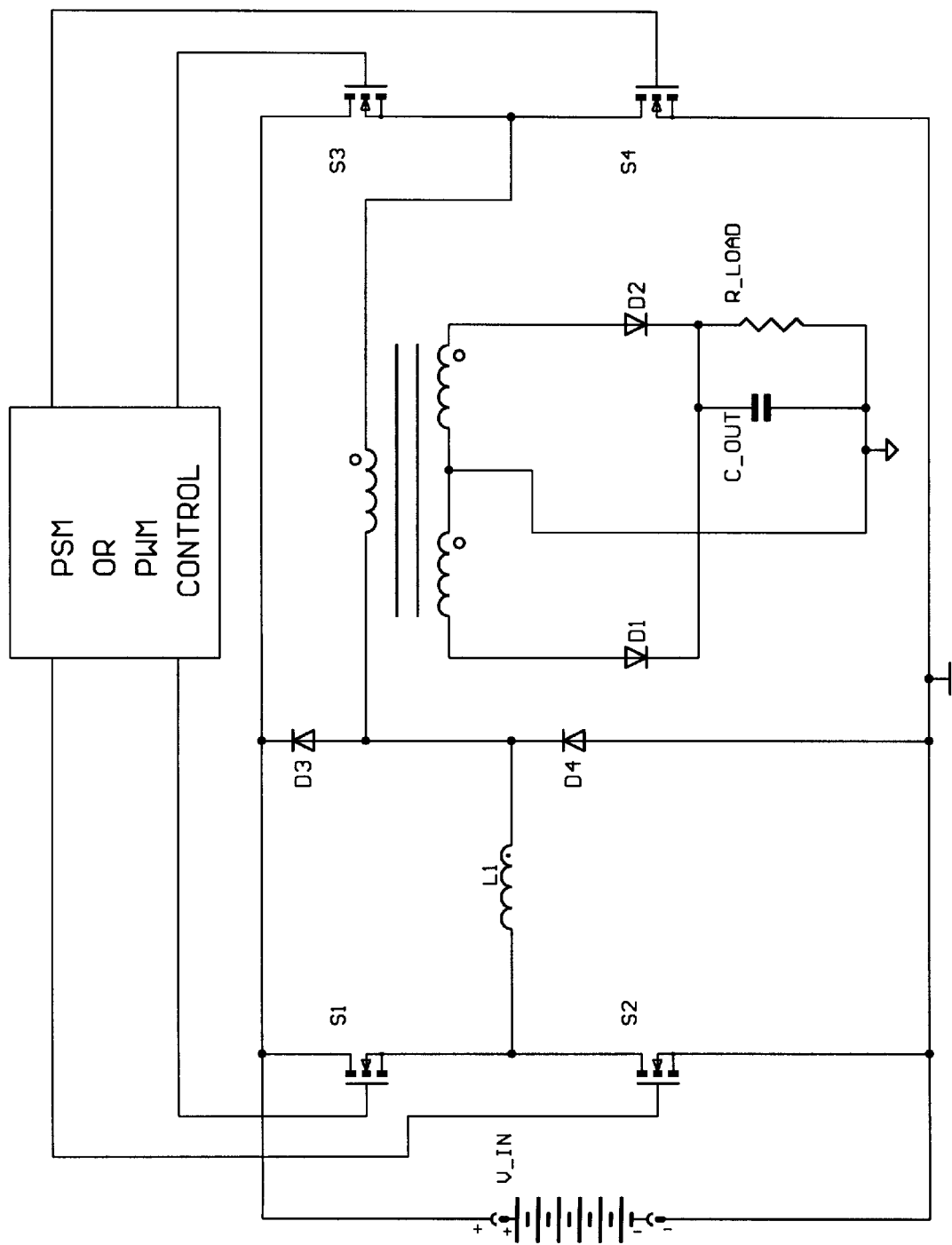
FIG. 46 illustrates an embodiment of the FIG. 4 circuit which uses the magnetic circuit element structure of FIG. 44.

Another embodiment of the FIG. 4 circuit is shown in FIG. 46. This embodiment employs the magnetic structure of FIG. 44.

Figure 49:
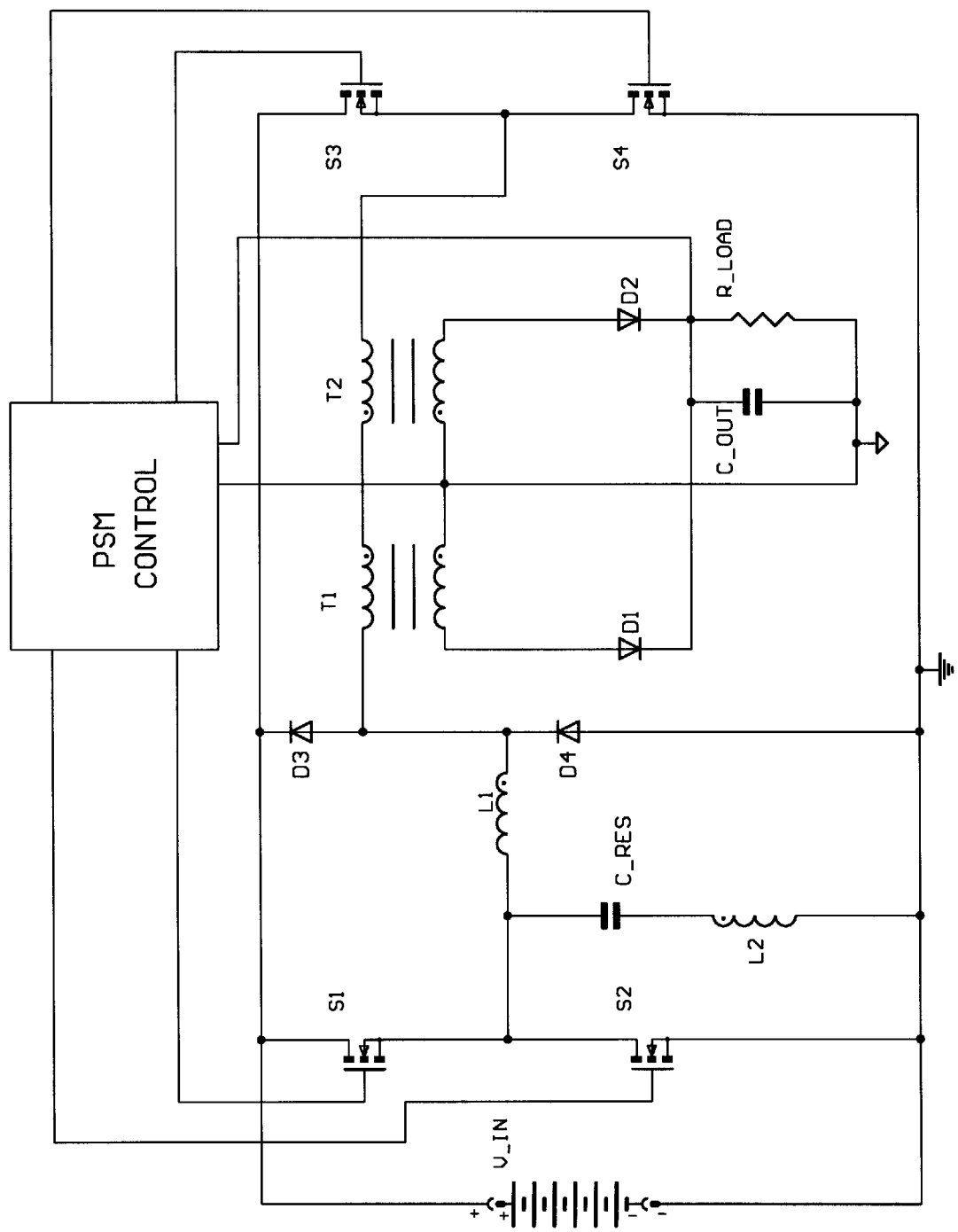
FIG. 49 illustrates an embodiment of the FIG. 4 circuit with an LC circuit which increases the available energy for driving the resonant transitions when used with phase shift modulation.

Another embodiment of the FIG. 4 circuit is shown in FIG. 49. This embodiment adds a LC tank circuit that provides additional energy and current for driving the switching transitions. The LC tank circuit is helpful for applications with a wide line voltage range since the energy and current provided by the tank circuit increases as it is needed with increasing line voltage. The FIG. 49 embodiment is applicable to phase shift modulation where the critical switching transitions are confined to only one half bridge switching leg.

Figure 50:
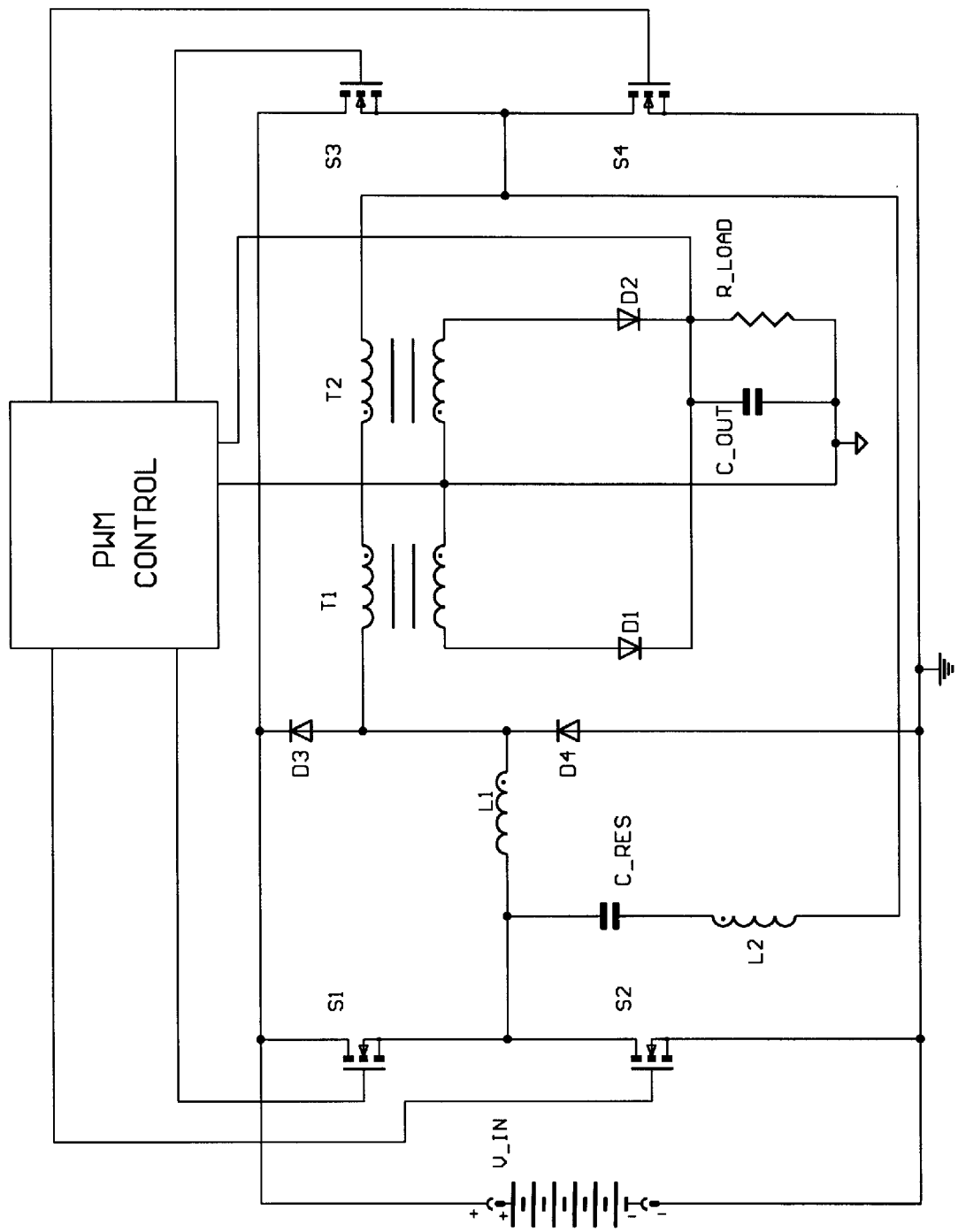
FIG. 50 illustrates an embodiment of the FIG. 4 circuit with an LC circuit which increases the available energy for driving the resonant transitions when used with pulse width modulation.

Another embodiment which is a variation of the FIG. 49 embodiment applicable to pulse width modulation control is shown in FIG. 50.

Additional embodiments are realized by adding converter outputs. Additional converter outputs can be added by adding secondary windings to each coupled inductor and secondary switches for each secondary winding and output capacitors and loads for each additional output. Additional embodiments are realized by paralleling multiple converters of the type described herein with equally spaced phase.

STRUCTURE

Figure 23:
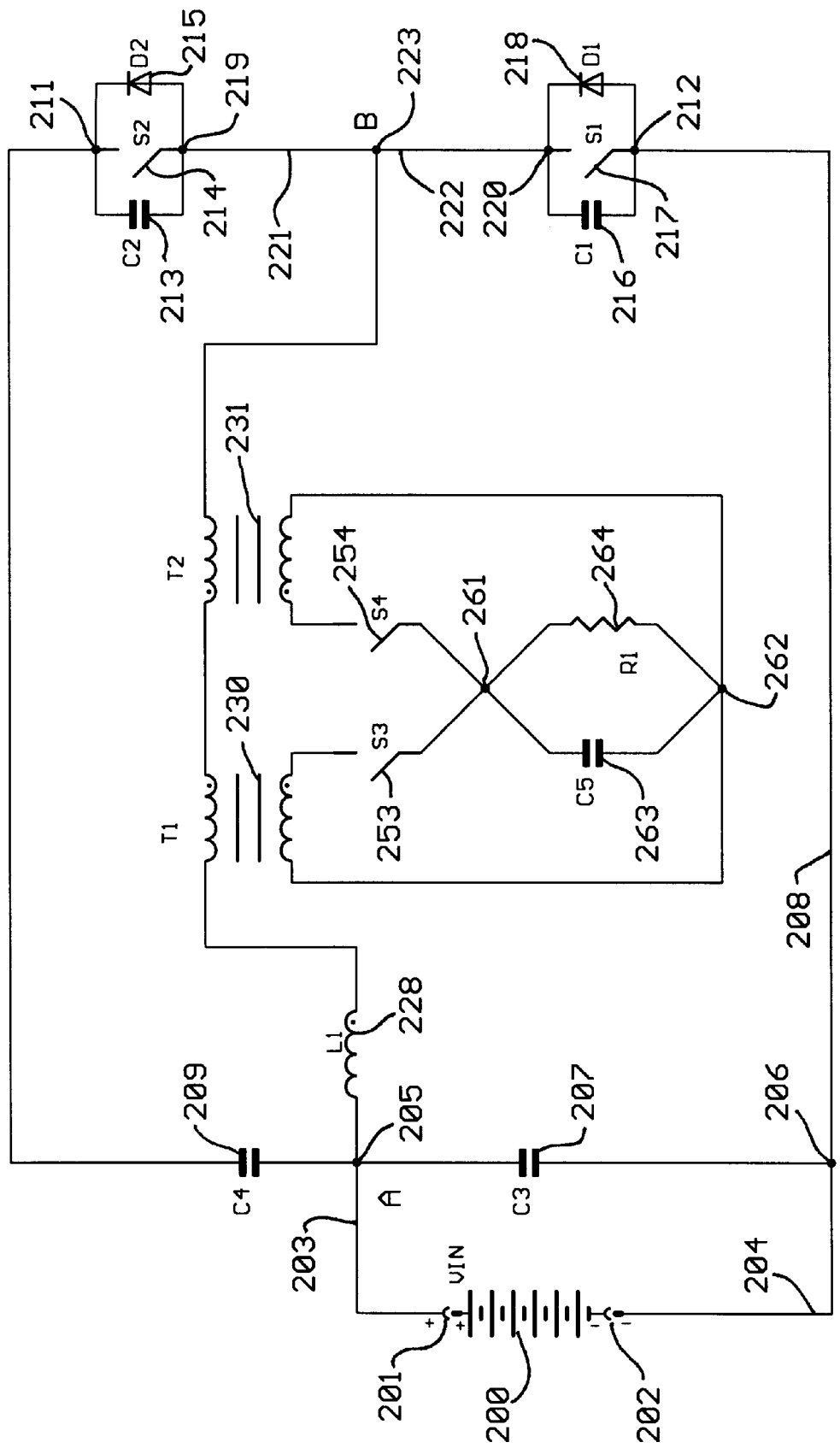
FIG. 23 illustrates a circuit schematic drawing of a soft switching, active reset, pulse width modulated, dual opposed interleaved coupled inductor buck converter according to the subject invention.

The circuit structure is illustrated in FIG. 23. The circuit structure is illustrated in FIG. 23. A positive terminal 201 of a source of DC potential, $V_{IN}$, 200 is connected to a lead 203. The lead 203 is connected to a node 205, labeled A in FIG. 23. A negative terminal 202 of source 200 is connected to a lead 204 which is connected to a node 206. A first terminal of an input capacitor 207 is connected to the node 205. A second terminal of the input capacitor 207 is connected to the node 206. The node 205 is connected to a first terminal of a capacitor 209. A second terminal of the capacitor 209 is connected to a node 211. The node 206 is connected to a lead 208 which is connected to a node 212. Node 211 is connected to a first terminal of a capacitor 213. A second terminal of the capacitor 213 is connected to a node 219. A first terminal of a switch 214 is connected to node 211. A second terminal of the switch 214 is connected to the node 219. A cathode terminal of a diode 215 is connected to the node 211. An anode terminal of the diode 215 is connected to the node 219. A first terminal of a capacitor 216 is connected to the node 212. A second terminal of the capacitor 216 is connected to a node 220. A first terminal of a switch 217 is connected to the node 212. A second terminal of the switch 217 is connected to the node 220. An anode terminal of a diode 218 is connected to the node 212. A cathode terminal of the diode 218 is connected to the node 220. The node 219 is connected to a lead 221. The node 220 is connected to a lead 222. Lead 221 and lead 222 are connected at a node 223, labeled B in FIG. 23. A first terminal of an inductor 228 is connected to the node 205. A second terminal of the inductor 228 is connected to an undotted terminal of the primary winding of a coupled inductor 230. A dotted terminal of the primary winding of the coupled inductor 230 is connected to a dotted terminal of a primary winding of a coupled inductor 231. An undotted terminal of the primary winding of the coupled inductor 231 is connected to the node 223.

In the secondary circuit a dotted terminal of a secondary winding of the coupled inductor 230 is connected to a first terminal of a switch 253. An undotted terminal of the secondary winding of the coupled inductor 230 is connected to a node 262. A second terminal of the switch 253 is connected to a node 261. A dotted terminal of a secondary winding of the coupled inductor 231 is connected to a first terminal of a switch 254. An undotted terminal of the secondary winding of the coupled inductor 231 is connected to the node 262. A second terminal of the switch 254 is connected to the node 261. The node 261 is connected to a first terminal of a capacitor 263. A second terminal of the capacitor 263 is connected to the node 262.

A first terminal of a load 264 is connected to the node 261. A second terminal of the load 264 is connected to the node 262.

OPERATION

It is assumed in this analysis that the system has reached a settled operating condition. Except for the short, but finite, switching intervals there are two states of the circuit of FIG. 23, an on state and an off state. It is also assumed, for purpose of analysis, that the switching intervals between the states are approximately zero seconds in duration and that capacitors 213 and 216 are small and do not contribute significantly to the operation of the converter, except during the switching transitions.

It is also assumed that the capacitor 209 is large so that its voltage is invariant over the duration of a switching cycle.

Figure 24:
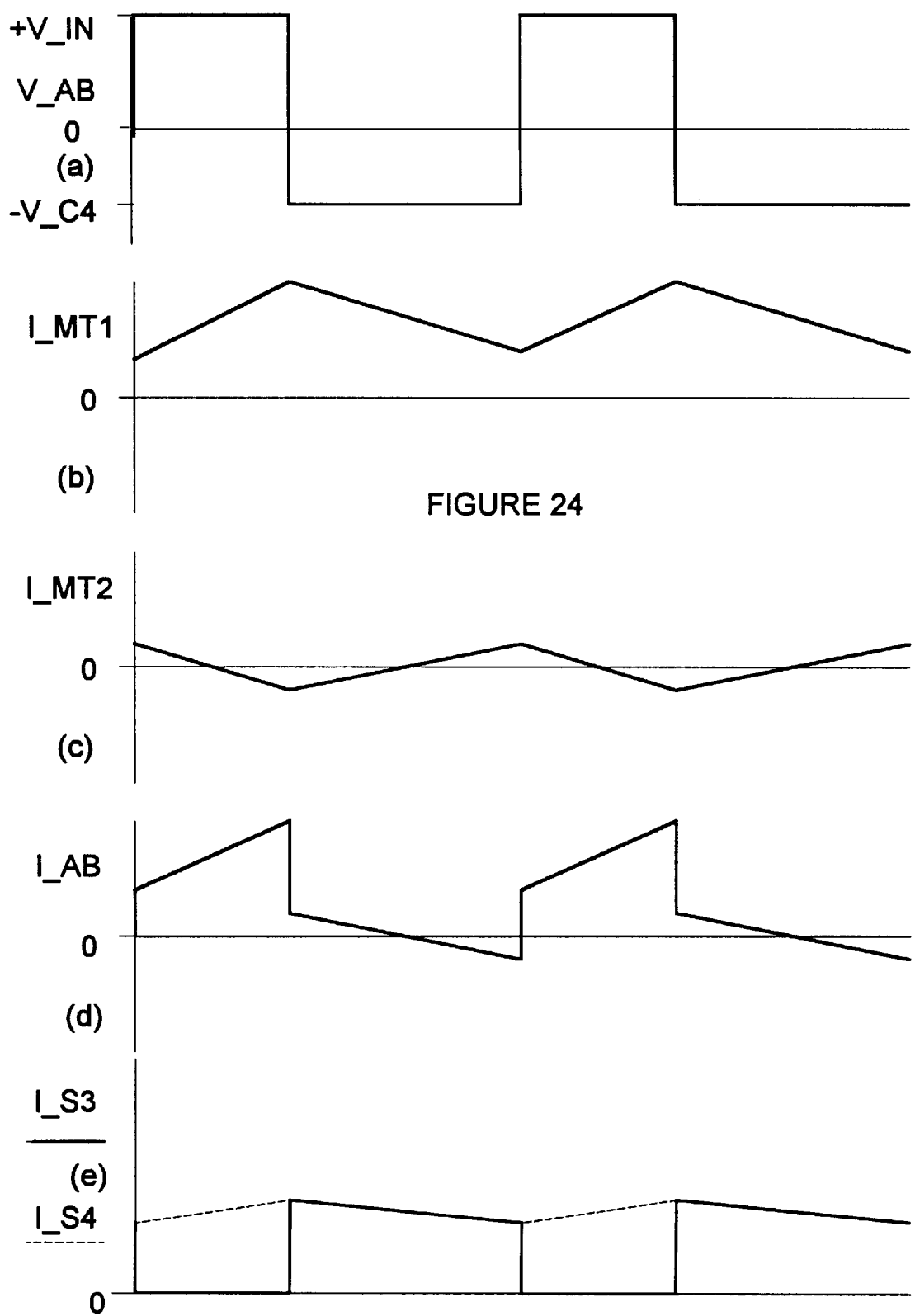
FIG. 24a illustrates the wave form of the voltage applied to the primary circuit of the FIG. 23 converter.
FIG. 24b illustrates the wave form of the T1 coupled inductor magnetizing current of the FIG. 23 converter.
FIG. 24c illustrates the wave form of the T2 coupled inductor magnetizing current of the FIG. 23 converter.
FIG. 24d illustrates the wave form of the primary circuit current of the FIG. 23 converter.
FIG. 24e illustrates the wave forms of the secondary winding currents of the FIG. 23 converter.
Figure 25:
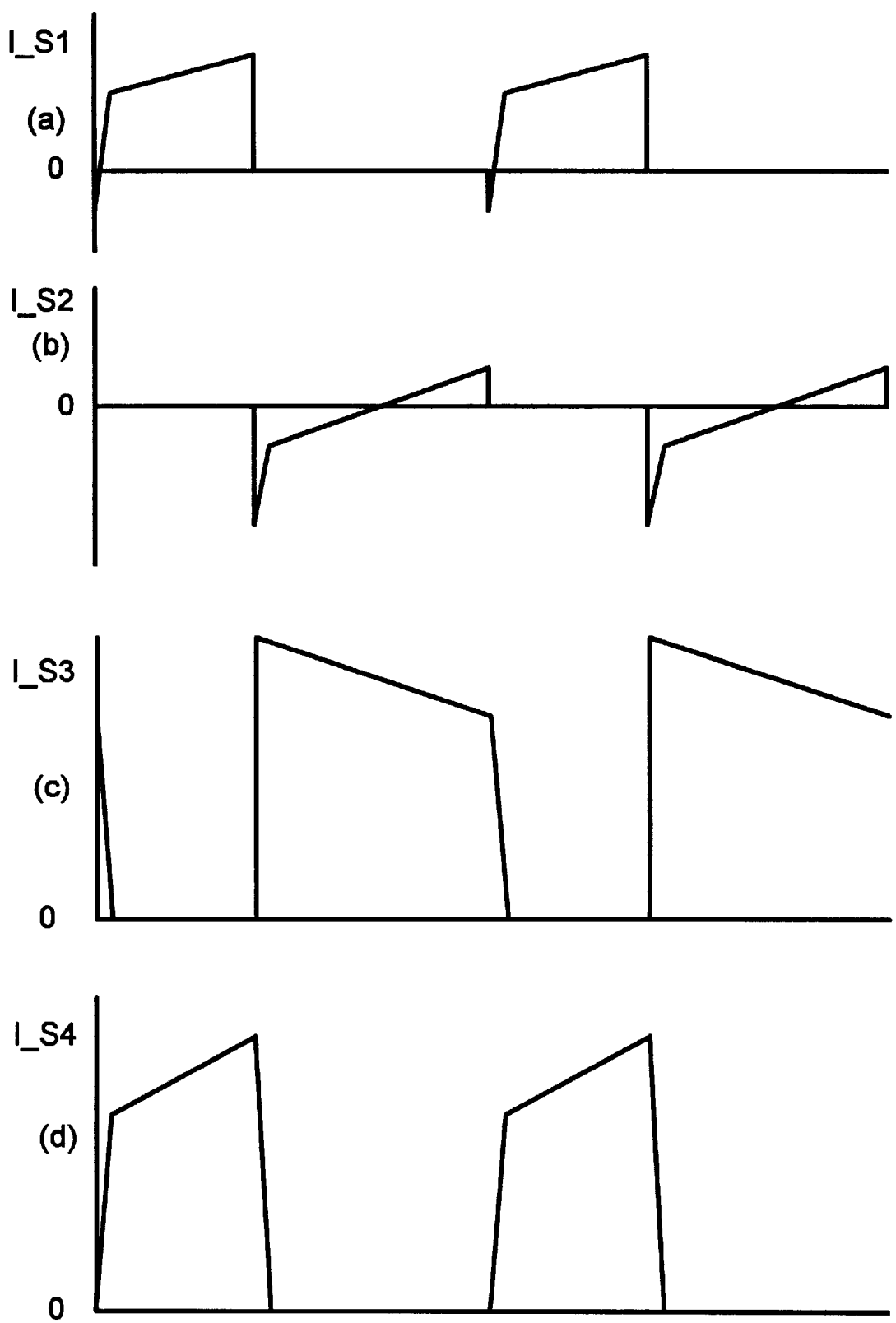
FIG. 25a illustrates the wave form of the S1 primary switch current of the FIG. 23 converter.
FIG. 25b illustrates the wave form of the S2 primary switch current of the FIG. 23 converter.
FIG. 25c illustrates the wave form of the S3 secondary switch current of the FIG. 23 converter.
FIG. 25d illustrates the wave form of the S4 secondary switch current of the FIG. 23 converter.
Figure 26:
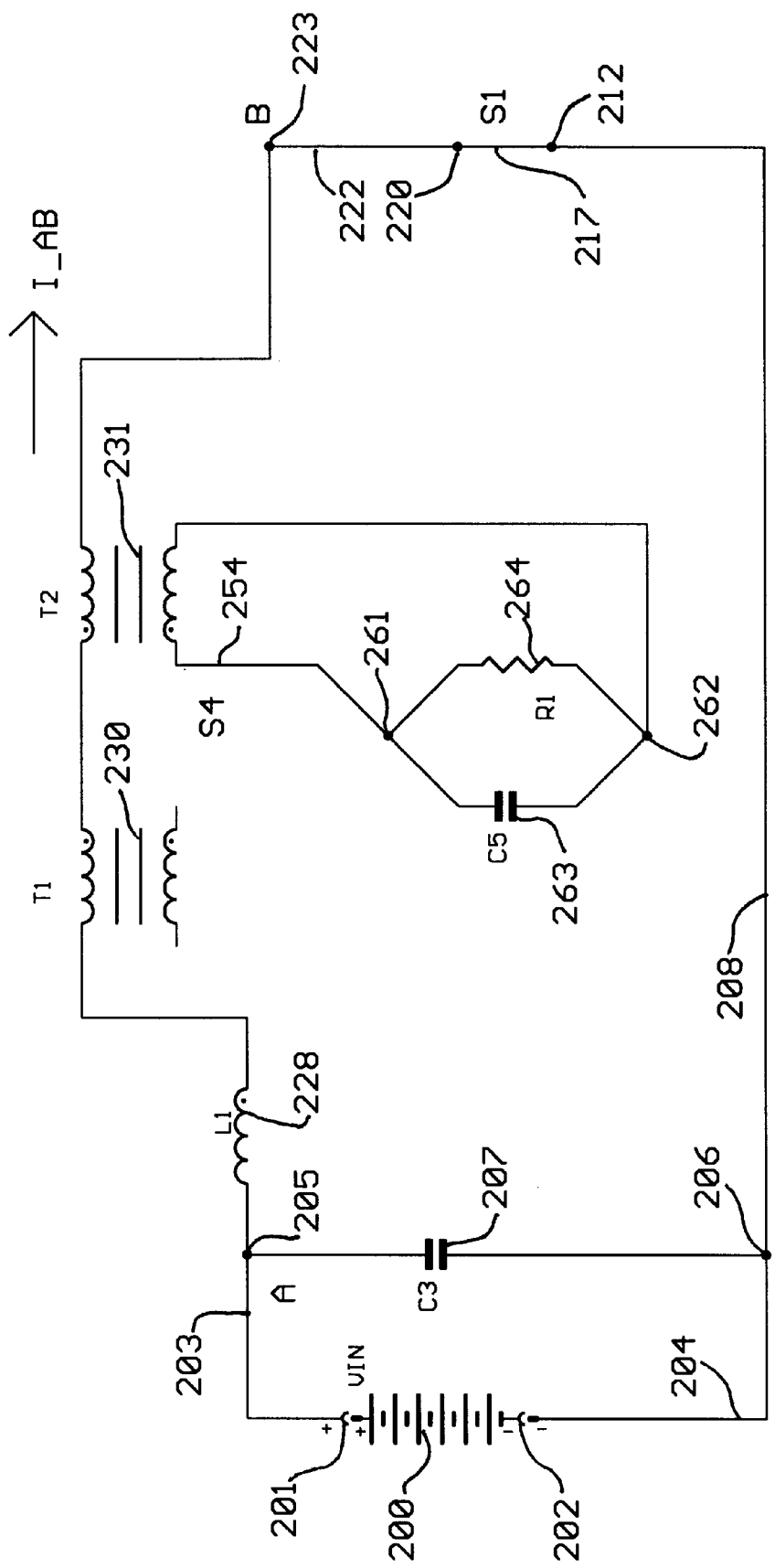
FIG. 26 illustrates an on state of the FIG. 23 converter.
Figure 27:
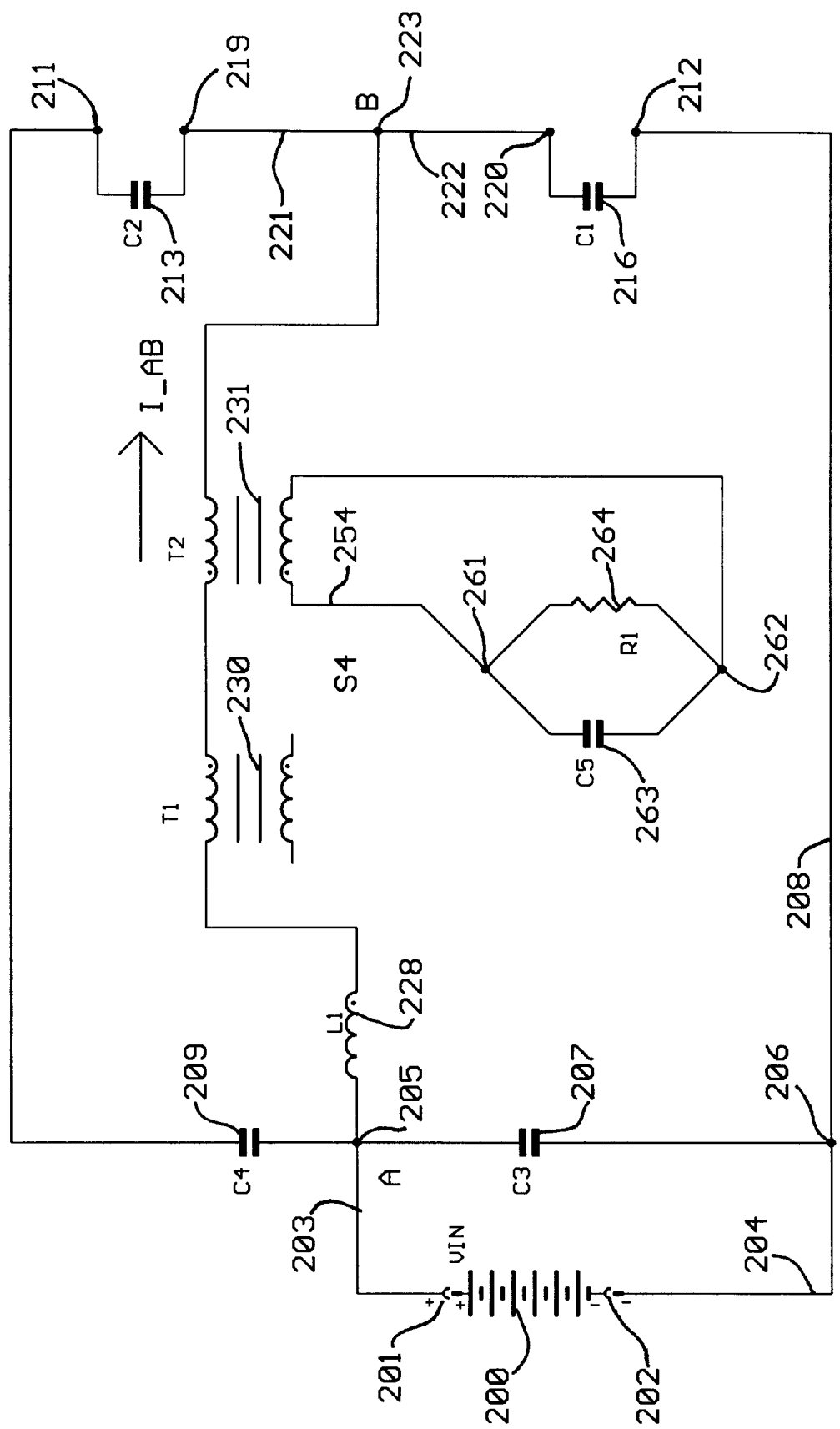
FIG. 27 illustrates a first phase of a turn off transition of the FIG. 23 converter.
Figure 28:
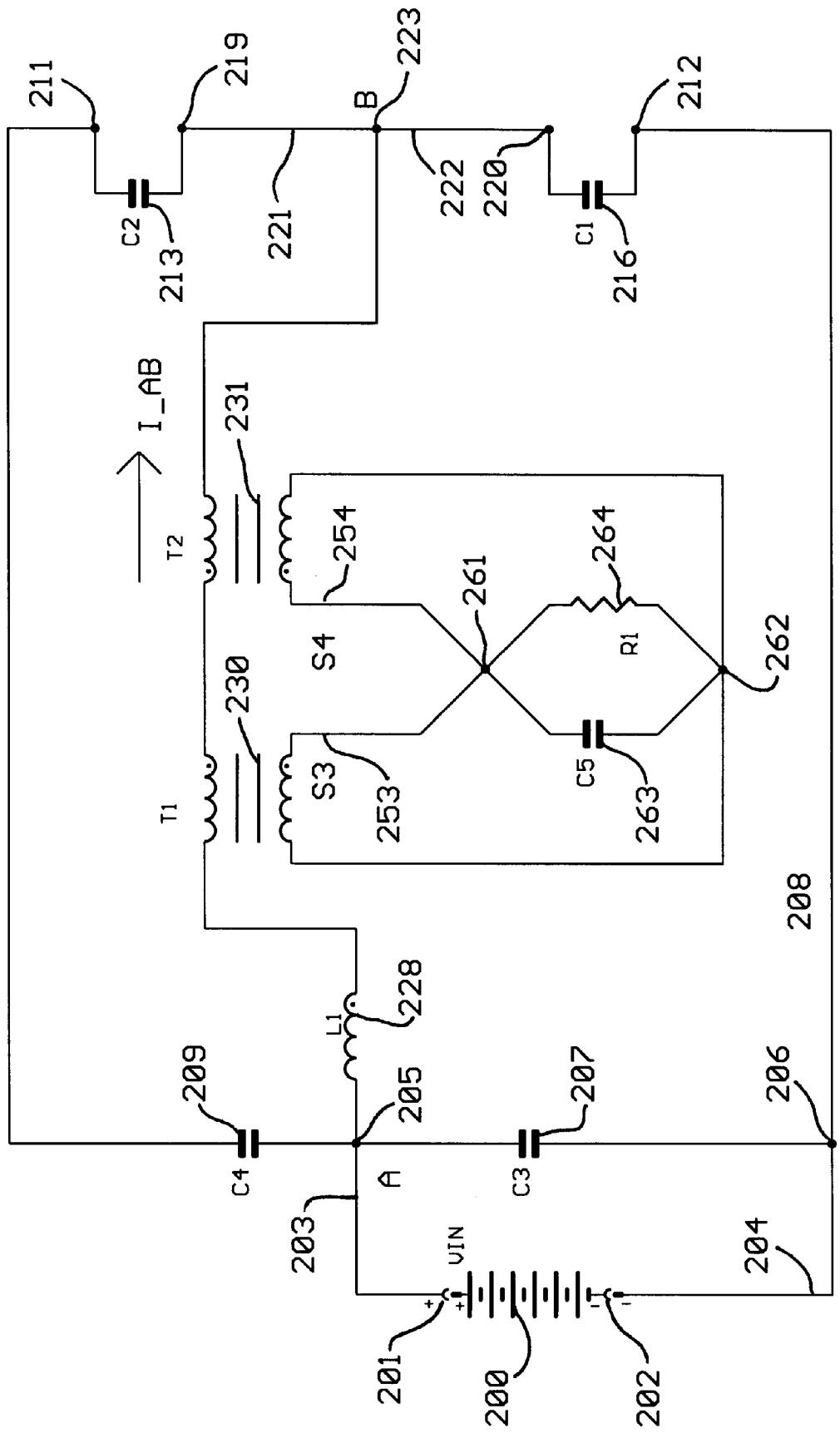
FIG. 28 illustrates a second phase of a turn off transition of the FIG. 23 converter.
Figure 29:
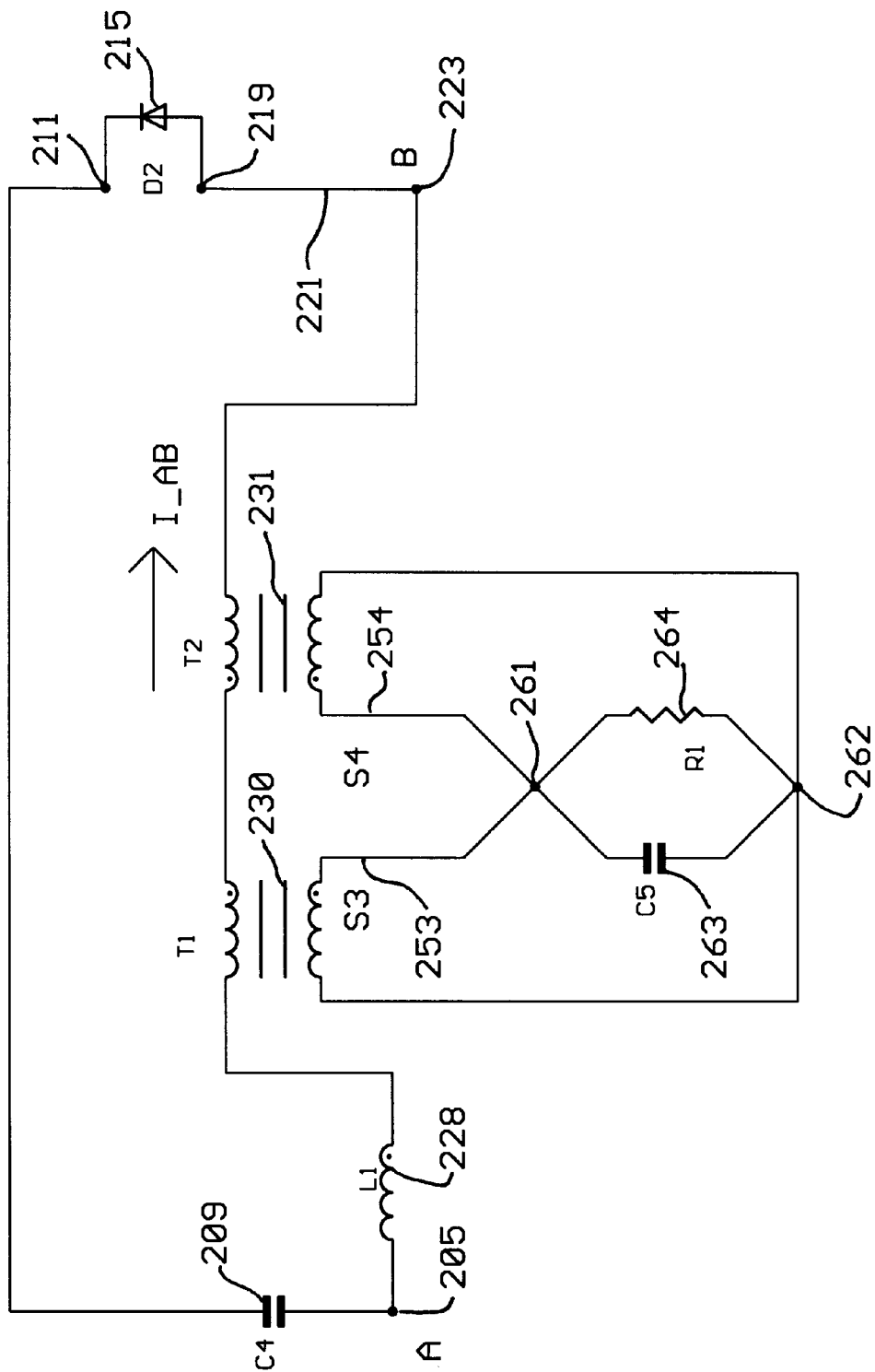
FIG. 29 illustrates a third phase of a turn off transition of the FIG. 23 converter.
Figure 30:
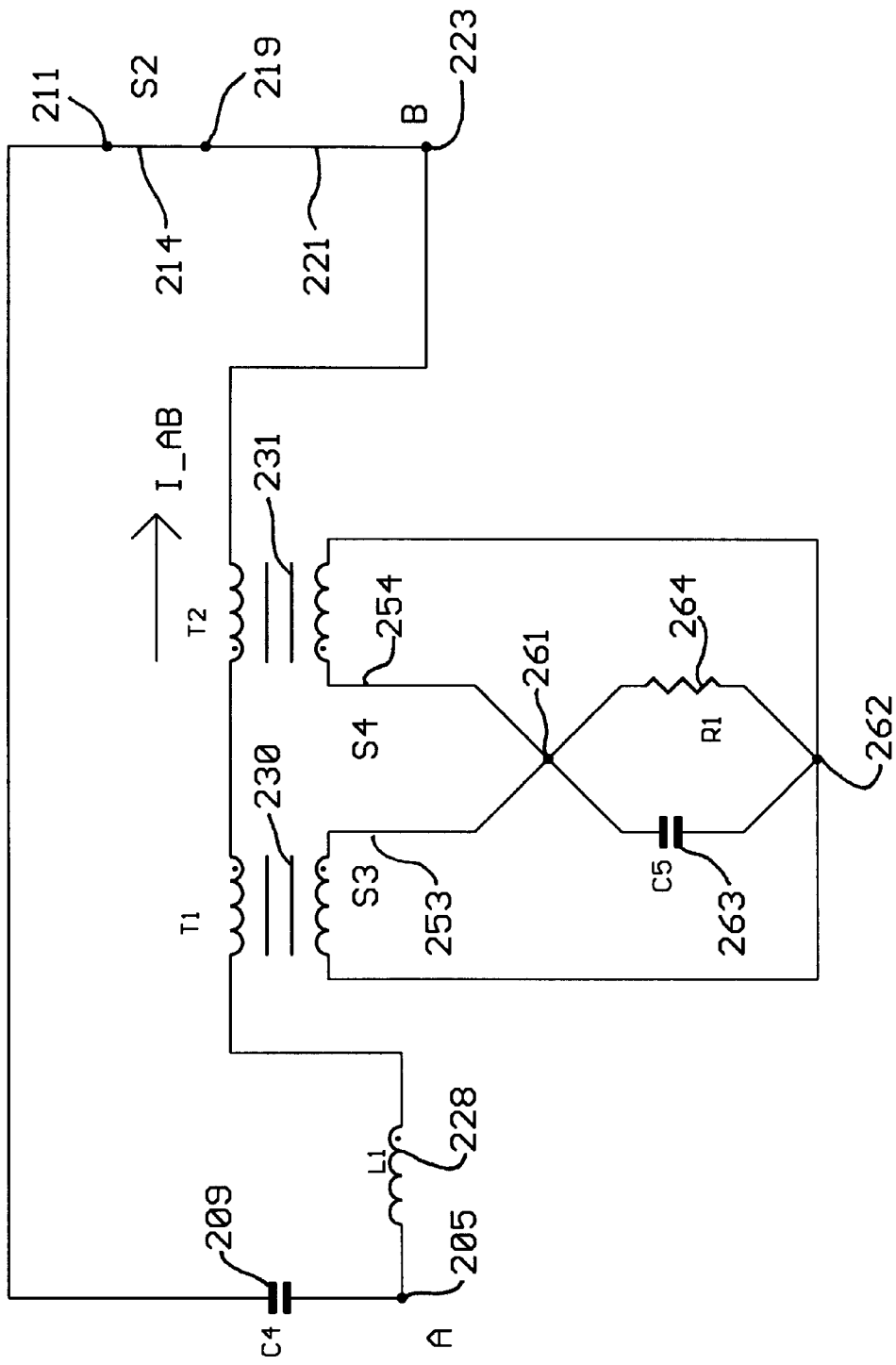
FIG. 30 illustrates a fourth phase of a turn off transition of the FIG. 23 converter.
Figure 31:
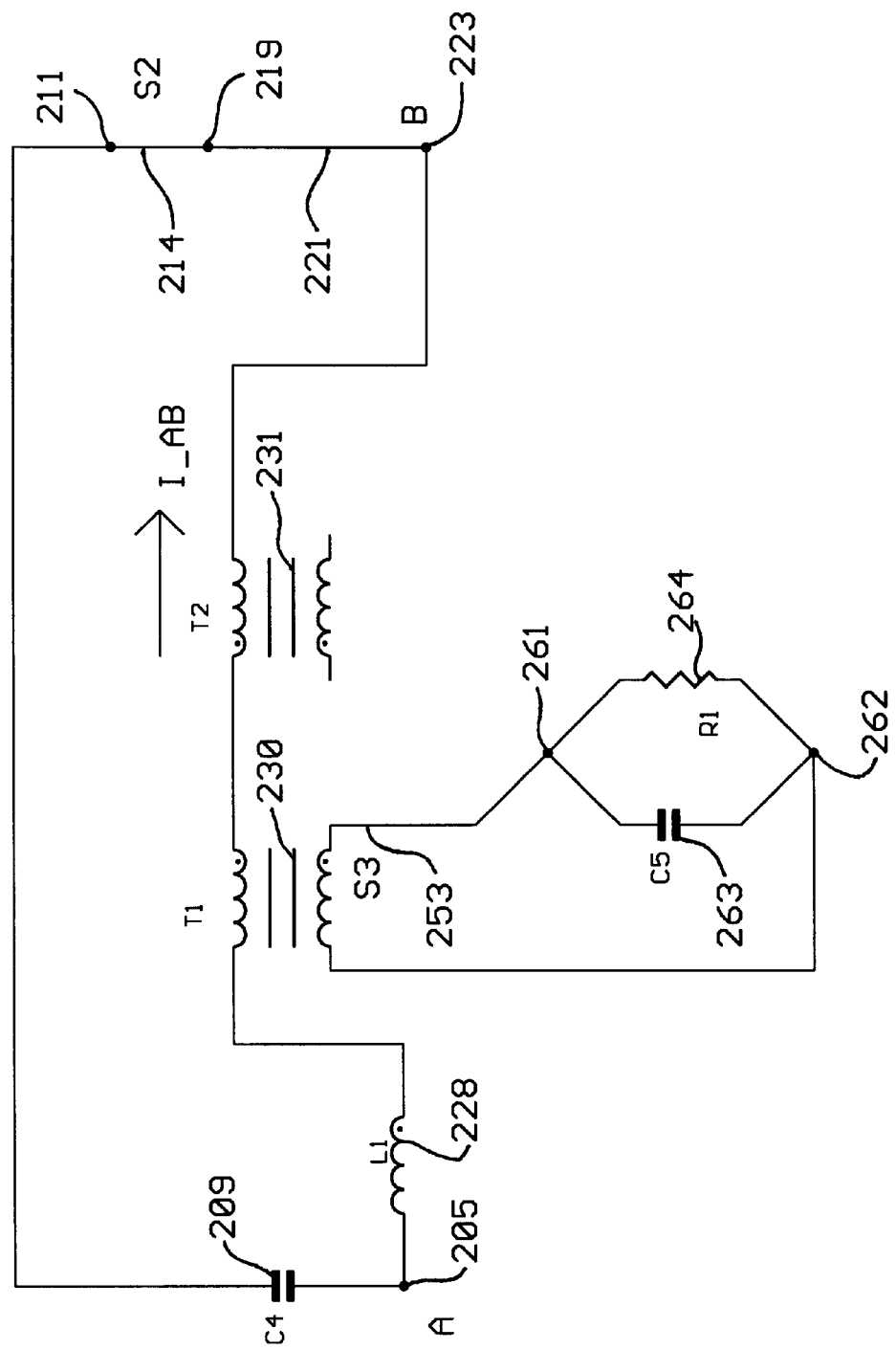
FIG. 31 illustrates an off state of the FIG. 23 converter.
Figure 32:
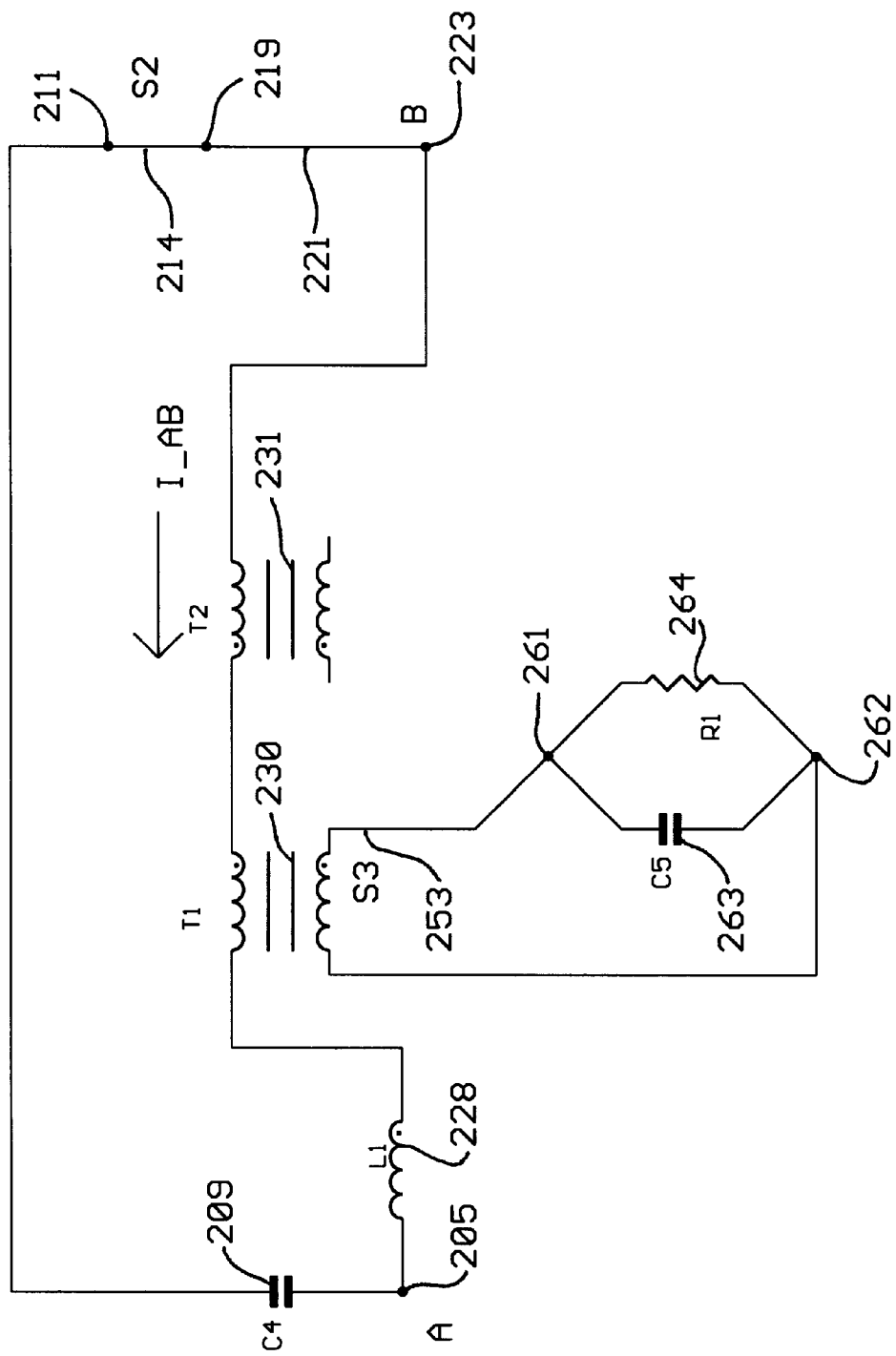
FIG. 32 also illustrates the off state of the FIG. 23 converter.
Figure 33:
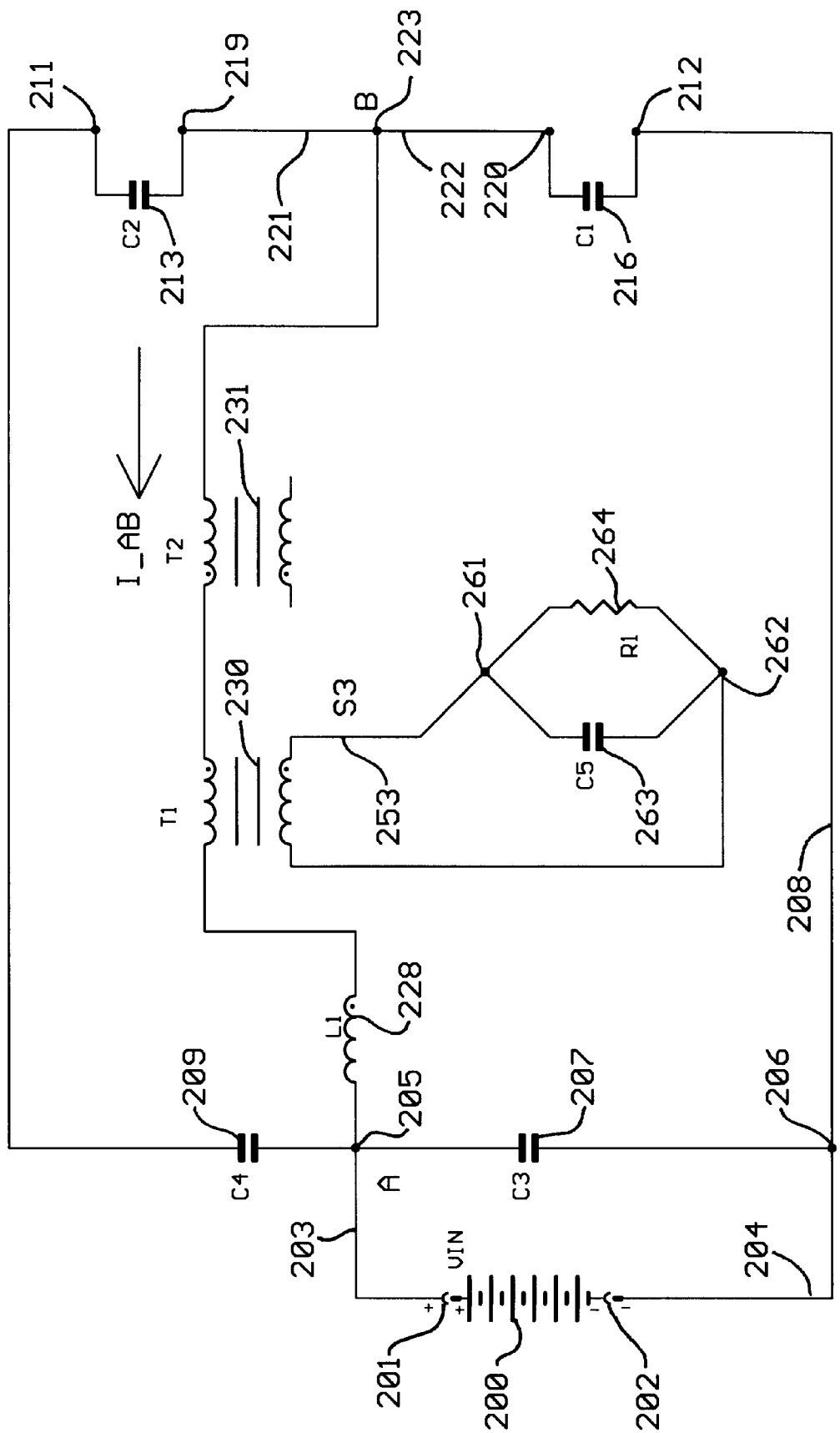
FIG. 33 illustrates a first phase of a turn on transition of the FIG. 23 converter.
Figure 34:
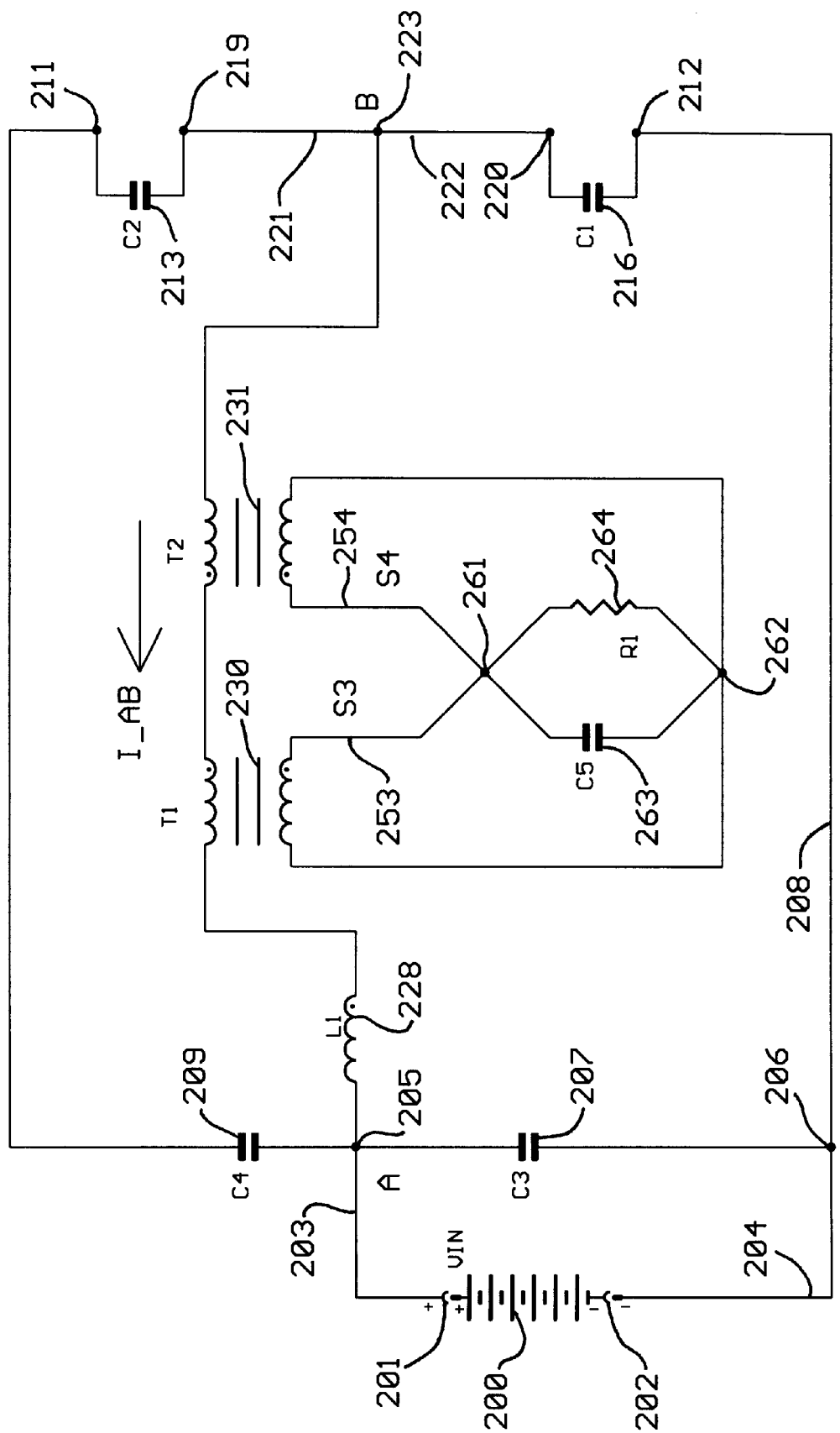
FIG. 34 illustrates a second phase of a turn on transition of the FIG. 23 converter.
Figure 35:
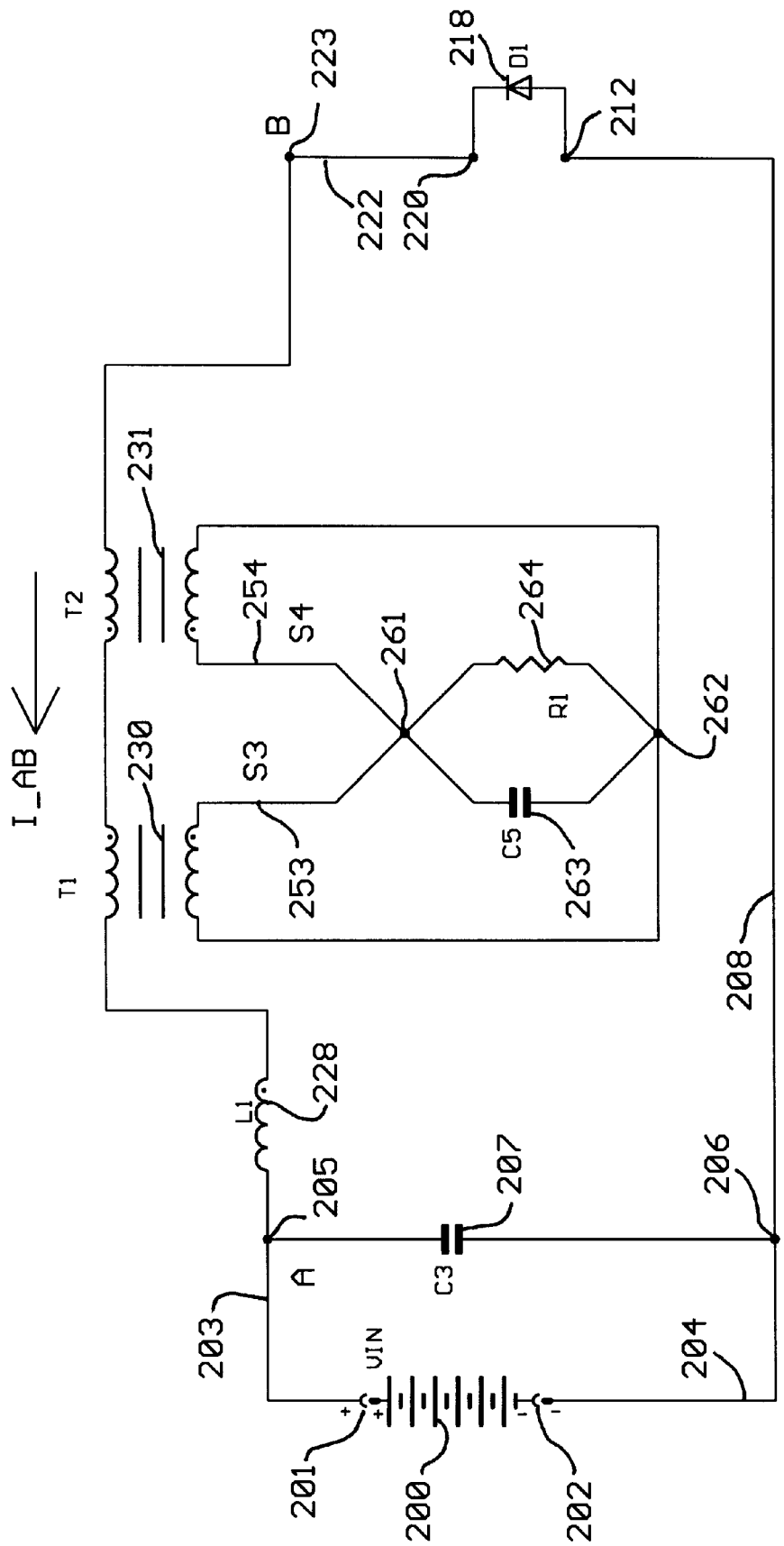
FIG. 35 illustrates a third phase of a turn on transition of the FIG. 23 converter.
Figure 36:
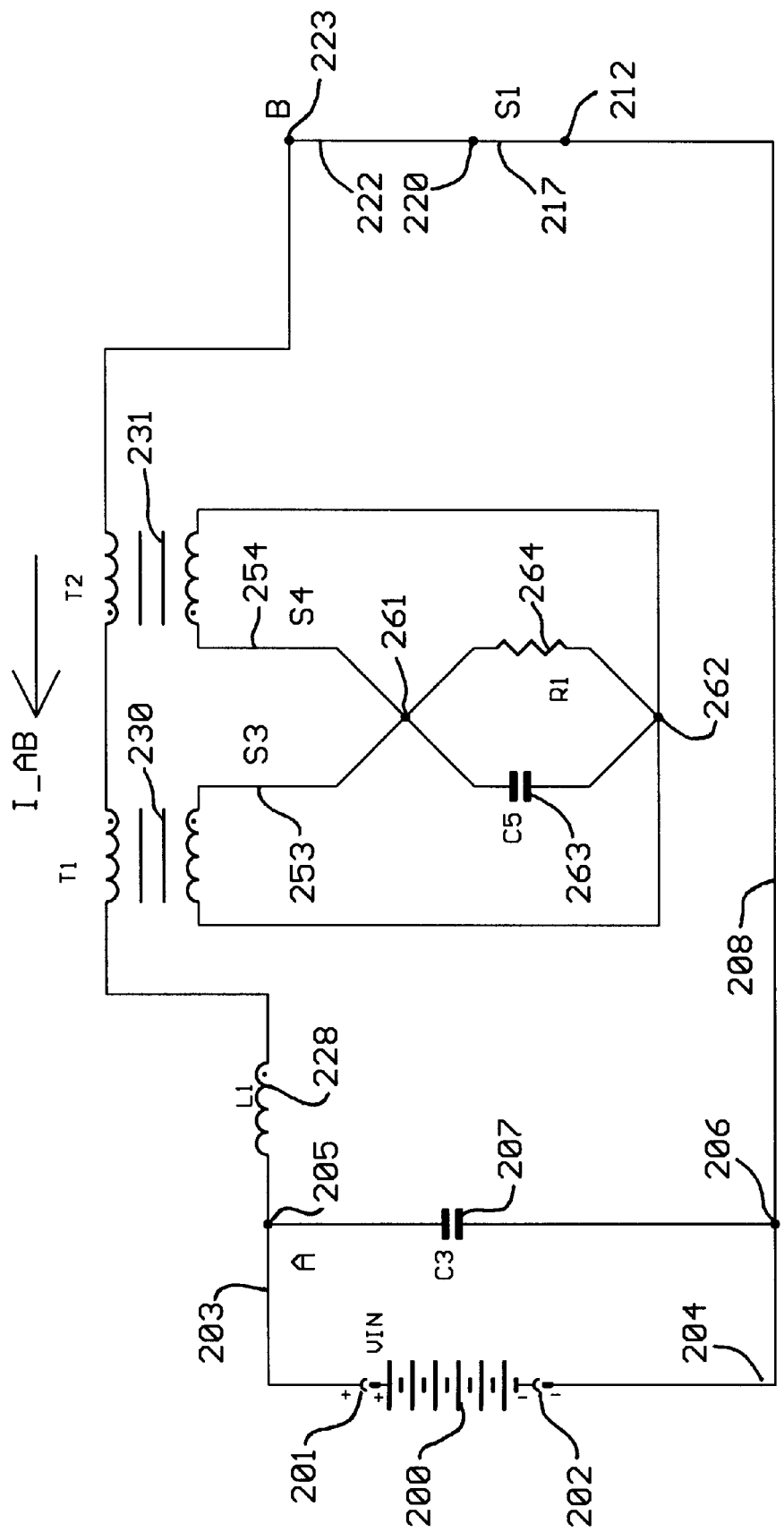
FIG. 36 illustrates a fourth phase of a turn on transition of the FIG. 23 converter.
Figure 37:
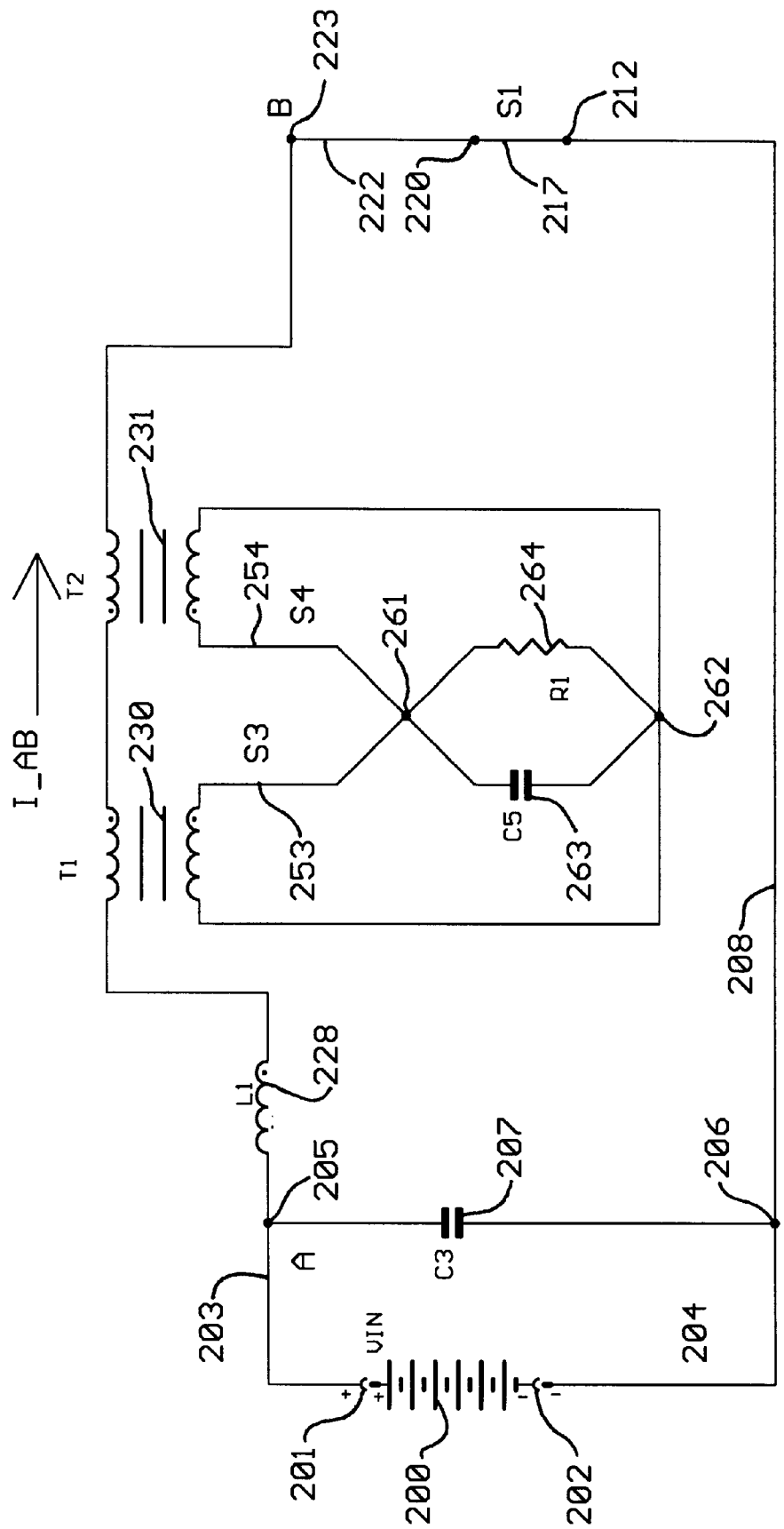
FIG. 37 illustrates a fifth phase of a turn on transition of the FIG. 23 converter.

In operation consider an initial condition, illustrated in FIG. 26, in which the voltage difference between points A, node 205, and B, node 223, labeled V_AB in FIG. 24a, is equal to the voltage V_IN and current is flowing from left to right or from A to B. The current flowing in the primary windings of coupled inductors 230 and 231, labeled I_AB in FIG. 24d, is positive. During this initial condition, switch 217 is closed (on) and switch 214 is open (off). During this initial condition, coupled inductor 230 has a substantial amount of stored energy. During this initial condition, coupled inductor 231 also has a substantial amount of stored energy but, in general, the stored energy in coupled inductor 231 will be less than the stored energy in coupled inductor 230. Let us define that the magnetizing current is flowing in a positive direction when the current flows from the undotted terminal through the winding to the dotted terminal. For coupled inductor 230, during the initial condition, the secondary current is zero and the primary current is equal to its magnetizing current and the magnetizing current, referred to the primary winding, labeled I_MT1 in FIG. 24b, is positive, since the current is flowing through its primary winding from the undotted terminal of its primary winding to the dotted terminal of its primary winding. During the initial condition, the current I_AB is equal in magnitude and direction to the magnetizing current, referred to the primary winding, of coupled inductor 230. During the initial condition, the magnetizing current, referred to the primary winding, of coupled inductor 231 is decreasing. The total current in the primary winding of coupled inductor 231 is equal to the current I_AB. There are two components of the secondary winding current of coupled inductor T2. One component of the secondary winding current of coupled inductor T2 is its magnetizing current, referred to the secondary winding, which is decreasing, and the other component is the induced current from its primary winding, which is increasing. By proper selection of component values the two slopes can be made equal and opposite so that the ripple current slope is zero. This property is very desirable since it reduces the size of the output capacitor. The induced current component of the secondary winding current of coupled inductor 231 is equal to the current flowing in the primary winding of coupled inductor 231 multiplied by the ratio of the primary winding turns to the secondary winding turns of coupled inductor 231. During the initial condition, the secondary winding voltage of coupled inductor 231 is equal to the output voltage and the primary winding voltage of coupled inductor 231 is equal to the secondary winding voltage of coupled inductor 231 multiplied by the ratio of the primary winding turns to the secondary winding turns of coupled inductor 231. The primary winding voltage of coupled inductor 230 is equal to the voltage of source V_IN minus the primary winding voltage of coupled inductor 231 minus the L1 inductor 228 voltage. During the initial condition, the energy in inductors 230 and 228 increases. At a time determined by the control circuit the primary switching network changes state so that switch 217 is opened, as illustrated in FIG. 27. The stored energy in coupled inductor 230 maintains the primary winding current, which is flowing from A towards B, and forces charge into C2 capacitor 213, into C1 capacitor 216, and into C4 capacitor 209. The voltage at B rises as capacitors C1 216 and C4 209 charge and capacitor C2 213 discharges. Since the capacitance of C4 209 is much larger than the capacitance of C1 216 and C2 213 we can assume that the voltage applied to C4 209 remains invariant throughout the switching transition. When the voltage at B, node 223, reaches the voltage at the positive terminal of V_IN 201, switch 253 is closed (turned on), as illustrated in FIG. 28. The voltage at B, node 223, continues to rise and the current in switch 254 falls slightly and the current in the primary windings of coupled inductors 230 and 231 falls slightly as the current in switch 253 rises slightly. While switches 253 and 254 are closed, the output current begins to transfer from switch 254 to switch 253. The voltage at B, node 223, continues to rise, driven by the stored energy in inductor L1 228 and coupled inductor 231, until the diode 215 is forward biased, as illustrated in FIG. 29. Soon thereafter, switch 214 is turned on at zero voltage, as illustrated in FIG. 30. Now the current is transferring rapidly from 254 to 253 and the primary current is dropping rapidly. Soon the current in switch 254 drops to zero and switch 254 is opened (turned off), as illustrated in FIG. 31. When the 254 switch is opened the primary current is equal to the magnetizing current of coupled inductor 231, referred to its primary winding. FIG. 31 shows the operating condition for an off state. At the beginning of the off state the primary current is flowing from A towards B and the primary current is equal in magnitude to the magnetizing current of coupled inductor 231, which is negative and increasing, i.e., becoming more positive as time progresses, as illustrated in FIG. 24c. By examining FIG. 31 one can see that the voltage on capacitor 209 is equal to the sum of the primary winding voltages of inductors 228, 230, and 231. The voltage on the secondary winding of coupled inductor 230 is equal to the converter's output voltage. The voltage on the primary winding of coupled inductor 230 is equal to the output voltage times the ratio of the primary winding turns to the secondary winding turns of coupled inductor 230. The primary winding voltage of coupled inductor 231 is equal to the voltage of capacitor 209 minus the primary winding voltage of coupled inductor 230 minus the inductor 228 voltage. The voltage applied to the primary winding of coupled inductor 231 is directed so that the magnetizing current in coupled inductor 231 becomes more positive with the passage of time and the magnetizing current in coupled inductor 231 passes through zero and becomes positive, as illustrated in FIGS. 24c and 32. When the magnetizing current in coupled inductor 231 has increased to a value approximately equal to the negative of its value at the beginning of the off state, switch 214 is opened (turned off). When switch 214 is turned off the energy stored in inductors 231 and 228 maintains the primary winding current, which is now flowing from B towards A, charging capacitor 213 and discharging capacitors 209 and 216, as illustrated in FIG. 33. The voltage at B drops during this time, until the voltage at B reaches the voltage at the positive terminal of V_IN. At this point switch 254 is closed at zero voltage, as illustrated in FIG. 34. The voltage at B continues to fall driven by the stored energy in inductor 228, until diode 218 becomes forward biased, as illustrated in FIG. 35. Shortly after diode 218 begins to conduct switch 217 is closed (turned on), as illustrated in FIG. 36. During this time the primary current and the secondary currents are changing rapidly as the secondary current transfers from 253 to 254 and the primary current drops in magnitude. Shortly after switch 217 is closed the primary current changes sign as illustrated in FIG. 37. When the current in 253 drops to zero switch 253 is turned off (opened), as illustrated in FIG. 26, which also illustrates the initial condition. The initial condition is the on state of the converter. At this point a full cycle of operation has been completed and the initial conditions are again established. During the full operating cycle both of the primary switches were turned on and turned off at substantially zero voltage, eliminating first order switching losses for the two primary switches.

RELATED EMBODIMENTS

Figure 38:
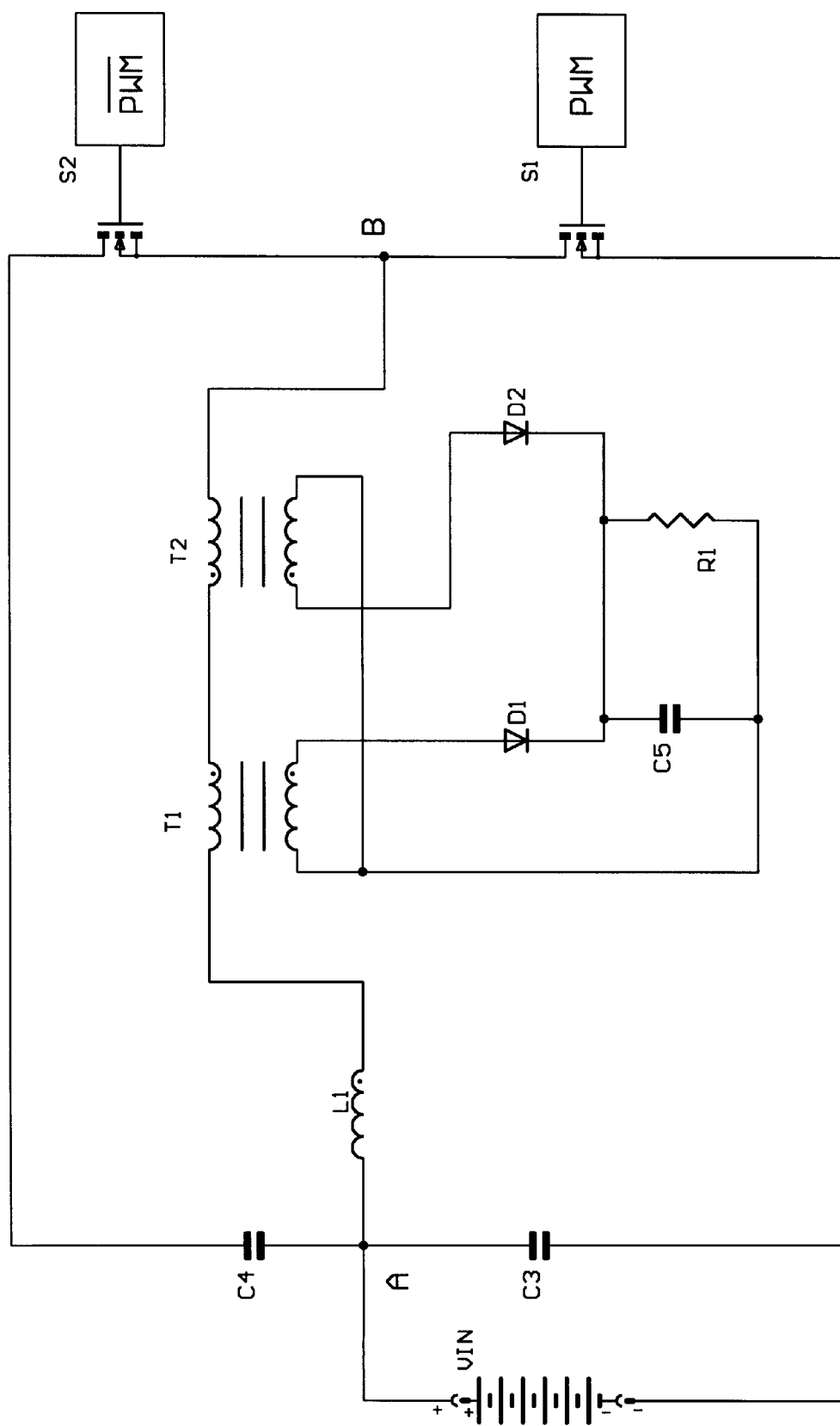
FIG. 38 illustrates an embodiment of the FIG. 23 converter in which power mosfets are used as primary switches and diodes are used as secondary switches.

FIG. 38 shows an implementation of the circuit of FIG. 23 in which the secondary switches are diodes and the primary switches are power mosfets which intrinsically contain a capacitor and a diode in the form of the mosfet output capacitance and the body drain diode, respectively.

Figure 39:
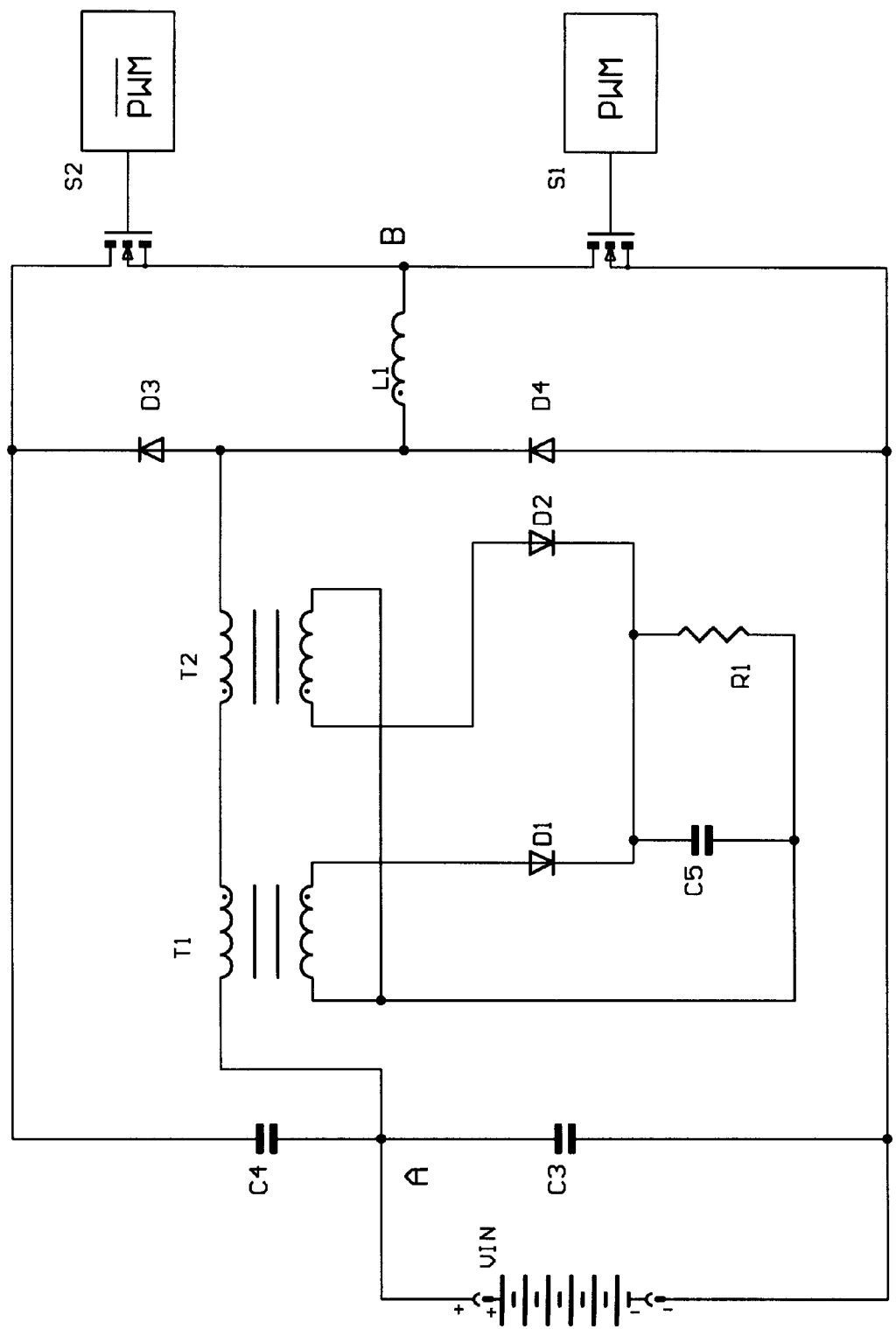
FIG. 39 illustrates an embodiment of the FIG. 23 converter in which rectifier diodes are added to clamp ringing associated with the resonance of the L1 inductor and the secondary diode parasitic capacitance.

FIG. 39 shows an implementation in which diodes D3 and D4 are added to clamp ringing associated with the L1 inductor and the parasitic capacitances of D1 and D2.

Figure 42:
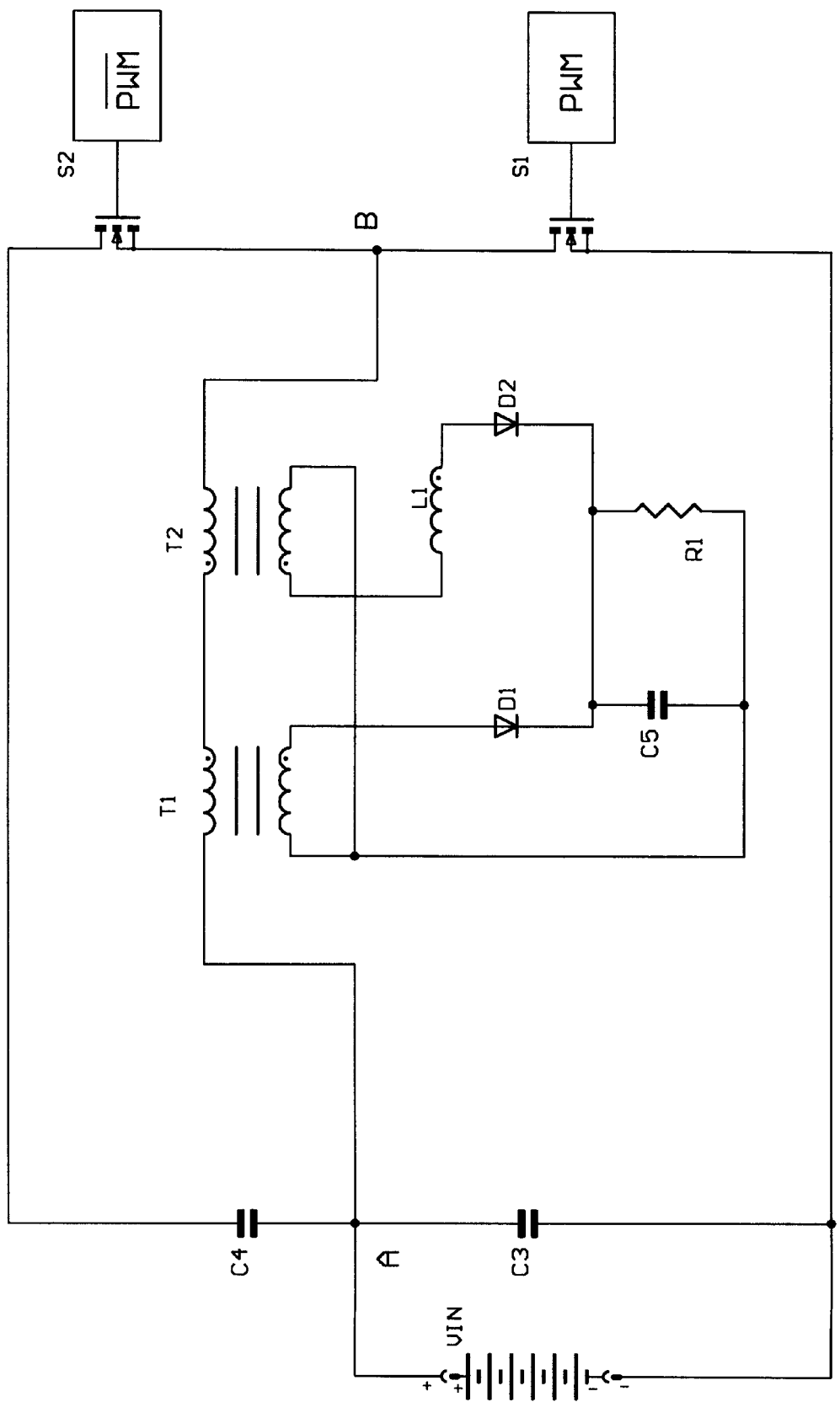
FIG. 42 illustrates an embodiment of the FIG. 23 circuit in which the small inductance is placed in series with the secondary winding of one of the coupled inductors.

FIG. 42 shows an embodiment in which the small inductor is placed in series with the D2 diode. In this embodiment no inductance is placed in series with the T1 coupled inductor. During the transition from the on state to the off state the series inductor of the FIG. 23 circuit is not relied upon to accomplish the zero voltage transition since the magnetizing current of the T2 coupled inductor is directed to drive the transition, so an inductor placed in series with the T1 coupled is not required to accomplish a zero voltage transition for the turn off transition. For the turn on transition the magnetizing current of the T1 coupled inductor is, in general, directed to oppose the turn on transition. In this case the inductor placed in series with the T2 coupled inductor is required to maintain the primary current through the turn on transition in order to accomplish zero voltage switching for the turn on transition. The FIG. 39 embodiment is preferred over the FIG. 42 embodiment since the FIG. 39 embodiment provides a mechanism to clamp the ringing associated with the resonance associated with the small series inductor and the parasitic capacitances of the output diodes.

Figure 47:
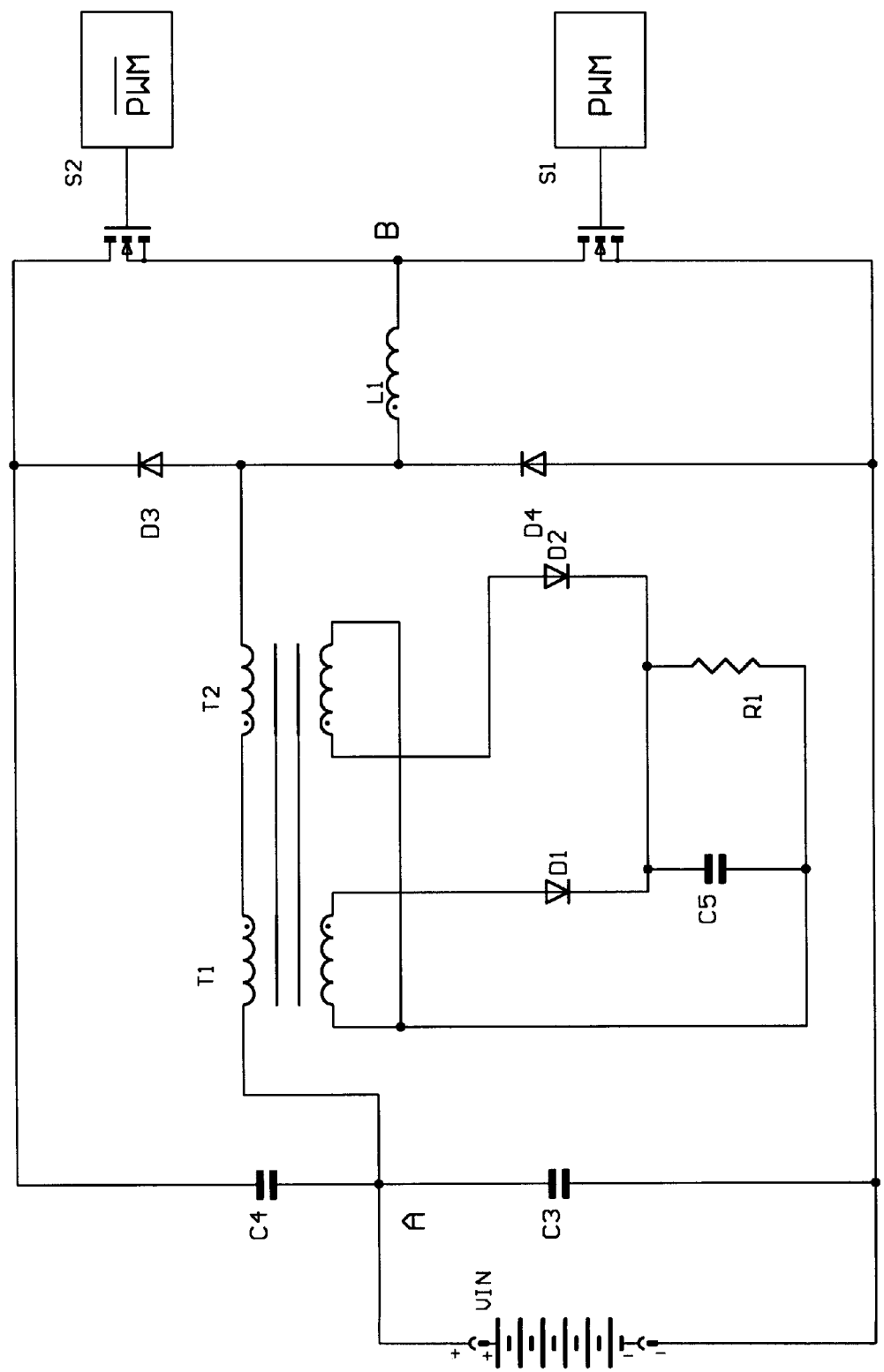
FIG. 47 illustrates an embodiment of the FIG. 23 circuit which uses the magnetic circuit element structure of FIG. 43.

Another embodiment is shown in FIG. 47. In the FIG. 47 embodiment the two coupled inductors are replaced by a single integrated magnetic structure in which both coupled inductors are wound on a single core as illustrated in FIG. 43.

Figure 48:
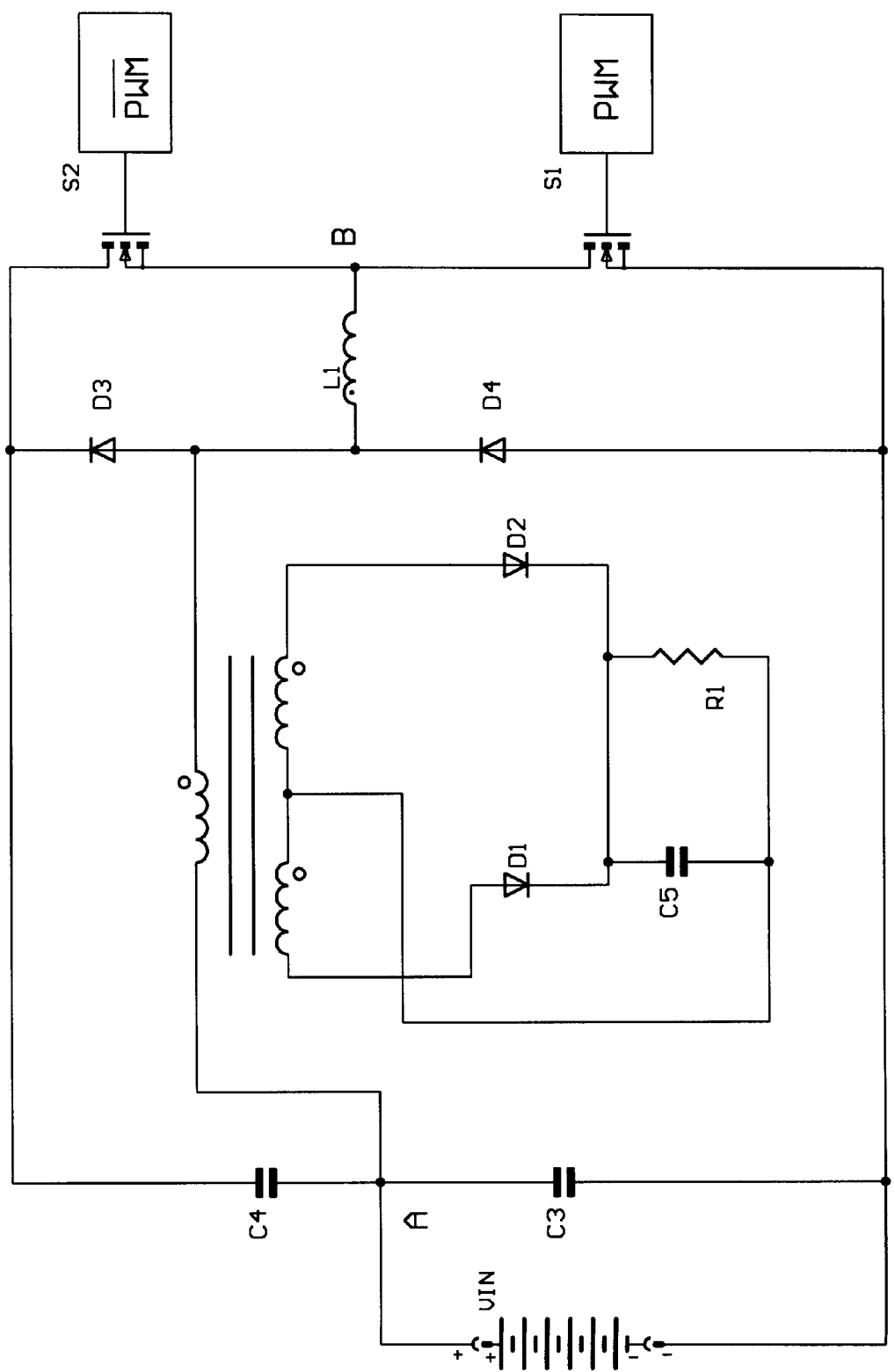
FIG. 48 illustrates an embodiment of the FIG. 23 circuit which uses the magnetic circuit element structure of FIG. 44.

Another embodiment related to the FIG. 47 embodiment is illustrated in FIG. 48. In the FIG. 48 embodiment the applicable magnetic structure is illustrated in FIG. 44.

Figure 51:
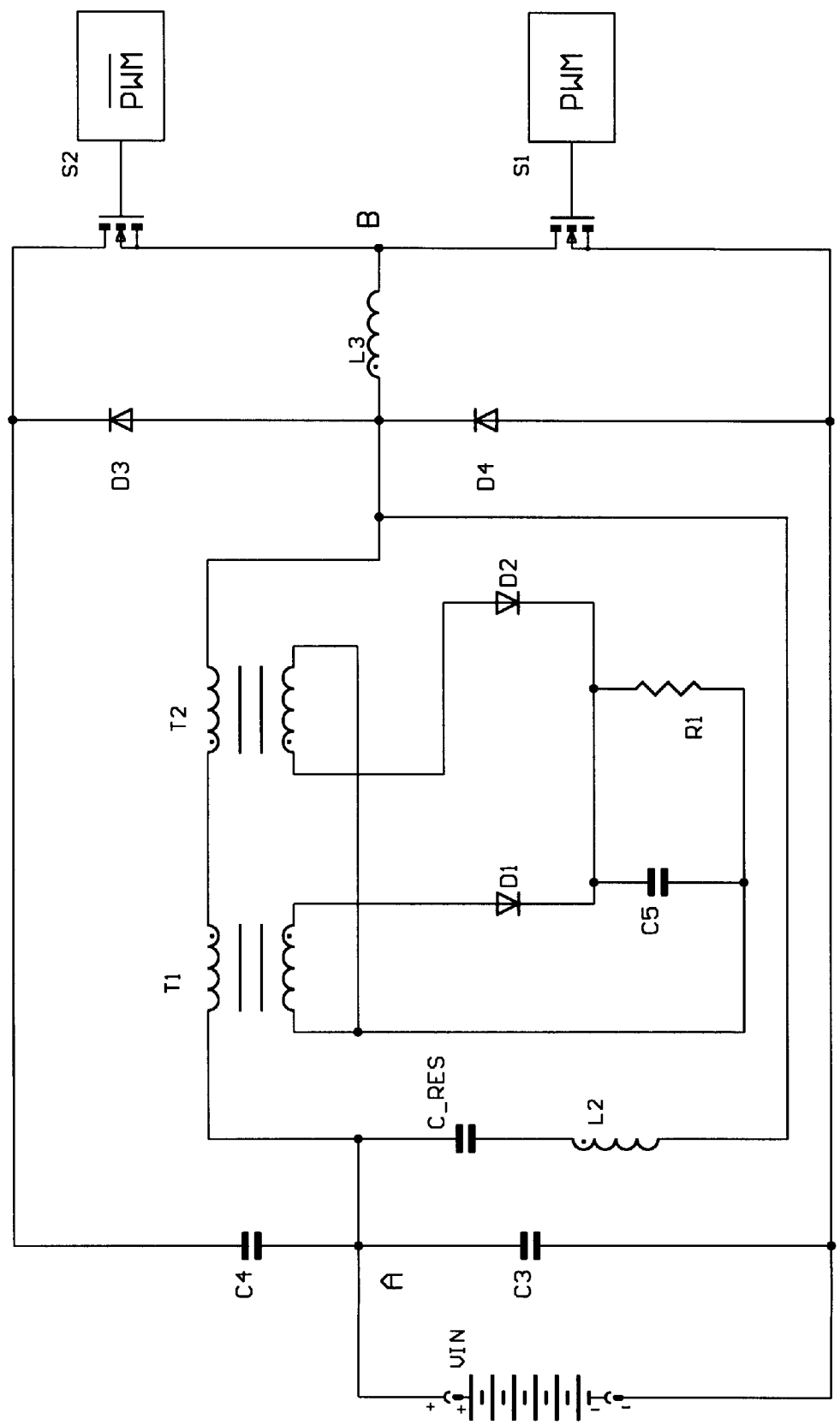
FIG. 51 illustrates an embodiment of the FIG. 23 circuit with an LC circuit which increases the available energy for driving the resonant transitions.

Another embodiment is illustrated in FIG. 51. In the FIG. 51 embodiment a LC tank circuit is added to provide additional stored magnetic energy for driving the switching transitions.

Additional embodiments can be realized by adding secondary windings to each coupled inductor and associated switches, capacitors, and loads to extend the concept to multiple outputs. Another embodiment is realized by paralleling interleaved converters of the type shown in FIG. 23 which share input power source, input capacitor, reset capacitor, output capacitor, and load.

CONCLUSION, RAMIFICATIONS, AND SCOPE OF INVENTION

Thus the reader will see that the power converters of the invention provide a mechanism which significantly reduces switching losses, has low component parts counts, and does not require high core losses or high conduction losses to accomplish zero voltage switching, relying on the finite rate of change of current associated with a small magnetic circuit element placed in series with a coupled inductor.

While my above description contains many specificities, these should not be construed as limitations on the scope of the invention, but rather as exemplifications of preferred embodiments thereof. Many other variations are possible. For example, other variations include power converters with more than one output; multi-phase, interleaved, parallel power converters with two or more parallel converter sections; power converters arranged in a bridged configuration for amplifier and inverter applications; power converters similar to those shown in the drawing but which integrate individual magnetic circuit elements onto a single magnetic core; power converters similar to those shown but which have instead high AC ripple voltages on the input filter capacitors; power converters, similar to those shown in the drawing, but where the DC input source is instead a varying rectified AC signal. Accordingly, the scope of the invention should be determined not by the embodiments illustrated, but by the appended claims and their legal equivalents.

I claim:

1. A power converter comprising:
   an input coupleable to a source of DC potential,
   an output coupleable to a DC load,
   a magnetic circuit element network comprising,
      a first coupled inductive element with substantial DC energy storage capability having a secondary winding coupled to said output and a primary winding,
      a second coupled inductive element with substantial DC energy storage capability having a secondary winding coupled to said output and a primary winding coupled in series to said primary winding of said first coupled inductive element,
      a third inductive element coupled in series with both said first and said second coupled inductive elements,
   a full bridge primary switch network comprising,
      first switch means for coupling said input to said magnetic circuit element network,
      second switch means for coupling said input to said magnetic circuit element network and to said first switch means operable substantially in anti-synchronization with said first switch means, third switch means for coupling said input to said magnetic circuit element network, fourth switch means for coupling said input to said magnetic circuit element network and to said third switch means operable substantially in antisynchronization with said third switch means, fifth switch means for coupling said secondary winding of said first coupled inductive element to said load, sixth switch means for coupling said secondary winding of said second coupled inductive element to said load operable substantially in anti-synchronization with said fifth switch means, control means for activating said first, second, third, fourth, fifth, and sixth switch means such that said first, second, third, and fourth switch means are operated when the voltage drop therethrough is substantially zero, whereby said third inductive element has sufficient energy storage capability to maintain the primary winding current direction in said first and said second coupled inductive elements' primary windings throughout the duration of the turn on transitions of all said switch means of said full bridge primary switch network.

2. A power converter as set forth in claim 1, wherein said first, second, third, fourth, fifth, and sixth switch means comprise semiconductor switch means.

3. A power converter as set forth in claim 2 in which said third inductive element is placed in series with said primary windings of said first and said second coupled inductive elements and further comprising, a first rectifier coupled to said third inductive element and a positive terminal of said input, and a second rectifier coupled to said third inductive element and a negative terminal of said input, whereby said rectifiers clamp ringing associated with the resonance of said third inductive element and circuit parasitic capacitance, including that parasitic capacitance associated with said fifth and said sixth switch means.

4. A power converter as set forth in claim 2, wherein said first and second coupled inductive elements are integrated onto a single magnetic core.

5. A power converter as set forth in claim 4, wherein said primary winding of said first coupled inductive element and said primary winding of said second coupled inductive element are combined into a single primary winding.

6. A power converter comprising:

an input coupleable to a source of DC potential, a capacitor coupled to said input, an output coupleable to a DC load, a magnetic circuit element network comprising, a first coupled inductive element with substantial DC energy storage capability having a secondary winding coupled to said output and a primary winding coupled to said input, a second coupled inductive element with substantial DC energy storage capability having a secondary winding coupled to said output and a primary winding coupled in series with said primary winding of said first coupled inductive element, a third inductive element coupled in series with said second coupled inductive element, a primary switch network comprising, first switch means for coupling said input to said magnetic circuit element network, second switch means for coupling said capacitor to said magnetic circuit element network and to said first switch means operable substantially in anti-synchronization with said first switch means, third switch means for coupling said secondary winding of said first coupled inductive element to said load, fourth switch means for coupling said secondary winding of said second coupled inductive element to said load operable substantially in anti-synchronization with said third switch means, control means for activating said first, second, third, and fourth switch means such that said first and said second switch means are operated when the voltage drop therethrough is substantially zero, whereby said third inductive element has sufficient energy storage capability to maintain the primary winding current direction in said second coupled inductive element's primary winding throughout the duration of the turn on transition of said first switch means of said primary switch network.

7. A power converter as set forth in claim 6, wherein said first, second, third, and fourth switch means comprise semiconductor switch means.

8. A power converter as set forth in claim 7 in which said third inductive element is placed in series with said primary windings of said first and said second coupled inductive elements and further comprising, a first rectifier coupled to said third inductive element and a positive terminal of said capacitor, and a second rectifier coupled to said third inductive element and a negative terminal of said input, whereby said rectifiers clamp ringing associated with the resonance of said third inductive element and circuit parasitic capacitance, including that parasitic capacitance associated with said third and said fourth switch means.

9. A power converter as set forth in claim 7, wherein said first and second coupled inductive elements are integrated onto a single magnetic core.

10. A power converter as set forth in claim 8, wherein said primary winding of said first coupled inductive element and said primary winding of said second coupled inductive element are combined into a single primary winding.

* * * * *